US006369836B1

(12) United States Patent
Larson et al.

(10) Patent No.: US 6,369,836 B1
(45) Date of Patent: *Apr. 9, 2002

(54) CAUSE EFFECT DIAGRAM PROGRAM

(75) Inventors: David P. Larson, Mission Viejo; Leslie V. Powers, Irvine, both of CA (US); Robert A. Hocker, Portland, OR (US)

(73) Assignee: Triconex, Irvine, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/470,843

(22) Filed: Dec. 23, 1999

Related U.S. Application Data

(60) Provisional application No. 60/113,568, filed on Dec. 23, 1998.

(51) Int. Cl.$^7$ .................................................. G06F 3/00
(52) U.S. Cl. ..................... 345/763; 345/853; 345/965; 345/967; 717/1
(58) Field of Search ............................ 345/326, 356, 345/357, 965, 967, 339, 349, 700, 853, 764, 763; 717/1–11

(56) References Cited

U.S. PATENT DOCUMENTS

| | | | |
|---|---|---|---|
| 5,386,508 A | * | 1/1995 | Itomori et al. .................. 717/1 |
| 5,481,668 A | * | 1/1996 | Marcus ........................ 345/349 |
| 5,704,028 A | * | 12/1997 | Schanel et al. ............. 345/440 |
| 5,995,969 A | * | 11/1999 | Lee et al. .................... 707/100 |
| 6,002,396 A | | 12/1999 | Davies ........................ 345/763 |
| 6,151,494 A | * | 11/2000 | Gutowski et al. ........... 455/424 |

FOREIGN PATENT DOCUMENTS

WO    WO95/12174 A1    5/1995

OTHER PUBLICATIONS

Cause & Effect Matrix Programming Language Editor Users Guide (Version 1).
Getting Started TriStation 1131 Developer's Workbench (Version 2.0).

* cited by examiner

Primary Examiner—Raymond J. Bayerl
Assistant Examiner—Sy D. Luu
(74) Attorney, Agent, or Firm—Cooley Godward, LLP

(57) ABSTRACT

A computer system for generating a cause effect matrix as a user interface to develop a control program based on the cause effect matrix and to compile and download the resulting program into a programmable controller. A cause effect matrix diagram is used to develop a function block diagram program which is a standard IEC 1131-3 language. The function block diagram is translated into structured text which is compiled into intermediate code. The intermediate code is translated into the native code for the microprocessor of the target control system, including but not necessarily limited to the Motorola processor MPC-860. The automation of a cause effect matrix diagram to generate a function block diagram permits additional capability by allowing functions for causes, intersections, and effects. Because special functions may be included, the results of a cause generate timing functions or other computations before initiating the effect.

51 Claims, 68 Drawing Sheets

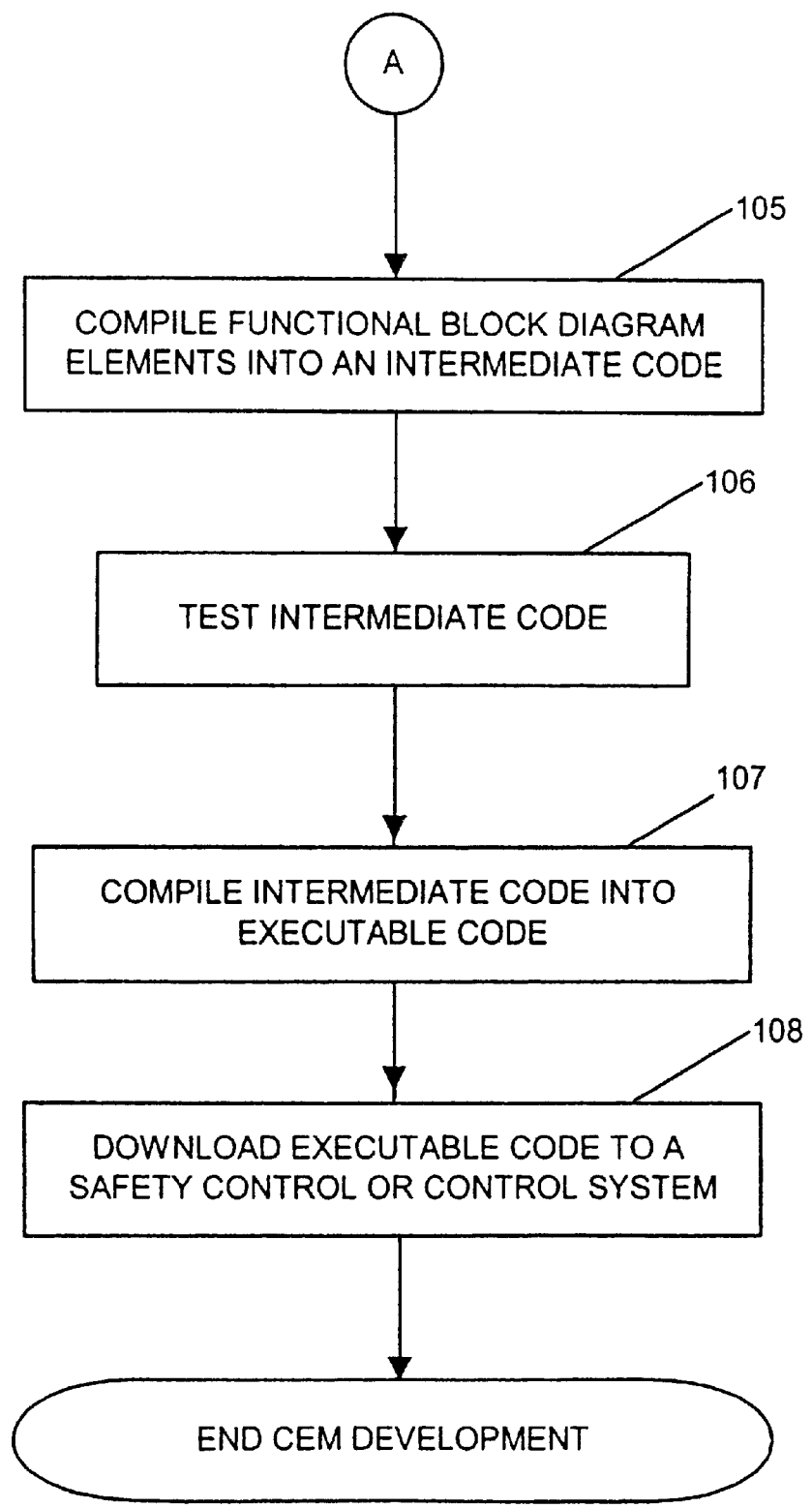

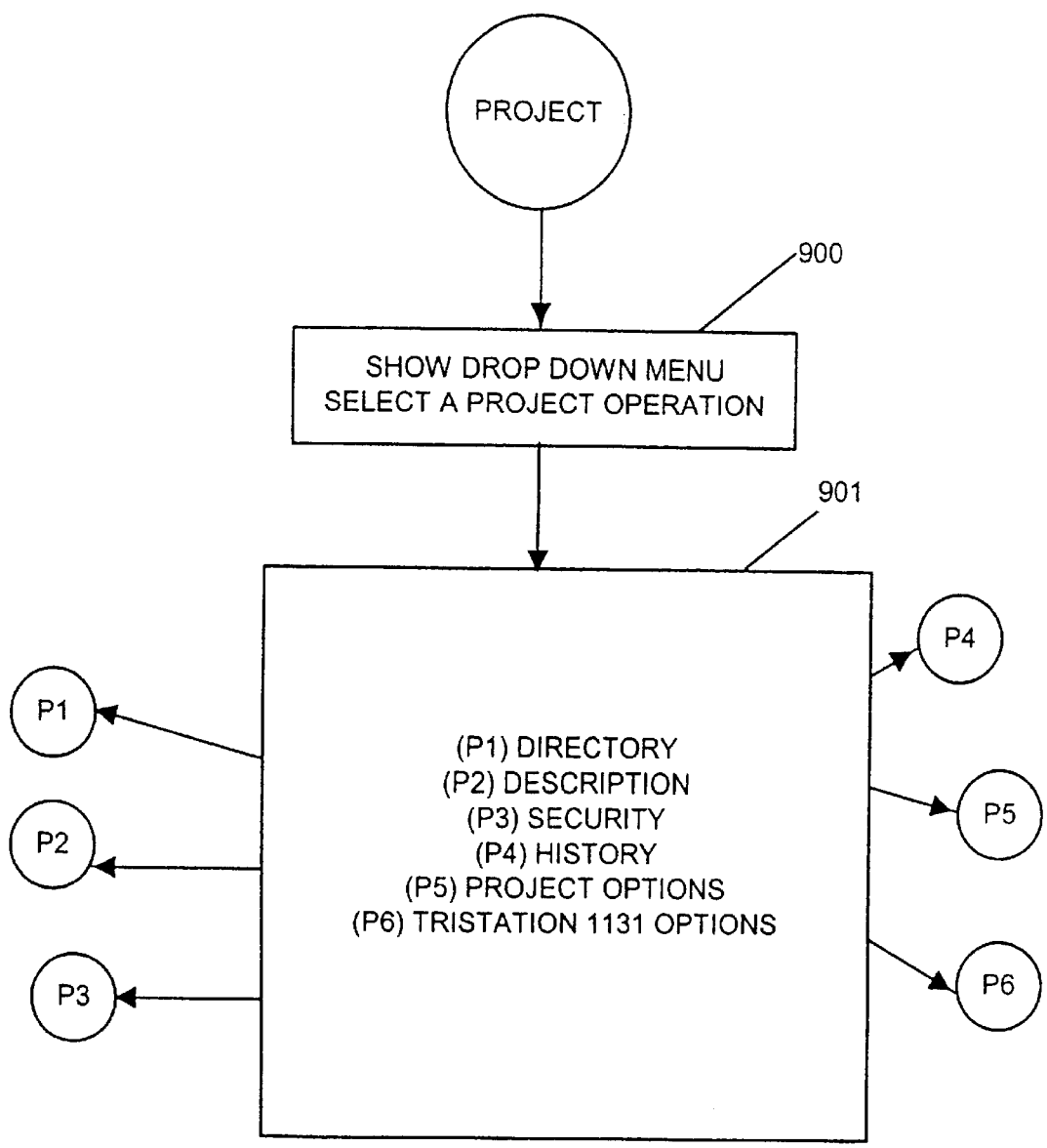

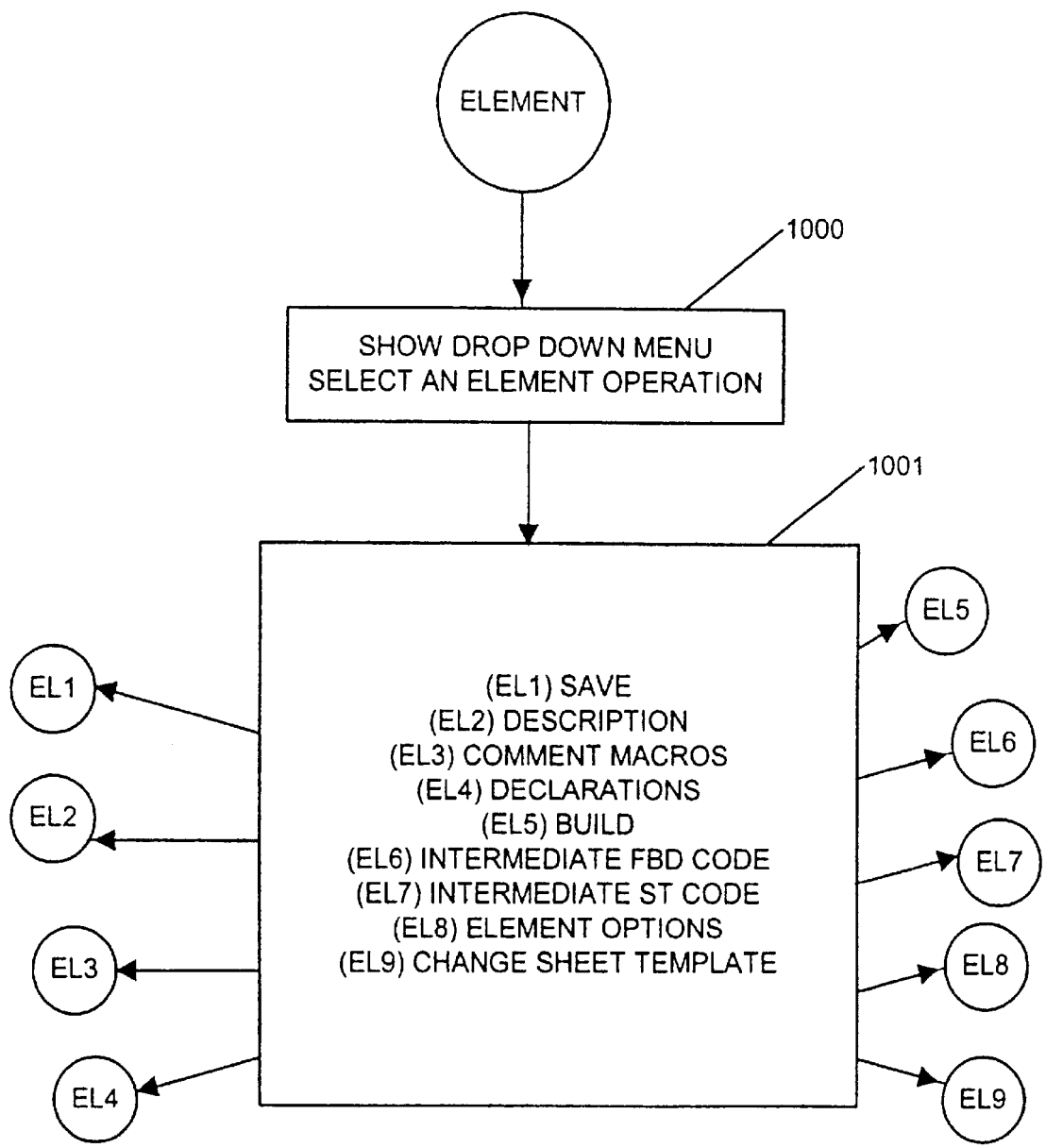

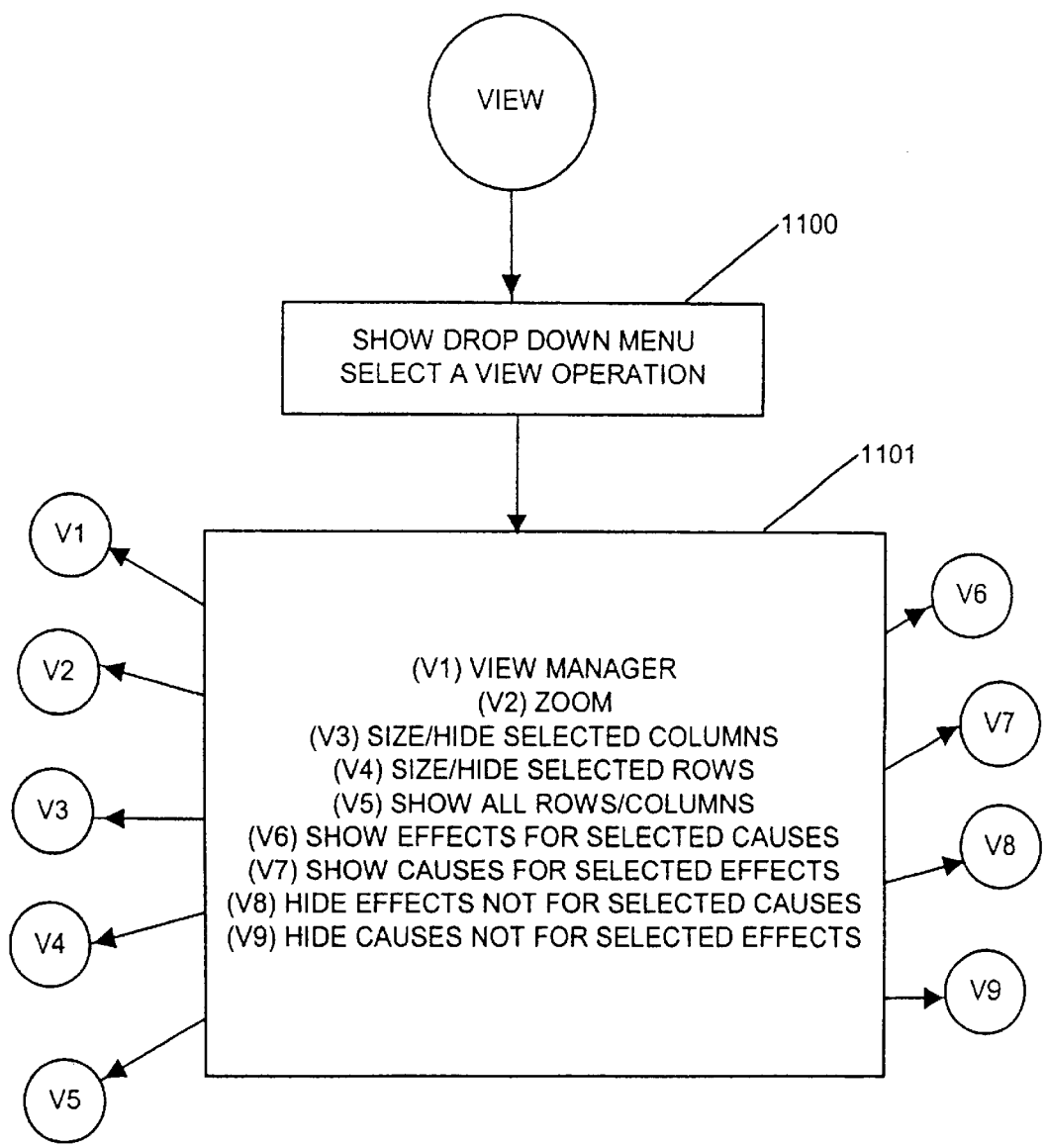

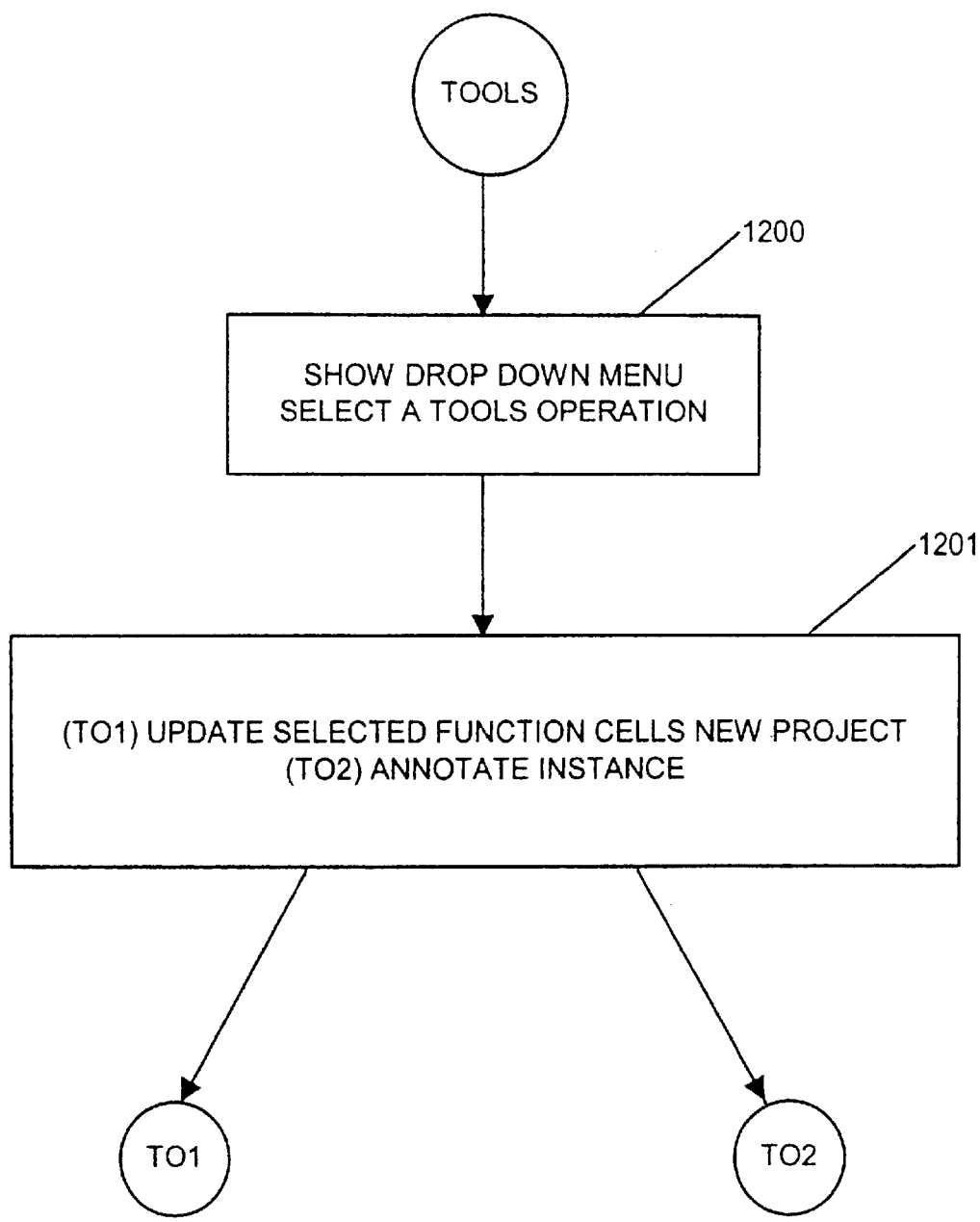

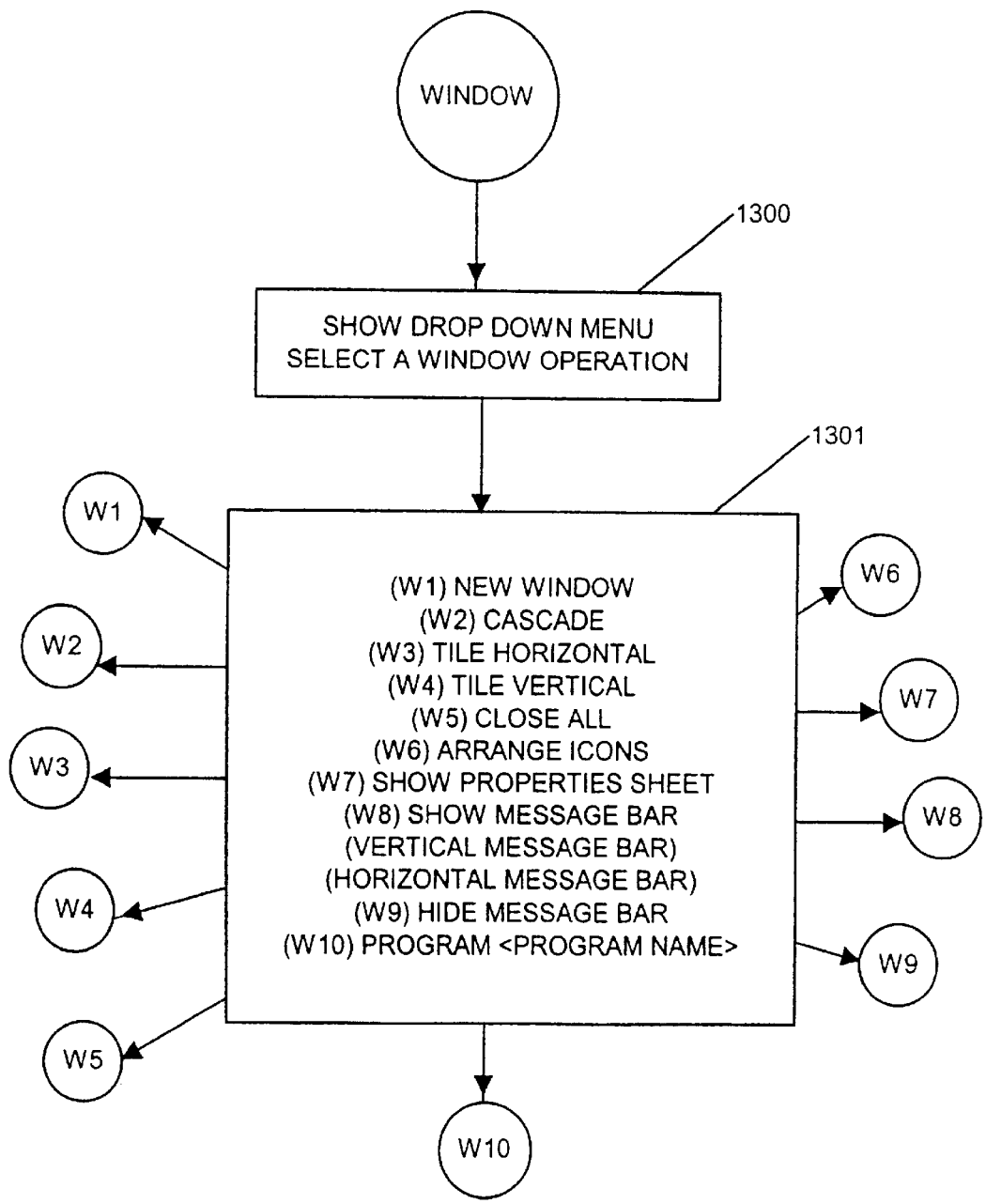

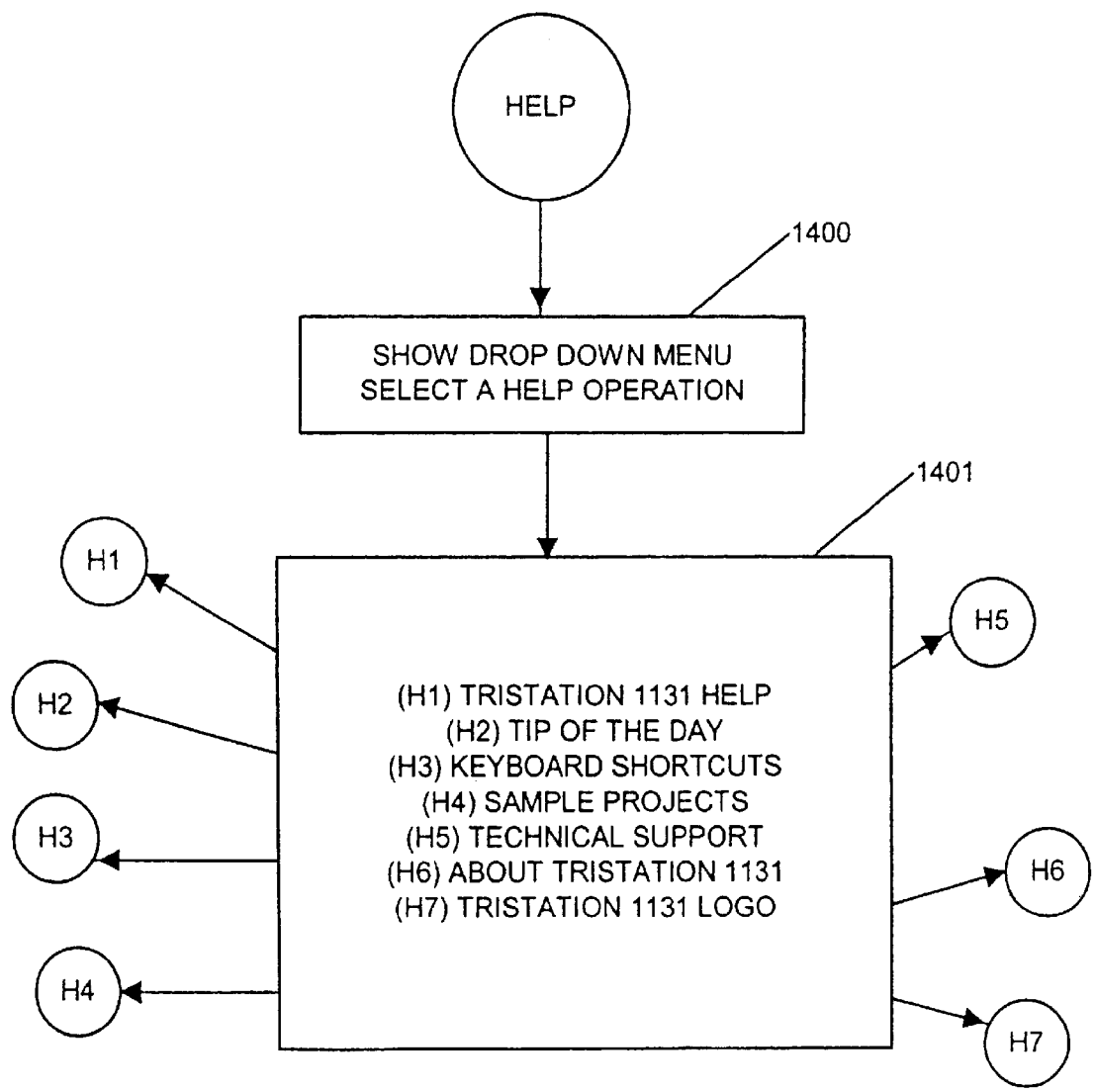

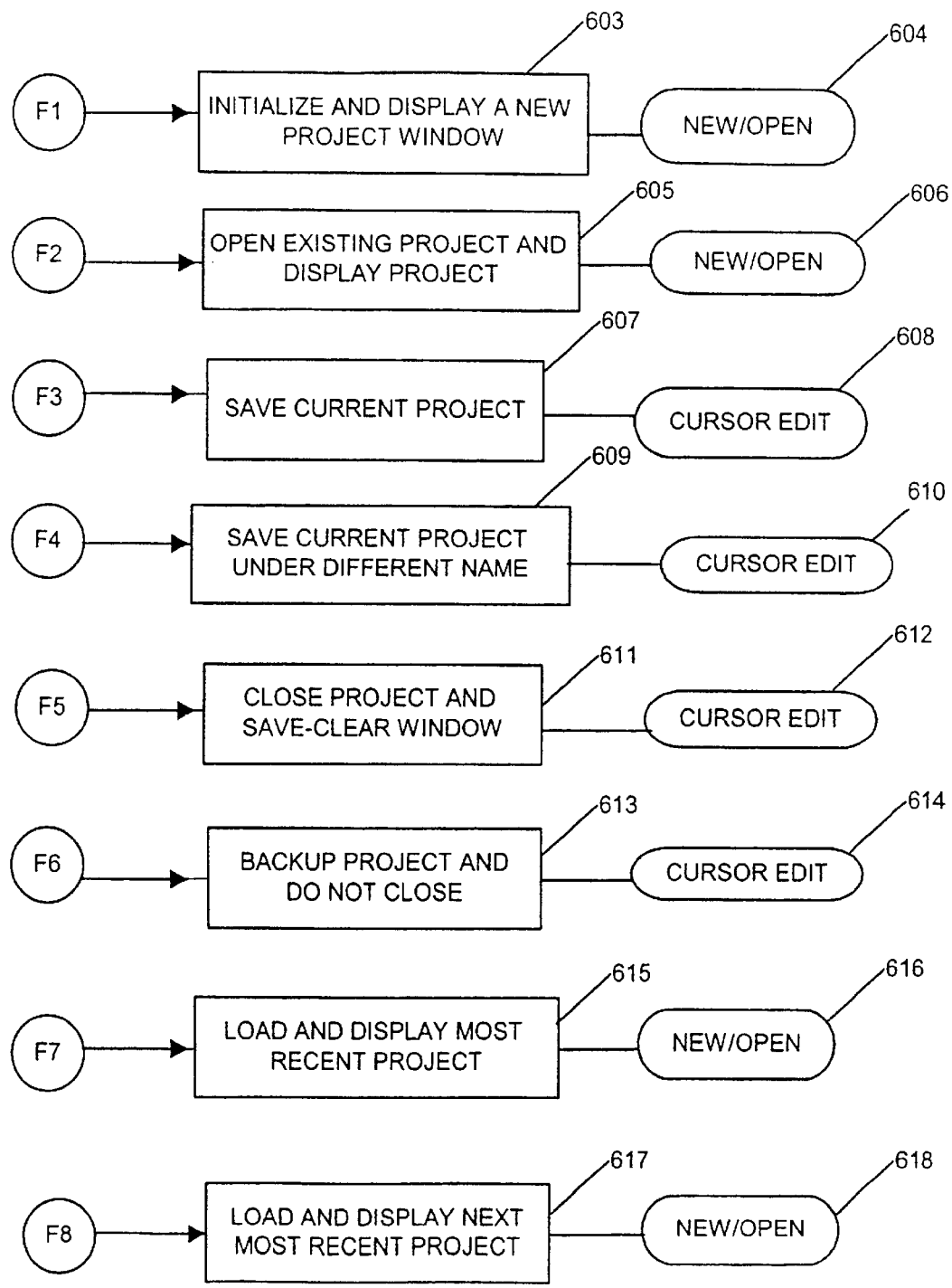

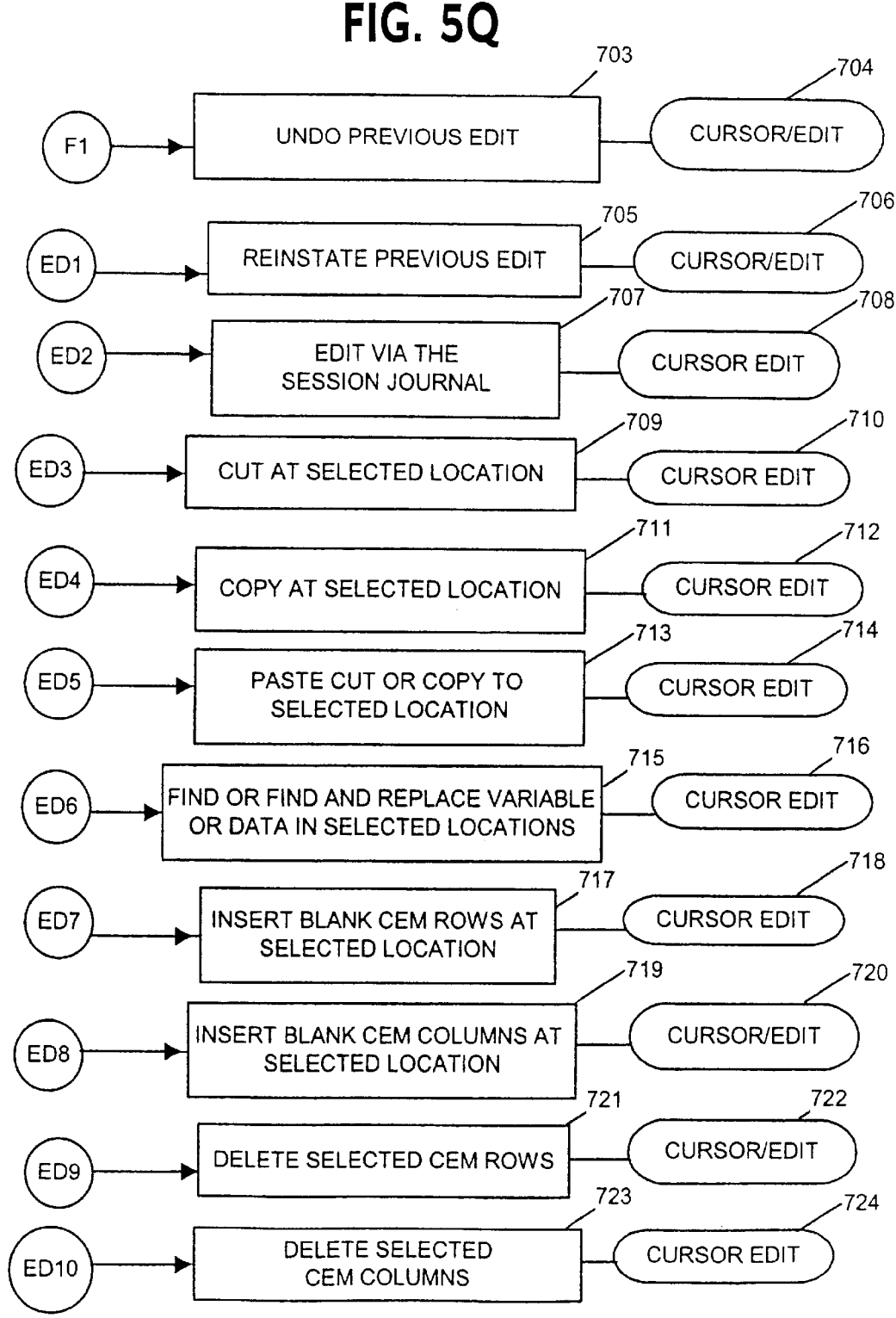

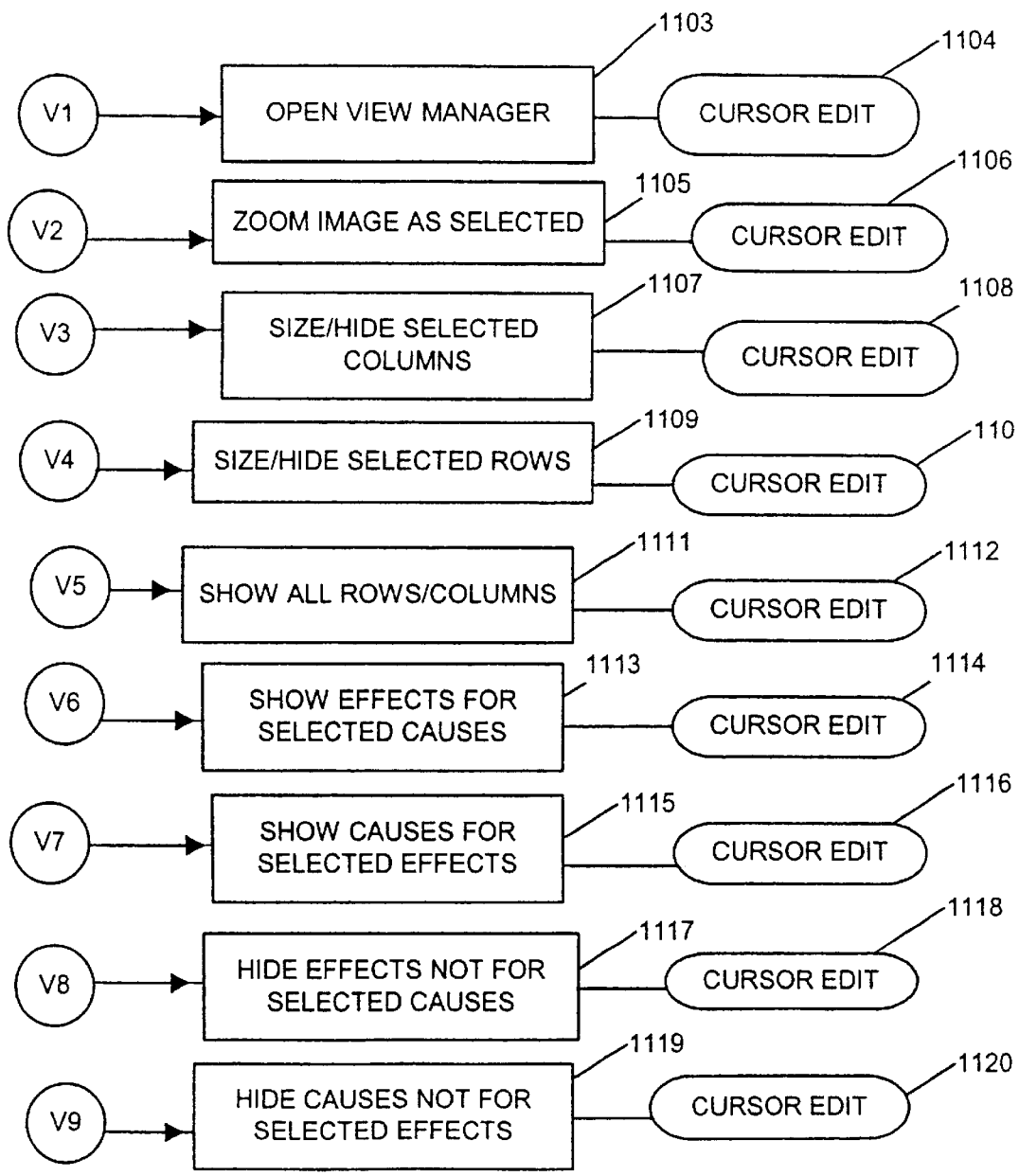

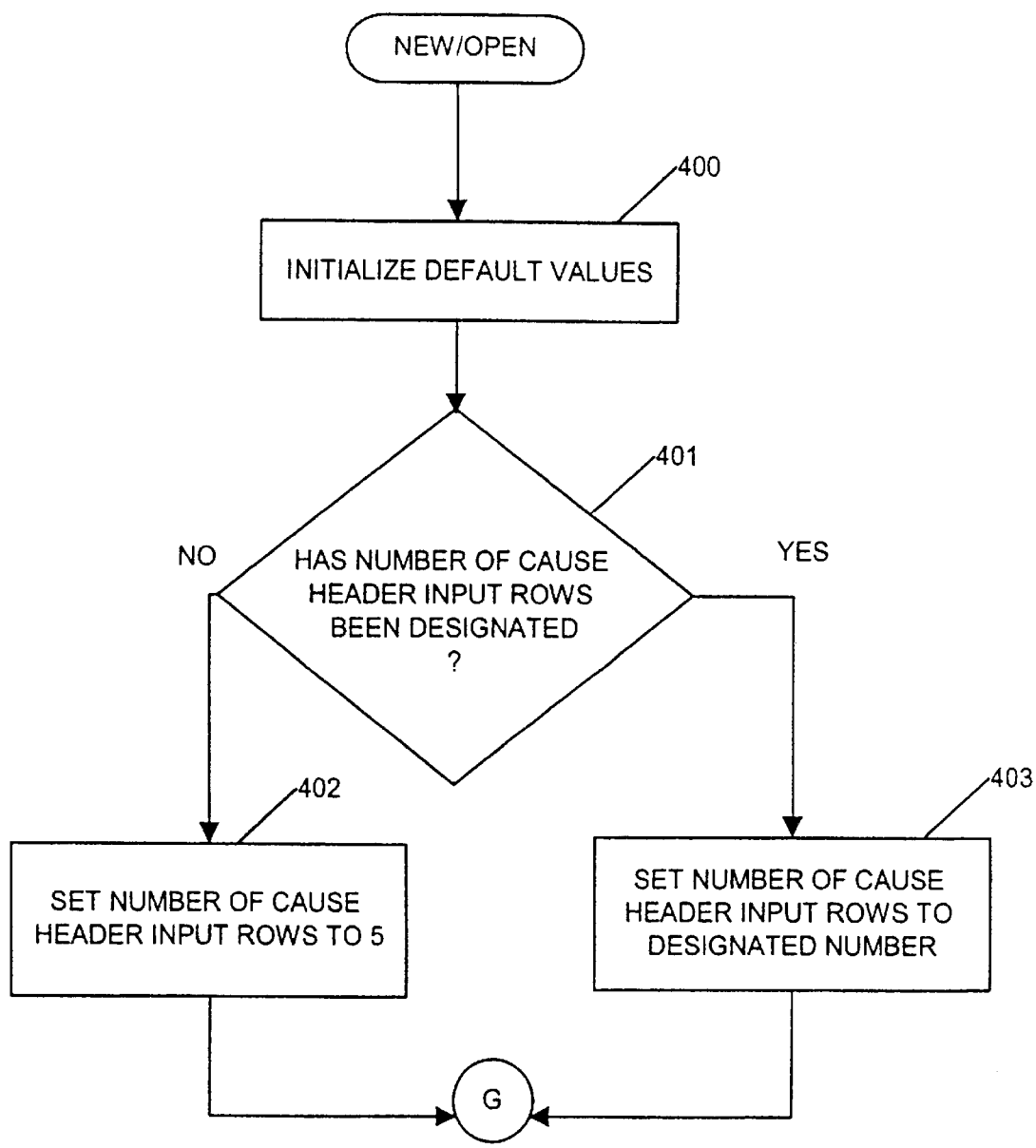

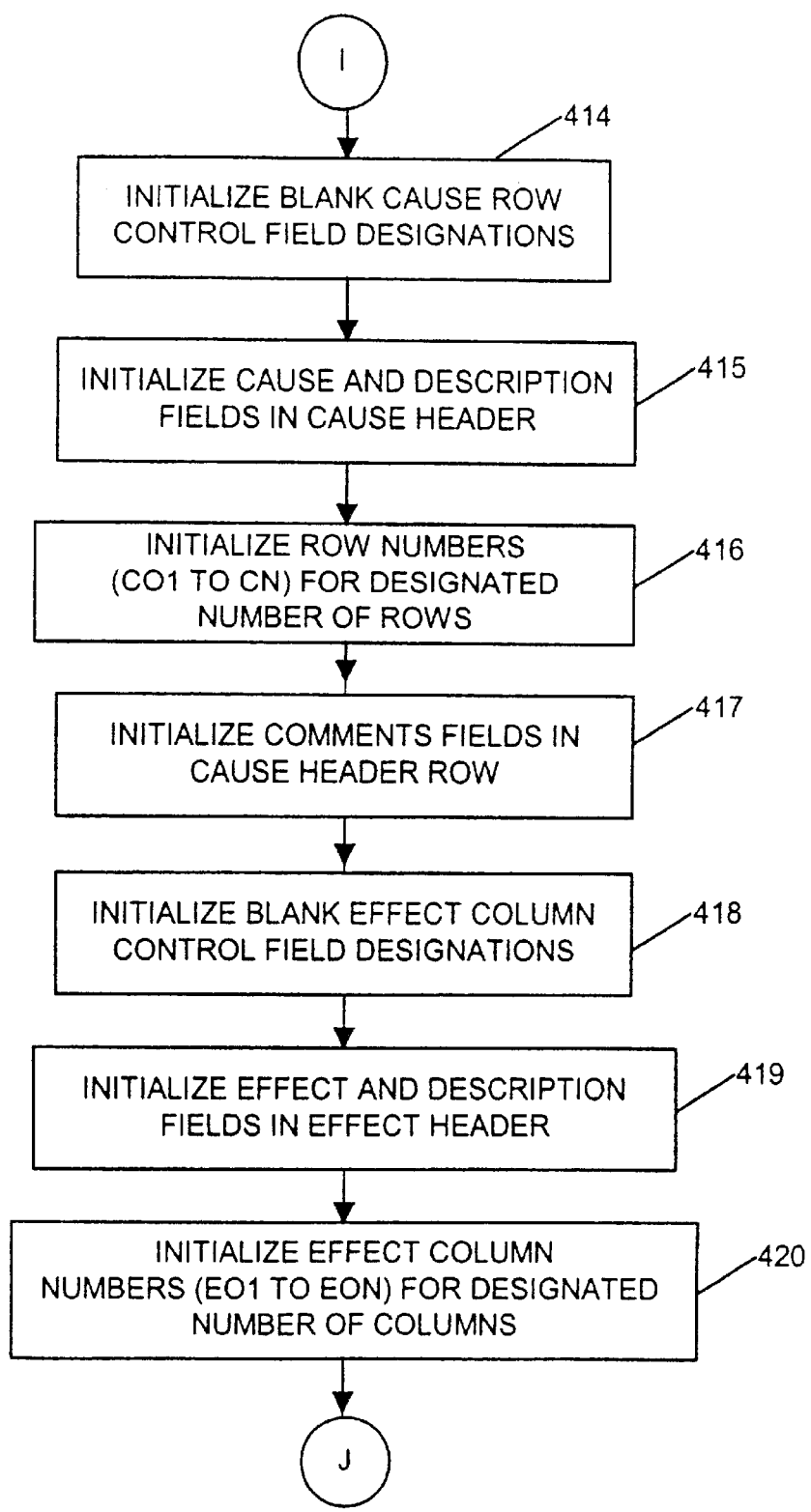

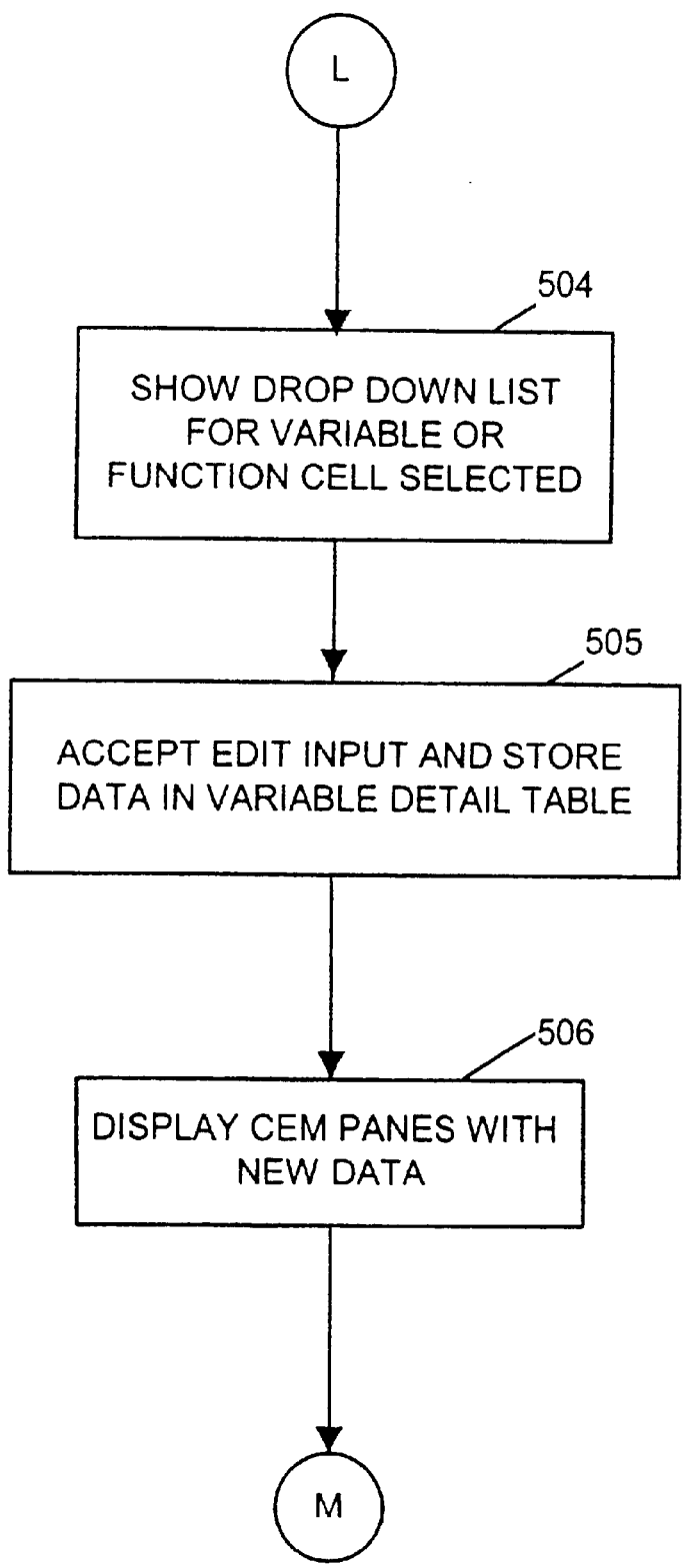

FIG. 11

| CAUSE | DESCRIPTION | | | | | | | | COMMENTS |
|---|---|---|---|---|---|---|---|---|---|
| | | | | | | E05 | | | TURN ON ALARM AFTER 5 SECS |
| | | | | | E04 | | | | TURN ON ALARM AFTER 5 SECS |
| | | | | E03 | | | | | TURN ON ALARM AFTER 5 SECS |
| | | | E02 | | | | | | TURN ON ALARM AFTER 5 SECS |
| | | E01 | | | | | | | TURN ON ALARM AFTER 5 SECS |

| EFFECT | DESCRIPTION | | | | | |
|---|---|---|---|---|---|---|
| UNIT_5_ALARM | HIGH LEVEL ALARM INDICATOR FOR TANK 5 | E05 | | | | X |
| UNIT_4_ALARM | HIGH LEVEL ALARM INDICATOR FOR TANK 4 | E04 | | | X | |
| UNIT_3_ALARM | HIGH LEVEL ALARM INDICATOR FOR TANK 3 | E03 | | X | | |
| UNIT_2_ALARM | HIGH LEVEL ALARM INDICATOR FOR TANK 2 | E02 | X | | | |
| UNIT_1_ALARM | HIGH LEVEL ALARM INDICATOR FOR TANK 1 | E01 | X | | | | |
| | | | C01 | C02 | C03 | C04 | C05 |

| CAUSE | DESCRIPTION |
|---|---|
| LEVEL_1_HI | TRUE=FLUID LEVEL IN TANK 1 IS HIGH |
| LEVEL_2_HI | TRUE=FLUID LEVEL IN TANK 2 IS HIGH |
| LEVEL_3_HI | TRUE=FLUID LEVEL IN TANK 3 IS HIGH |
| LEVEL_4_HI | TRUE=FLUID LEVEL IN TANK 4 IS HIGH |
| LEVEL_5_HI | TRUE=FLUID LEVEL IN TANK 5 IS HIGH |

| TERMINAL | VAR NAME | VAR TYPE | DATA TYPE | TAGNAME | DESCRIPTION |
|---|---|---|---|---|---|
| 01 | LEVEL_1_HI | VAR_INPUT | BOOL | | |

CAUSE HEADER ROW 01

LEVEL_1_HI → MOVE → C01B

FIG. 12

| CAUSE | DESCRIPTION | | | | | | |
|---|---|---|---|---|---|---|---|
| | | | EFFECT | DESCRIPTION | | | |
| LEVEL_1_HI | TRUE=FLUID LEVEL IN TANK 1 IS HIGH | | UNIT_1_ALARM | HIGH LEVEL ALARM INDICATOR FOR TANK 1 | E01 | TON | |
| LEVEL_2_HI | TRUE=FLUID LEVEL IN TANK 2 IS HIGH | | UNIT_2_ALARM | HIGH LEVEL ALARM INDICATOR FOR TANK 2 | E02 | | TON |
| LEVEL_3_HI | TRUE=FLUID LEVEL IN TANK 3 IS HIGH | | UNIT_3_ALARM | HIGH LEVEL ALARM INDICATOR FOR TANK 3 | E03 | | |
| LEVEL_4_HI | TRUE=FLUID LEVEL IN TANK 4 IS HIGH | | UNIT_4_ALARM | HIGH LEVEL ALARM INDICATOR FOR TANK 4 | E04 | | |
| LEVEL_5_HI | TRUE=FLUID LEVEL IN TANK 5 IS HIGH | | UNIT_5_ALARM | HIGH LEVEL ALARM INDICATOR FOR TANK 5 | E05 | | |

COMMENTS: TURN ON ALARM AFTER .5 SECS (×5)

| LOC | TERMINAL | VAR NAME | VAR TYPE | DATA TYPE | DESCRIPTION |
|---|---|---|---|---|---|
| C01E01 | IN | | | | |
| C01E01 | PT | ALRM_DLY | VAR | TIME | |
| C01E01 | Q | | | | |
| C01E01 | ET | | | | |

INTERSECTION ROW 01, COL 01

C01B01F TON C01E01B
_C01B_
ALRM_DLY

FIG. 15A

| CAUSE | DESCRIPTION | E01 | E02 | E03 | E04 | E05 |
|---|---|---|---|---|---|---|
| | | C01 | C02 | C03 | C04 | C05 |
| LEVEL_1_HI | TRUE=FLUID LEVEL IN TANK 1 IS HIGH | MOVE | | | | |
| LEVEL_2_HI | TRUE=FLUID LEVEL IN TANK 2 IS HIGH | | MOVE | | | |
| LEVEL_3_HI | TRUE=FLUID LEVEL IN TANK 3 IS HIGH | | | MOVE ▶ | ◀ VE | |
| LEVEL_4_HI | TRUE=FLUID LEVEL IN TANK 4 IS HIGH | | | | | |
| LEVEL_5_HI | TRUE=FLUID LEVEL IN TANK 5 IS HIGH | | | | | MOVE |

(36)

```
NOT
R_TRIG
TMR
TOF
TOGGLE
TON
TP
```

FIG. 15B

| INPUT | FUNCTION | CAUSE | DESCRIPTION |
|---|---|---|---|
| LEVEL_1_HI | LVLALRM | | TRUE=FLUID LEVEL IN TANK 1 IS HIGH |
| LEVEL_2_HI | LVLALRM | | TRUE=FLUID LEVEL IN TANK 2 IS HIGH |
| LEVEL_3_HI | | ▶ ◀ | TRUE=FLUID LEVEL IN TANK 3 IS HIGH |
| LEVEL_4_HI | | | TRUE=FLUID LEVEL IN TANK 4 IS HIGH |
| LEVEL_5_HI | | ▶ | TRUE=FLUID LEVEL IN TANK 5 IS HIGH |

```
GT
LE
LT
LVLALRM
NE
NOT
OR
```

FIG. 15C

| | DESCRIPTION | EFFECT | FUNCTION | OUTPUT |
|---|---|---|---|---|
| E01 | LOW LEVEL ALARM INDICATOR FOR TANK 1 | | SHUTDOWN | UNIT 1 ALARM |
| E02 | LOW LEVEL ALARM INDICATOR FOR TANK 1 | | SHUTDOWN | UNIT 2 ALARM |
| E03 | LOW LEVEL ALARM INDICATOR FOR TANK 1 | | | UNIT 3 ALARM |
| E04 | LOW LEVEL ALARM INDICATOR FOR TANK 1 | | | UNIT 4 ALARM |
| E05 | LOW LEVEL ALARM INDICATOR FOR TANK 1 | | | UNIT 5 ALARM |

R_TRG
RS
SHUTDOWN
SR
TMR
TOF
TOGGLE

FIG. 17

| OUTPUT | FUNCTION | DESCRIPTION | COMMENTS | C01 | C03 | C04 | C05 |
|---|---|---|---|---|---|---|---|
| UNIT_5_DOWN / UNIT_5_ALARM | SHUTDOWN | SOUND ALARM AND START UNIT SHUTDOWN | E05 TURN ON LEVEL ALARM AFTER .5 SECS | | | | TON |
| UNIT_3_DOWN / UNIT_3_ALARM | SHUTDOWN | SOUND ALARM AND START UNIT SHUTDOWN | E03 TURN ON LEVEL ALARM AFTER .5 SECS | | TON | | |
| UNIT_2_DOWN / UNIT_2_ALARM | SHUTDOWN | SOUND ALARM AND START UNIT SHUTDOWN | E02 TURN ON LEVEL ALARM AFTER .5 SECS | | | | |
| UNIT_1_DOWN / UNIT_1_ALARM | SHUTDOWN | SOUND ALARM AND START UNIT SHUTDOWN | E01 TURN ON LEVEL ALARM AFTER .5 SECS | TON | | | |

| INPUT | FUNCTION | DESCRIPTION |
|---|---|---|
| LEVEL_1_HI / LEVEL_1_LOW | LVLALRM | TRUE=FLUID IN TANK 1 HAS REACHED THE MIN OR MAX ALLOWED LEVEL |
| LEVEL_3_HI / LEVEL_3_LOW | LVLALRM | TRUE=FLUID IN TANK 3 HAS REACHED THE MIN OR MAX ALLOWED LEVEL |
| LEVEL_4_HI / LEVEL_4_LOW | LVLALRM | TRUE=FLUID IN TANK 4 HAS REACHED THE MIN OR MAX ALLOWED LEVEL |
| LEVEL_5_HI / LEVEL_5_LOW | LVLALRM | TRUE=FLUID IN TANK 5 HAS REACHED THE MIN OR MAX ALLOWED LEVEL |

FIG. 21

| EFFECT | DESCRIPTION | | C01 | C02 | C03 | C04 | C05 | COMMENTS |
|---|---|---|---|---|---|---|---|---|
| UNIT_5_ALARM | HIGH LEVEL ALARM INDICATOR FOR TANK 5 | E05 | | | | | X | TURN ON ALARM IMMEDIATELY |
| UNIT_4_ALARM | HIGH LEVEL ALARM INDICATOR FOR TANK 4 | E04 | | | | X | | TURN ON ALARM IMMEDIATELY |
| UNIT_3_ALARM | HIGH LEVEL ALARM INDICATOR FOR TANK 3 | E03 | | | X | | | TURN ON ALARM IMMEDIATELY |
| UNIT_2_ALARM | HIGH LEVEL ALARM INDICATOR FOR TANK 2 | E02 | | X | | | | TURN ON ALARM IMMEDIATELY |
| UNIT_1_ALARM | HIGH LEVEL ALARM INDICATOR FOR TANK 1 | E01 | X | | | | | |
| CAUSE | DESCRIPTION | | C01 | C02 | C03 | C04 | C05 | |
| LEVEL_1_HI | TRUE=FLUID LEVEL IN TANK 1 IS HIGH | | | | | | | |
| LEVEL_2_HI | TRUE=FLUID LEVEL IN TANK 2 IS HIGH | | | | | | | |
| LEVEL_3_HI | TRUE=FLUID LEVEL IN TANK 3 IS HIGH | | | | | | | |
| LEVEL_4_HI | TRUE=FLUID LEVEL IN TANK 4 IS HIGH | | | | | | | |
| LEVEL_5_HI | TRUE=FLUID LEVEL IN TANK 5 IS HIGH | | | | | | | |

| LOC | TERMINAL | VAR NAME | VAR TYPE | DATA TYPE | TAGNAME | DESCRIPTION |
|---|---|---|---|---|---|---|
| C01 | | LEVEL_1_HI | VAR_INPUT | BOOL | | |
| C01 | | | | | | |

CAUSE HEADER ROW 01

LEVEL_1_HI → MOVE → C01B

FIG. 25

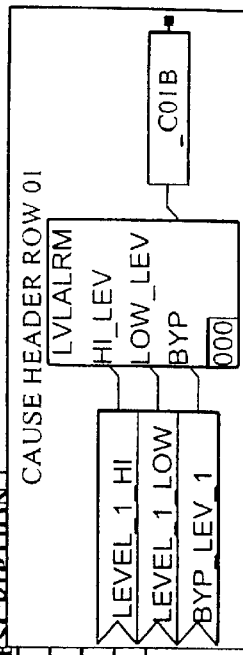

| INPUT | FUNCTION | CAUSE | | | | |
|---|---|---|---|---|---|---|
| | | | EFFECT | DESCRIPTION | | COMMENTS |
| | | | UNIT_1_ALARM | LOW LEVEL ALARM INDICATOR FOR TANK 1 | E01 | TURN ON LEVEL ALARM AFTER .5 SECS |
| | | | UNIT_2_ALARM | LOW LEVEL ALARM INDICATOR FOR TANK 2 | E02 | TURN ON LEVEL ALARM AFTER .5 SECS |
| | | | UNIT_3_ALARM | LOW LEVEL ALARM INDICATOR FOR TANK 3 | E03 | TURN ON LEVEL ALARM AFTER .5 SECS |
| | | | UNIT_4_ALARM | LOW LEVEL ALARM INDICATOR FOR TANK 4 | E04 | TURN ON LEVEL ALARM AFTER .5 SECS |
| | | | | | C01 | C02 | C03 | C04 |
| LEVEL_1_HI | LVLALRM | | TON | | | |
| LEVEL_1_LOW | LVLALRM | | | | | |
| LEVEL_2_HI | LVLALRM | | | TON | | |
| LEVEL_2_LOW | LVLALRM | | | | | |
| LEVEL_3_HI | LVLALRM | | | | TON | |
| LEVEL_3_LOW | LVLALRM | | | | | |
| LEVEL_4_HI | LVLALRM | | | | | TON |
| LEVEL_4_LOW | LVLALRM | | | | | |

| | DESCRIPTION | VAR TYPE | DATA TYPE | TAG NAME |
|---|---|---|---|---|
| | TRUE=FLUID IN TANK 1 HAS REACHED THE MIN OR MAX ALLOWED LEVEL | VAR_INPUT | BOOL | |
| | TRUE=FLUID IN TANK 2 HAS REACHED THE MIN OR MAX ALLOWED LEVEL | VAR_INPUT | BOOL | |
| | TRUE=FLUID IN TANK 3 HAS REACHED THE MIN OR MAX ALLOWED LEVEL | VAR_INPUT | BOOL | |
| | TRUE=FLUID IN TANK 4 HAS REACHED THE MIN OR MAX ALLOWED LEVEL | VAR_INPUT | BOOL | |

| LOC | TERMINAL | VAR NAME |
|---|---|---|
| C01 | HI_LEV | LEVEL_1_HI |
| C01 | LOW_LEV | LEVEL_1_LOW |
| C01 | BYP | BYP_LEV_1 |
| C01 | ET | |

FIG. 26

| INPUT | FUNCTION | CAUSE | DESCRIPTION | E01 | E02 | E03 | COMMENTS |
|---|---|---|---|---|---|---|---|
| LEVEL_1_HI | LVLALRM | CAUSE_STATE | TRUE=FLUID IN TANK 1 HAS REACHED THE MIN OR MAX ALLOWED LEVEL | C01 TON | | | TURN ON LEVEL ALARM AFTER .5 SECS |
| LEVEL_1_LOW | | | | | | | |
| LEVEL_2_HI | LVLALRM | CAUSE_STATE | TRUE=FLUID IN TANK 2 HAS REACHED THE MIN OR MAX ALLOWED LEVEL | C02 | TON | | TURN ON LEVEL ALARM AFTER .5 SECS |
| LEVEL_2_LOW | | | | | | | |
| LEVEL_3_HI | LVLALRM | CAUSE_STATE | TRUE=FLUID IN TANK 3 HAS REACHED THE MIN OR MAX ALLOWED LEVEL | C03 | | TON | TURN ON LEVEL ALARM AFTER .5 SECS |
| LEVEL_3_LOW | | | | | | | |

— 27

| LOC | TERMINAL | VAR NAME | VAR TYPE | DATA TYPE | TAG NAME |
|---|---|---|---|---|---|
| C01 | HI_LEV | LEVEL_1_HI | VAR_INPUT | BOOL | |
| C01 | LOW_LEV | LEVEL_1_LOW | VAR_INPUT | BOOL | |
| C01 | BYP | BYP_LEV_1 | VAR_INPUT | BOOL | |
| C01 | LVLALRM | CAUSE_STATE | | | |

— 28, 64

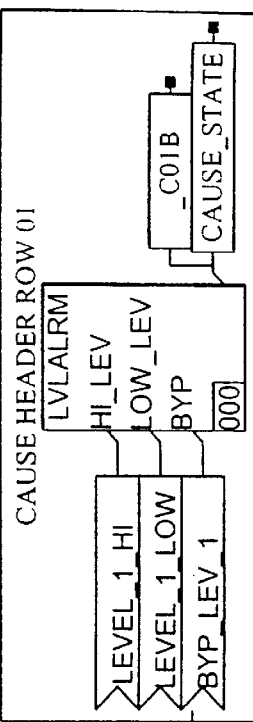

CAUSE HEADER ROW 01

FIG. 27

| INPUT | FUNCTION | CAUSE | | DESCRIPTION |
|---|---|---|---|---|
| LEVEL_1_HI | LVLALRM | CAUSE_STATE | | TRUE=FLUID IN TANK 1 HAS REACHED THE MIN OR MAX ALLOWED LEVEL |
| LEVEL_1_LOW | | | | |
| LEVEL_2_HI | LVLALRM | CAUSE_STATE | | TRUE=FLUID IN TANK 2 HAS REACHED THE MIN OR MAX ALLOWED LEVEL |
| LEVEL_2_LOW | | | | |

| OUTPUT | FUNCTION | EFFECT | DESCRIPTION | | | COMMENTS |
|---|---|---|---|---|---|---|
| UNIT_1_DOWN | SHUTDOWN | | SOUND ALARM AND START UNIT SHUTDOWN | E01 | TON | TURN ON LEVEL ALARM AFTER .5 SECS |
| UNIT_1_ALARM | | | | | | |
| UNIT_2_DOWN | SHUTDOWN | | SOUND ALARM AND START UNIT SHUTDOWN | E02 | TON | TURN ON LEVEL ALARM AFTER .5 SECS |
| UNIT_2_ALARM | | | | | | |

| | | | C01 | C02 |
|---|---|---|---|---|

| VAR NAME | VAR TYPE | DATA TYPE | TAG NAME | DESCRIPTION |
|---|---|---|---|---|
| UNIT_1_ALARM | VAR_OUTPUT | BOOL | | |
| UNIT_1_DOWN | VAR_OUTPUT | BOOL | | |

| LOC | TERMINAL |
|---|---|
| E01 | EFFECT |
| E01 | ALARM |
| E01 | STRT_SHUTDOWN |

EFFECT HEADER COL 01

E01F SHUTDOWN 000

| INPUT | FUNCTION | CAUSE | | OUTPUT | FUNCTION | EFFECT | | | COMMENTS |
|---|---|---|---|---|---|---|---|---|---|
| | | | | UNIT_2_DOWN | SHUTDOWN | SHARED_EFFECT | E02 | | TURN ON LEVEL ALARM AFTER .5 SECS |
| | | | | UNIT_2_ALARM | | | | TON | |
| LEVEL_1_HI | LVLALRM | CAUSE_STATE | | UNIT_1_DOWN | SHUTDOWN | SHARED_EFFECT | E01 | TON | TURN ON LEVEL ALARM AFTER .5 SECS |
| LEVEL_1_LOW | | | | UNIT_1_ALARM | | | | | |
| LEVEL_2_HI | LVLALRM | | C01 | | | | | | |
| LEVEL_2_LOW | | | C02 | | | | | | |

| VAR NAME | VAR TYPE | DATA TYPE | TAG NAME | DESCRIPTION |
|---|---|---|---|---|
| SHARED_EFFECT | VAR | BOOL | | |
| UNIT_1_ALARM | VAR_OUTPUT | BOOL | | TRUE=FLUID IN TANK 1 HAS REACHED THE MIN OR MAX ALLOWED LEVEL |
| UNIT_1_DOWN | VAR_OUTPUT | BOOL | | TRUE=FLUID IN TANK 2 HAS REACHED THE MIN OR MAX ALLOWED LEVEL |

EFFECT HEADER COL 01

| LOC | TERMINAL | |
|---|---|---|
| E01 | EFFECT | |
| E01 | ALARM | |
| E01 | STRT_SHUTDOWN | |

_E01F1_ SHUTDOWN — SHARED_EFFECT → UNIT_1_ALARM, UNIT_1_DOWN

FIG. 29

| LOCAL VARIABLE | LOCATION |
|---|---|
| ALRM_DLY | 01-C01B01 |
|  | 01-C02B02 |
|  | 01-C03B03 |
|  | 01-C04B04 |
|  | 01-C05B05 |

| INPUT VARIABLE | LOCATION |
|---|---|
| BYP_LEV_1 | 01-C01 |
| BYP_LEV_2 | 01-C02 |
| BYP_LEV_3 | 01-C03 |
| BYP_LEV_4 | 01-C04 |
| BYP_LEV_5 | 01-C05 |
| LEVEL_1_HI | 01-C01 |
| LEVEL_1_LOW | 01-C01 |
| LEVEL_2_HI | 01-C02 |
| LEVEL_2_LOW | 01-C02 |
| LEVEL_3_HI | 01-C03 |
| LEVEL_3_LOW | 01-C03 |
| LEVEL_4_HI | 01-C04 |
| LEVEL_4_LOW | 01-C04 |
| LEVEL_5_HI | 01-C05 |
| LEVEL_5_LOW | 01-C05 |

| OUTPUT VARIABLE | LOCATION |
|---|---|
| UNIT_1_ALARM | 01-B01 |
| UNIT_1_DOWN | 01-B01 |
| UNIT_2_ALARM | 01-B02 |
| UNIT_2_DOWN | 01-B02 |
| UNIT_3_ALARM | 01-B03 |
| UNIT_3_DOWN | 01-B03 |
| UNIT_4_ALARM | 01-B04 |
| UNIT_4_DOWN | 01-B04 |
| UNIT_5_ALARM | 01-B05 |
| UNIT_5_DOWN | 01-B05 |

FIG. 30A

| Function Name | Description |
|---|---|
| ABS | ABSOLUTE VALUE |
| ACOS | ARC COSINE |
| ADD | ADD |
| AND | BITWISE AND |
| ASIN | ARC SINE |
| ATAN | ARC TANGENT |
| BOOL_TO_DWORD | CONVERT TYPE BOOL TO TYPE DWORD |
| CEIL | CEILING |
| CONCAT_DT | CONCATENATE DATE AND TIME |
| COS | COSINE |
| CTD | DOWN COUNTER |
| CTU | UP COUNTER |
| CTUD | UP-DOWN COUNTER |
| DINT_TO_DWORD | CONVERT TYPE DINT TO TYPE DWORD |
| DINT_TO_INT | CONVERT TYPE DINT TO TYPE INT |
| DINT_TO_LREAL | CONVERT TYPE DINT TO TYPE LREAL |
| DINT_TO_REAL | CONVERT TYPE DINT TO TYPE REAL |
| DIV | DIVIDE |
| DT_TO_DATE | EXTRACT DATE FROM DATE AND TIME OF DAY |
| DT_TO_TOD | EXTRACT TIME OF DAY FROM DATE AND TIME OF DAY |
| DWORD_TO_BOOL | CONVERT TYPE DWORD TO TYPE BOOL |
| DWORD_TO_DINT | CONVERT TYPE DWORD TO TYPE DINT |
| EQ | EQUAL |
| EXP | EXPONENTIAL |
| EXPT | POWER |
| F_TRIG | FALLING EDGE DETECTOR |
| FLOOR | FLOOR (LOWEST INTEGER IN REAL NUMBER) |
| GE | GREATER THAN OR EQUAL |
| GT | GREATER THAN |
| INT_TO_DINT | CONVERT TYPE INT TO TYPE DINT |
| INT_TO_LREAL | CONVERT TYPE INT TO TYPE LREAL |
| INT_TO_REAL | CONVERT TYPE INT TO TYPE REAL |
| LE | LESS THAN OR EQUAL |
| LIMIT | LIMIT |
| LN | NATURAL LOGARITHM |

FIG. 30B

| Function Name | DESCRIPTION |
|---|---|
| LOG | BASE TEN LOGARITHM |
| LREAL_TO_DINT | CONVERT TYPE LREAL TO TYPE DINT |
| LREAL_TO_INT | CONVERT TYPE LREAL TO TYPE INT |
| LREAL_TO_REAL | CONVERT TYPE LREAL TO TYPE REAL |
| LT | LESS THAN |
| MAX | MAXIMUM VALUE |
| MEDSEL | SELECT MEDIAN VALUE |
| MIN | MINIMUM VALUE |
| MOD | MODULO |
| MOVE | ASSIGNMENT |
| MUL | MULTIPLY |
| MUX | MULTIPLEX |
| NE | NOT EQUAL |
| NOT | BITWISE COMPLEMENT |
| NUMBITS | NUMBER OF INPUTS THAT ARE TRUE (1) |
| NUMBITS_DWORD | COUNT NUMBER OF 1 BITS IN DWORD |
| OR | BITWISE INCLUSIVE OR |
| R_TRIG | RISING EDGE DETECTOR |
| REAL_TO_DINT | CONVERT TYPE REAL TO TYPE DINT |
| REAL_TO_INT | CONVERT TYPE REAL TO TYPE INT |
| REAL_TO_LREAL | CONVERT TYPE REAL TO TYPE LREAL |
| REPORT_BAD_PARAM | REPORT A BAD PARAMETER ERROR AND CLEAR ENO |
| ROL | ROTATE LEFT |
| ROR | ROTATE RIGHT |
| RS | RESET DOMINANT BISTABLE FUNCTION BLOCK (LATCH) |
| RTC | REAL TIME CLOCK |
| SEL | SELECT |
| SHL | SHIFT LEFT |
| SHR | SHIFT RIGHT |
| SIN | SINE |
| SQRT | SQUARE ROOT |
| SR | SET DOMINANT BISTABLE FUNCTION BLOCK (LATCH) |
| SUB | SUBTRACT |
| TAN | TANGENT |
| TIME_TO_SECS | CONVERT TYPE TIME TO TYPE LREAL SECONDS |
| TOF | TIMER OFF |
| TON | TIMER ON |
| TP | PULSE |
| TRUNC_LREAL_TO_DINT | TRUNCATE TYPE LREAL TO TYPE DINT |

FIG. 30C

| Function Name | DESCRIPTION |
|---|---|
| AIN | CONVERTS ANALOG INPUT TO REAL VALUE |
| AOUT | CONVERTS REAL VALUE TO ANALOG OUTPUT VALUE |
| BLINK | BLINK |
| CHK_ERR | GETS RUNTIME ERROR FLAGS |
| CLR_ERR | CLEARS RUNTIME ERROR STATUS |
| CSCHED | SCHEDULES EXECUTION AFTER A SPECIFIED NUMBER OF SCANS |
| EXPFLTR | EXPONENTIAL FILTER OF INPUT VALUE |
| GASDETR | PROCESSES GAS DETECTOR INPUTS AND GENERATES ALARMS |
| GATDIS | GATE DISABLE–CLOSES GATE OPENED BY GATENB |
| GATENB | GATE ENABLE–OPENS GATE FOR EXTERNAL HOST WRITES TO TRICON ALIASED VARIABLES |
| INTGTOR | PERFORMS INTEGRATION OF INPUT VALUE |
| LEADLAG | PROVIDES LEAD-LAG COMPENSATION |
| LINEMNTR | LINE MONITOR–MONITORS ANALOG CURRENT LOOP |
| LOOPDETR | PROCESSES LOOP DETECTOR INPUTS AND GENERATES ALARMS |
| OVDDISABLE | DISABLES OUTPUT VOTER DIAGNOSTICS |
| OVDENABLE | ENABLES OUTPOUT VOTER DIAGNOSTICS |
| PACK16 | PACKS 16 BITS INTO AN INTEGER |
| PAGE_EJECT | EJECTS PAPER TO TOP OF NEXT PAGE |
| PERDEV | PERCENT DEVIATION–COMPUTES PERCENT OF DIFFERENCE |
| PID | PROPORTIONAL INTEGRAL DERIVATIVE CONTROL |
| POLY4 | POLYNOMIAL WITH 4 COEFFICIENTS |
| POLY5 | POLYNOMIAL WITH 5 COEFFICIENTS |
| PRINT_BOOL | PRINTS BOOLEAN VALUE–OFF IF 0 AND ON IF 1 |
| PRINT_CDT | PRINTS CURRENT DATE AND TIME |
| PRINT_CRLF | PRINTS CARRIAGE RETURN AND LINE FEED |
| PRINT_CTOD | PRINTS CURRENT TIME OF DAY |
| PRINT_DINT | PRINTS DOUBLE INTEGER VALUE UP TO EIGHT CHARACTERS |
| PRINT_REAL | PRINTS REAL VALUE UP TO EIGHT CHARACTERS |
| PRINT_STRING | PRINTS STRING OF TEXT |
| PRNTR_FLUSH | CLEARS THE SPECIFIED PRINTER PORT BUFFER |
| SCALE | RESCALES AN INPUT VALUE |

| Function Name | Description |
| --- | --- |
| TOGGLE | Toggle |
| TON | Timer on |
| TP | Pulse |
| TR_CALENDAR | Gets calendar values from TSX |
| TR_CHASSIS_STATUS | Gets chassis information from TSX |
| TR_MP_STATUS | Gets main processor information from TSX |
| TR_PEER_STATUS | Gets peer-to-peer information from TSX |
| TR_POINT_STATUS | Gets point information from TSX |
| TR_PORT_STATUS | Gets communication port information from TSX |
| TR_SCAN_STATUS | Gets scan information from TSX |
| TR_SLOT_STATUS | Gets slot information from TSX |
| TSCHED | Schedules execution at specified time interval |
| UNPACK16 | Unpacks a 32-bit word into 16 bits |
| X_OF_N | Decides if X of N measurements exceed specified limit |

FIGURE 30D

CAUSE EFFECT DIAGRAM PROGRAM

CROSS REFERENCE TO RELATED APPLICATIONS

This application claims the benefit of U.S. Provisional Application No. 60/113,568, filed Dec. 23, 1998 pending.

BACKGROUND OF THE INVENTION

1. Field of the Invention

This invention relates generally to visual programming systems and the conversion of such systems to intermediate or executable code. More particularly, this invention relates to a cause effect matrix format used to analyze functions in programming systems which is then used to generate other visual program elements such as Functional Block Diagrams, Structured Text or Ladder logic which is compiled into executable code.

2. Description of the Related Art

Cause effect matrix (CEM) diagrams have been prepared for many years, and are used to develop a logic system which is placed into a cause and effect diagram in a readable matrix format. Software programs have been developed to evaluate functional block diagrams and generate cause and effect diagrams for audit purposes. Most notable of these is the Trebelex Program which operates under Microsoft Word's DOS system. Trebelex is a manual diagramming tool that is primarily used to translate product logic to a paper format to provide to a vendor for creation of the system or for audit purposes. These technologies audit the functional block in order to conduct a hazardous operation review of the underlying control system. The logic diagrams as shown in the paper CEM diagram are also used as a specification to edit or implement the control system. The logic diagrams as shown in the paper CEM diagram are also used as a specification to edit or implement the control program in a Function Block diagram, Structured Text or Ladder Logic or other programming development language well-known in the art.

The instant invention is a visual programming system which permits the user to define a cause effect matrix which is then converted into a complete function block diagram which is then compiled as known in the art.

SUMMARY OF THE INVENTION

As noted above, CEM is a commonly used documentation methodology which allows the logical association of a problem in process with one or more actions that must be taken to correct the problem. The problem is identified as a cause and the action is known as an effect. In a typical CEM, a cause is represented by a row in the matrix and an effect is represented by a column. While any arrangement may be used, it is this arrangement that is commonly used as the documentation for a safety system. The cause effect matrix is used to identify the program logic which is to be implemented by a programmer into either a functional block diagram, a ladder diagram or other intermediate code systems.

The instant invention generates a cause effect matrix diagram to create a control program through utilizing the cause effect matrix as a user interface input device. The completed cause effect matrix is then converted to functional block diagram code which is a standard IEC 1131-3 language and downloaded into the safety controllers after being compiled into executable code for the target control system programmable processor or programmable controller. The instant invention changes the cause effect matrix diagram from a documentation and audit tool to a visual programming interface. In fact, the function block diagram is converted to structured text which is compiled into an intermediate code and then is compiled into the native executable code for the Motorola processor MPC-860. The automation of the CEM to functional block elements permits additional capability by allowing up to 9 different actions based on up to 9 effects and a computational capability at the intersection point of the cause and effect diagram. Because special functions may be included, the result of the particular cause input may be used to generate timing considerations or other computations before initiating the effect.

As noted above, the CEM is a traditional methodology used throughout the process control industry to define emergency shut down (ESD) strategies. Once this system is defined, the CEM is used by a safety engineer as a specification for implementing an ESD program in Function Block Diagram (FBD), Structured Text (ST) or Ladder Diagram (LD) languages. However, this method is time consuming and subject to errors caused by misinterpretation of CEM which serves as the specification or inaccurate coding between that which is specified by the CEM and implementation into FBD program or an LD language. The instant invention is implemented on a personal computer having memory and storage medium and the system developed is ultimately downloaded to a separate safety system upon compilation of the code. The CEM system is a program development system which allows a safety engineer to define a CEM and to automatically generate a FBD program from the CEM as defined and to test the result. The features of the instant invention include: invocation of predefined and user defined functions and function blocks for evaluation of cause and effect data; the ability to utilize up to 99 cause rows and 99 effect columns and a maximum of 1,000 active intersections in the cause effect matrix; the use of the FBD as an intermediate language and the use of the CEM program instances in conjunction with FBD or LD program instances; instant view monitoring with active causes, intersections and effects; and the ability to designate or name specific sets of causes and effects in different views.

BRIEF DESCRIPTION OF THE DRAWINGS

FIGS. 4A–4B are an overall flowchart of the CEM system.

FIGS. 7A–7F are a flow chart of the generation of the CEM display.

FIGS. 8A–8D are a flow chart of the Cursor Edit function of the system.

FIG. 11 is a screen view of a completed basic CEM diagram.

FIG. 12 is a simulated screen view of a completed CEM diagram with functional intersection cells.

FIGS. 15A–15C are a simulated screen view of the function drop down menu for insertion of functions into intersections.

FIG. 17 is a simulated screen view of the hiding of rows and columns and hiding Cause and Effect header cells.

FIG. 21 is a completed basic CEM.

FIG. 25 is a completed CEM diagram showing a blank Variable name cell for LVLALRM and dual inputs.

FIG. 26 is a partial screen view of the CEM, the VDT and the FBD showing dual variable inputs and the naming of the LVLALRM Terminal and additional variable in the FBD.

FIG. 27 is a simulated view of the CEM, the VDT and the FBD with dual variable outputs.

FIG. 28 is a simulated screen view of CEM, the VDT and the FBD showing the insertion of a named variable in place of an internal variable.

FIG. 29 is a report listing showing where used information for the variables.

FIGS. 30A–30D are tables of the Standard Library and TRICON Library Functions.

DESCRIPTION OF THE PREFERRED EMBODIMENT(S)

Figure 1:
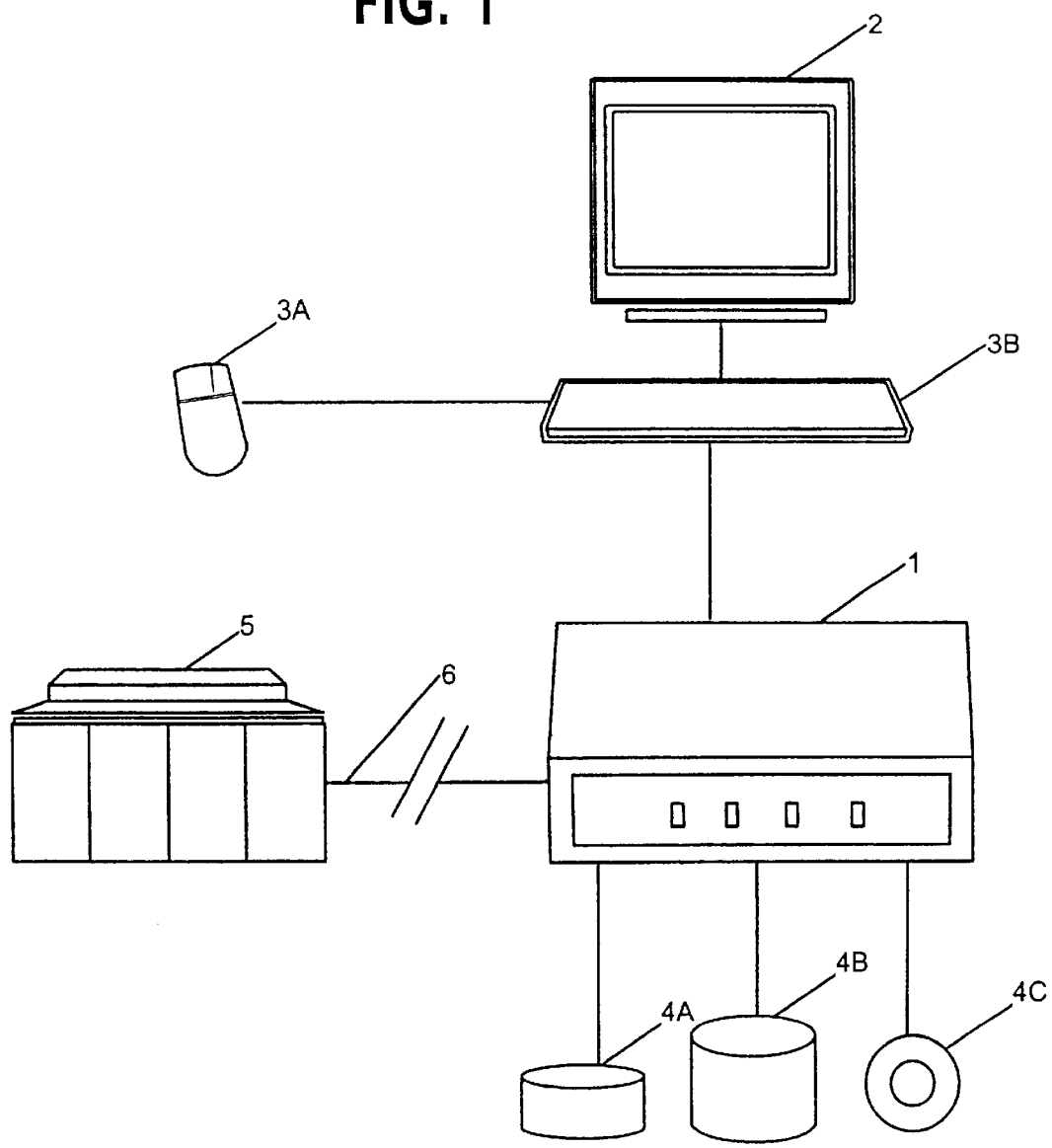
FIG. 1 is a view of the overall safety system hardware diagram showing an illustrative PC coupled to a Safety Controller.

Referring now to the drawings, FIG. 1 shows a personal computer system 1, with a monitor 2, a mouse 3A and a keyboard input 3B. The computer system 1 includes computer readable memory (both internal to the system and not shown) and a floppy diskette drive 4A, a fixed disk storage drive, 4B and a CD ROM drive 4C. The computer system is connected to a safety system 5 over a communications link 6. Once code is tested and compiled into executable code for the microprocessor of the target safety system, it is downloaded over the communications link 6 to the safety system 5, in the preferred case, a TRICON triple redundant safety control system manufactured by Triconex Corporation. The CEM programming system implemented on computer system 1, is also provided by Triconex Corporation on a Triconex TRISTATION 1131 PC which is used to develop safety system programs. Although virtually any computer system may be used for CEM development, the preferred minimum system requirements are as follows:

a. Windows NT™ certified personal computer
b. Pentium™ 100 MHZ processor
c. Microsoft Windows NT™ Version 4.0 (Service Pack 3)
d. 32 MB RAM
e. CD-ROM
f. 100 MB free space on hard drive
g. VGA Monitor 15 inch 800×600 resolution—16 colors, 17-inch at 1024×768 resolution—65535 colors
h. 3.5 inch high density 1.44 MB floppy diskette drive.

The computer system 1, includes a Developer's Workbench which permits developers to use any of three IEC 1131-3 compliant standard programming languages, IEC 1131-3 Standard, Programmable Control specification. These are the Function Block Diagram (FBD), Structured Text (ST) and Ladder Diagram (LD) programming languages. The TRISTATION 1131 has provided these programming platforms for several years and is used around the world.

FBD is a graphically oriented language that creates program logic that is analogous to circuit diagrams. Project elements in function block diagrams appear as blocks that are wired together to form circuits. Wires communicate data between elements in function block diagrams. Groups of interconnected elements are known as networks. A function block diagram may contain one or more networks.

LD is a graphically oriented language that uses a standard set of symbols to represent relay ladder logic. Elements in ladder diagrams are primarily coils and contacts connected by links. Links transfer only Boolean data between LD symbols (thereby differentiating them from wires used in FBD). This flow is consistent with the power flow characteristics of relay logic. Function blocks and function elements may also be used in LD diagrams, as long as they have at least one Boolean input and one Boolean output to facilitate Boolean data flow. Like FBD, LD allows interconnected elements to be grouped into networks.

ST is a high-level programming language, similar to PASCAL and C language. ST allows the creation of Boolean and arithmetic expressions, and structured programming constructs, such a conditional statements (IF . . . THEN . . . ELSE). Functions and function blocks can be invoked in ST. ST is principally used to implement complicated procedures not easily expressed in graphical languages like FBD or LD.

Figure 2:
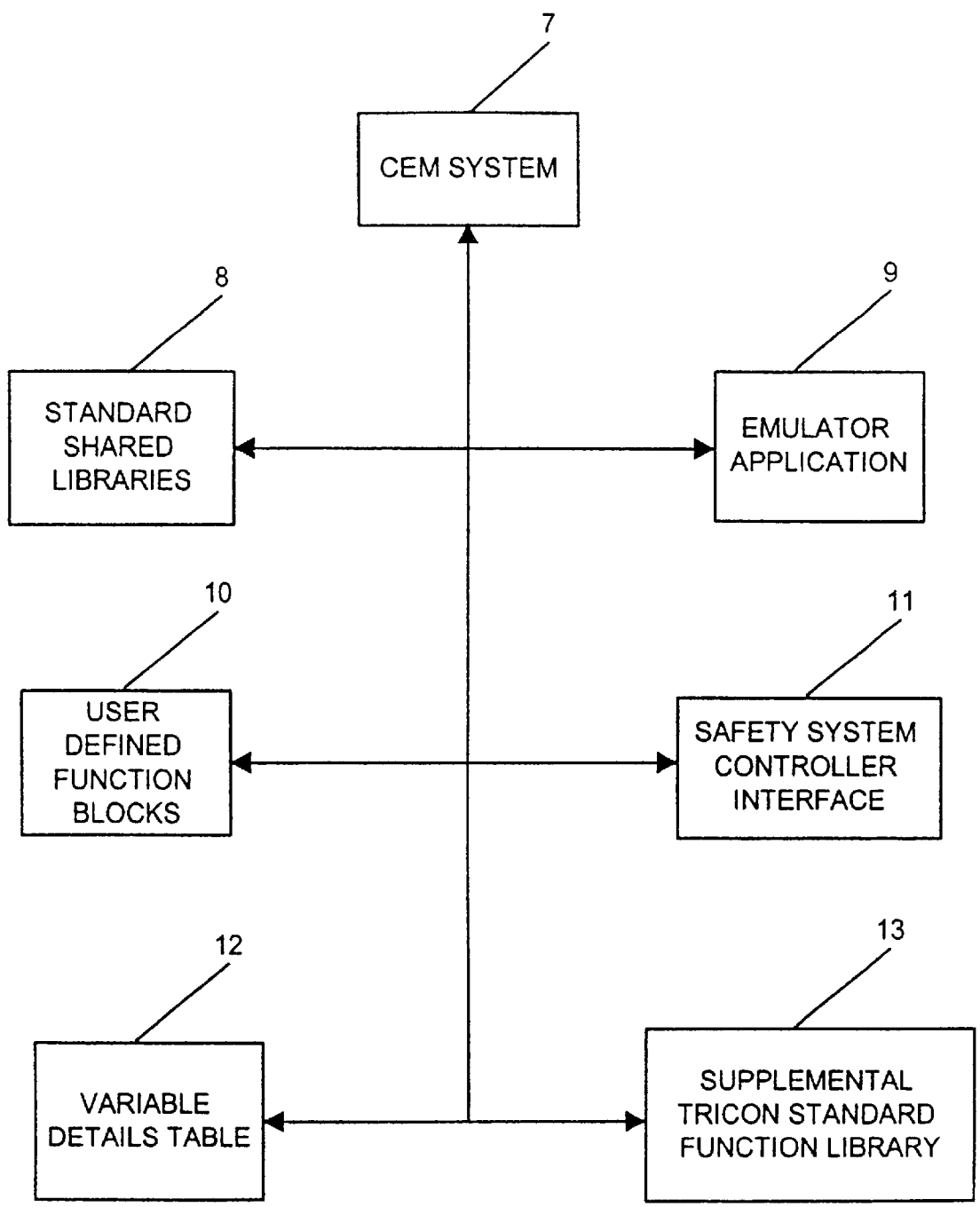
FIG. 2 is a system block diagram of the CEM system and its resources.

Also included with the TriStation is a library of Functional block Code as defined by international specifications. FIG. 2 shows the CEM system 7, communicating with Standard Shared Libraries 8, as defined in IEC 1131-3 Standard, Programmable Control specification which is incorporated herein by reference, user defined function blocks 10, an emulator application 9 for testing the resulting program and the safety system controller interface 11 of the safety system 5. Also in communication with the CEM is a TRICON defined library 13 (although the system will operate in accordance with the International Standard functions alone) and a variable details table 12 in which to store variable data.

Figure 3:
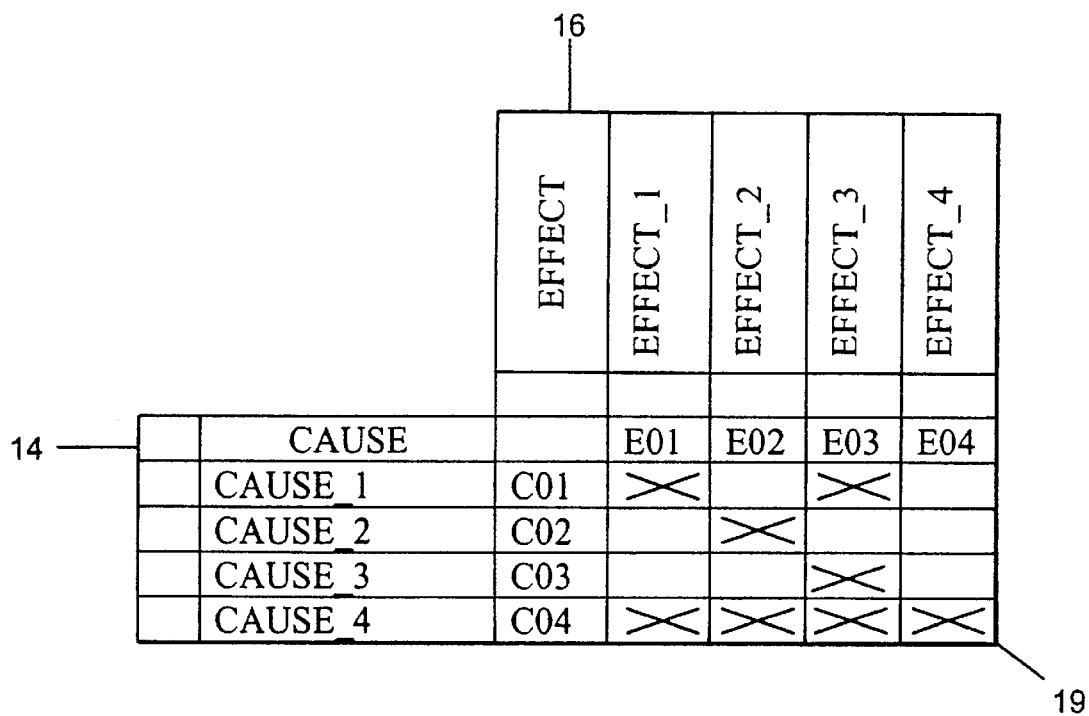
FIG. 3 is a view of a typical CEM specification diagram.

Referring to FIG. 3, the typical CEM is shown having a Cause row header 14, an Effect column header 16 and intersection cells 19. An "X" is used at the intersection of a cause row and an effect column to establish a relationship or link between an associated cause and an associated effect as shown in FIG. 3.

In the example of FIG. 3, CAUSE_1 (CO1) is linked with EFFECT_1 and EFFECT_3 (E01 and E03, respectively)

by the indication of an X at intersection CO1EO1, and an X at intersection CO1EO3 in the event CAUSE_1 is TRUE, and EFFECT_1 and EFFECT_3 are TRUE. Similarly, CAUSE_2, (CO2) is linked with EFFECT_2, (E02) by an X at intersection C02E02 when CAUSE_2 is TRUE and EFFECT_2 is TRUE. The CEM of FIG. 3 is usually mechanically drawn on graph paper or developed with non-interactive spread sheet type programs in order to document the control system desired. These specification CEM diagrams are frequently used for designing control and safety applications like fire and gas systems for which the programming logic is simple, but the volume of inputs and outputs which need to be controlled is very high.

Because the instant invention is based on a traditional methodology for the development of documentation, it is readily understood by a broad range of plant personnel from process control engineers to maintenance operators. The instant invention expands the functionality of the original cause effect matrix technique by providing a computer based cause and effect diagram which interactively generates the underlying program and permits the expansion of the matrix to allow more complex logic.

Overview

Figure 4A:
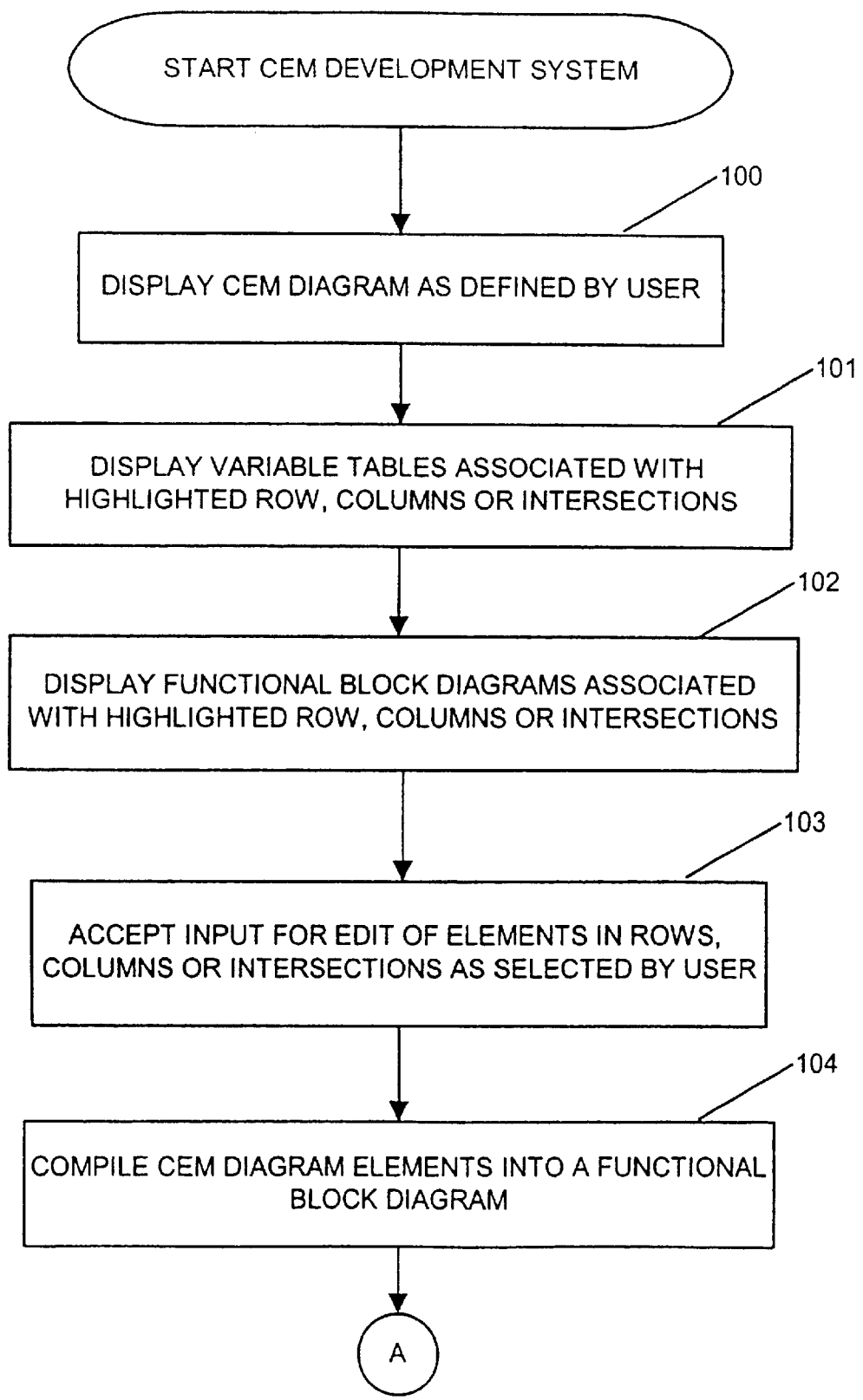

The CEM development process overview is shown in FIGS. 4A–4B. The CEM development commences with the display of the CEM diagram, step 100, based on default values which may be selected by the user. In addition to the CEM display, the system also displays the contents of a Variable Details Table (VDT), step 101 based on the variables related to the cause, intersection, or effect variables indicated by the existing position of the cursor. Also displayed is a graphical representation of a function block in a Function Block Diagram (FBD), step 102, which is also based on the cause, intersection, or effect variables indicated by the existing position of the cursor linked to any function with which they are associated. The user may then input data or modify data in any of the cells of the CEM, Variable Details Table, or the Function Block Diagram, or even create new function blocks, step 103. The term cell is used to identify various editable or display data elements or fields on the display. Information input into these cells are stored in a data structure along with related information such as location, data type, etc. After completion of data entry into the various cells, the CEM diagram is compiled into one of the standard programming code languages, step 104. This can be either FBD, LD or ST.

As shown in FIG. 4B, the standard code is further compiled into an intermediate code, step 105, which can be emulated on the TriStation 1131 for testing purposes, step 106. On successful completion of the test procedure, the intermediate code is compiled into executable code for the target safety system, step 107. Currently the preferred target system is the TRICON triple redundant safety system which is commercially available throughout the world from Triconex. After the code is compiled into executable code, it is downloaded to the target safety system, step 108.

Detailed Flow

Figure 5A:
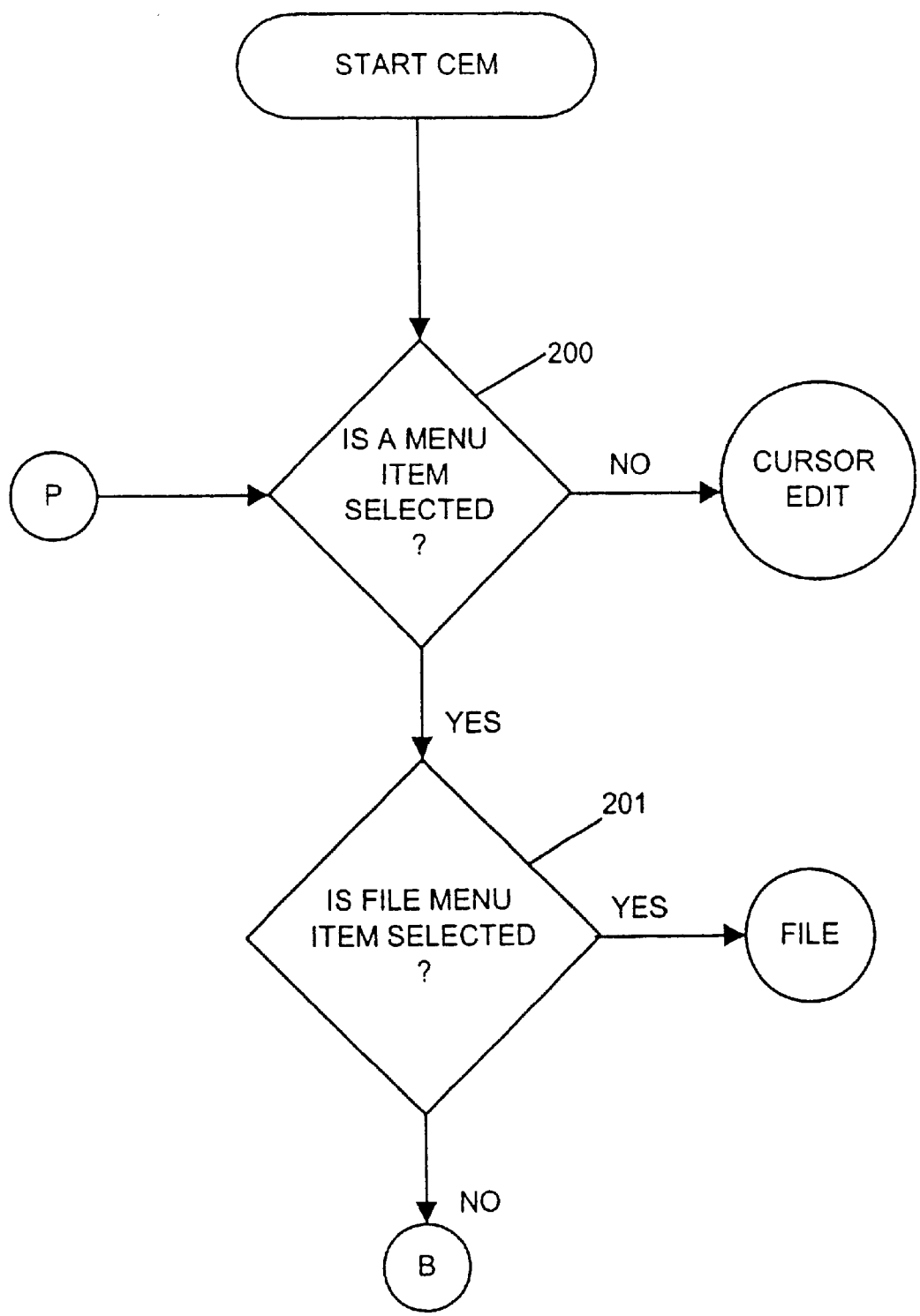
FIGS. 5A–5X are a detailed flow chart of the CEM system.
Figure 5B:
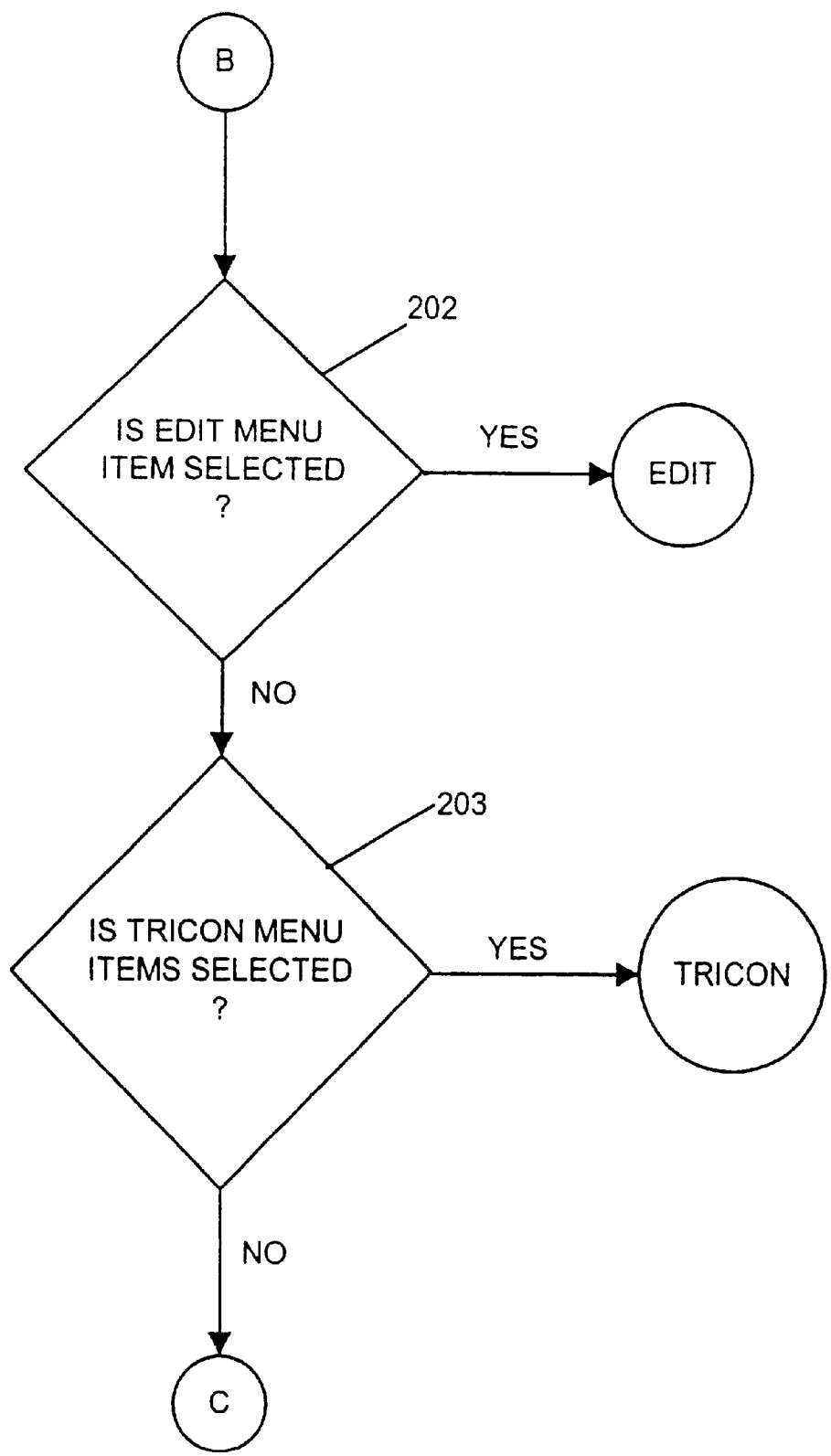
Figure 5C:
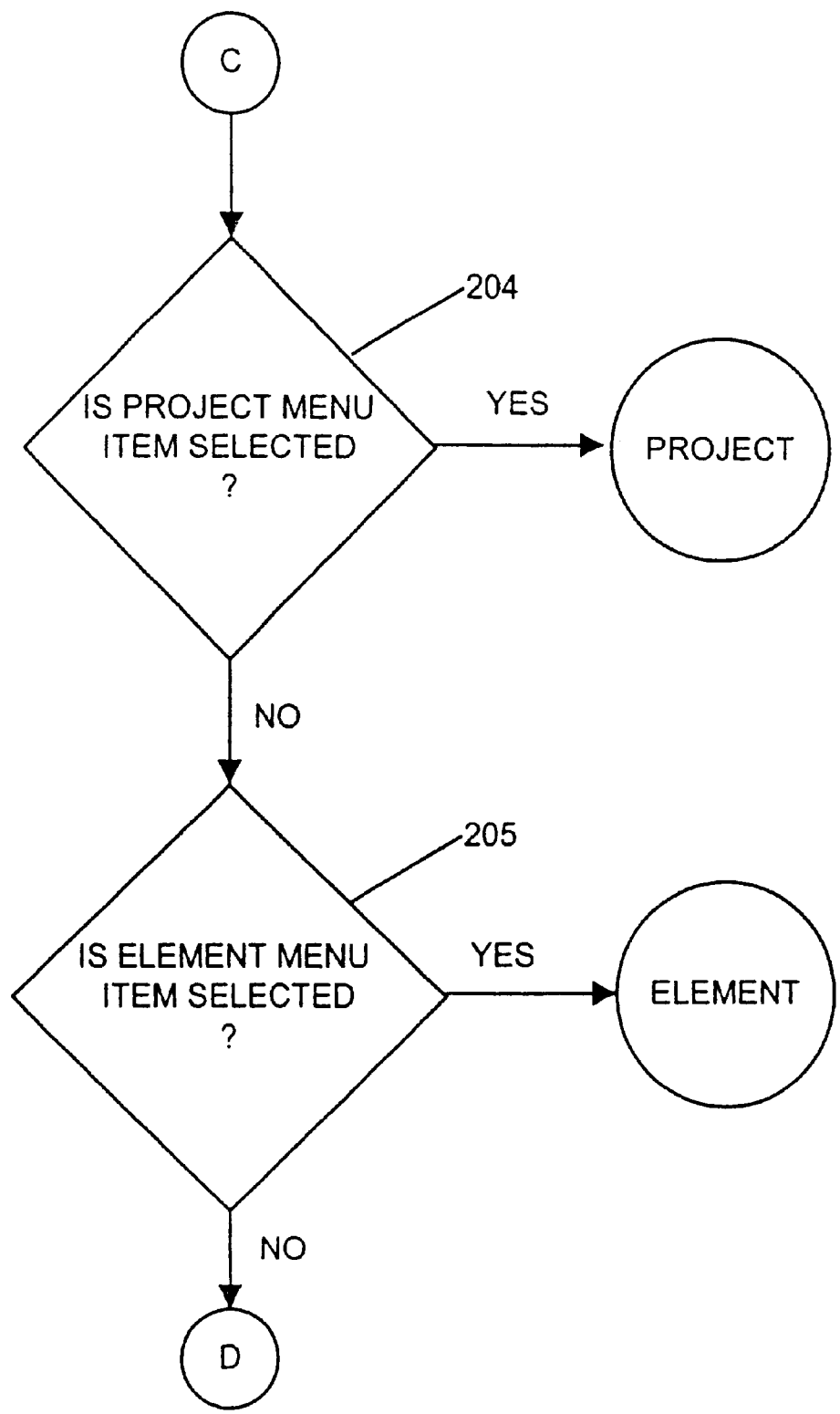
Figure 5D:
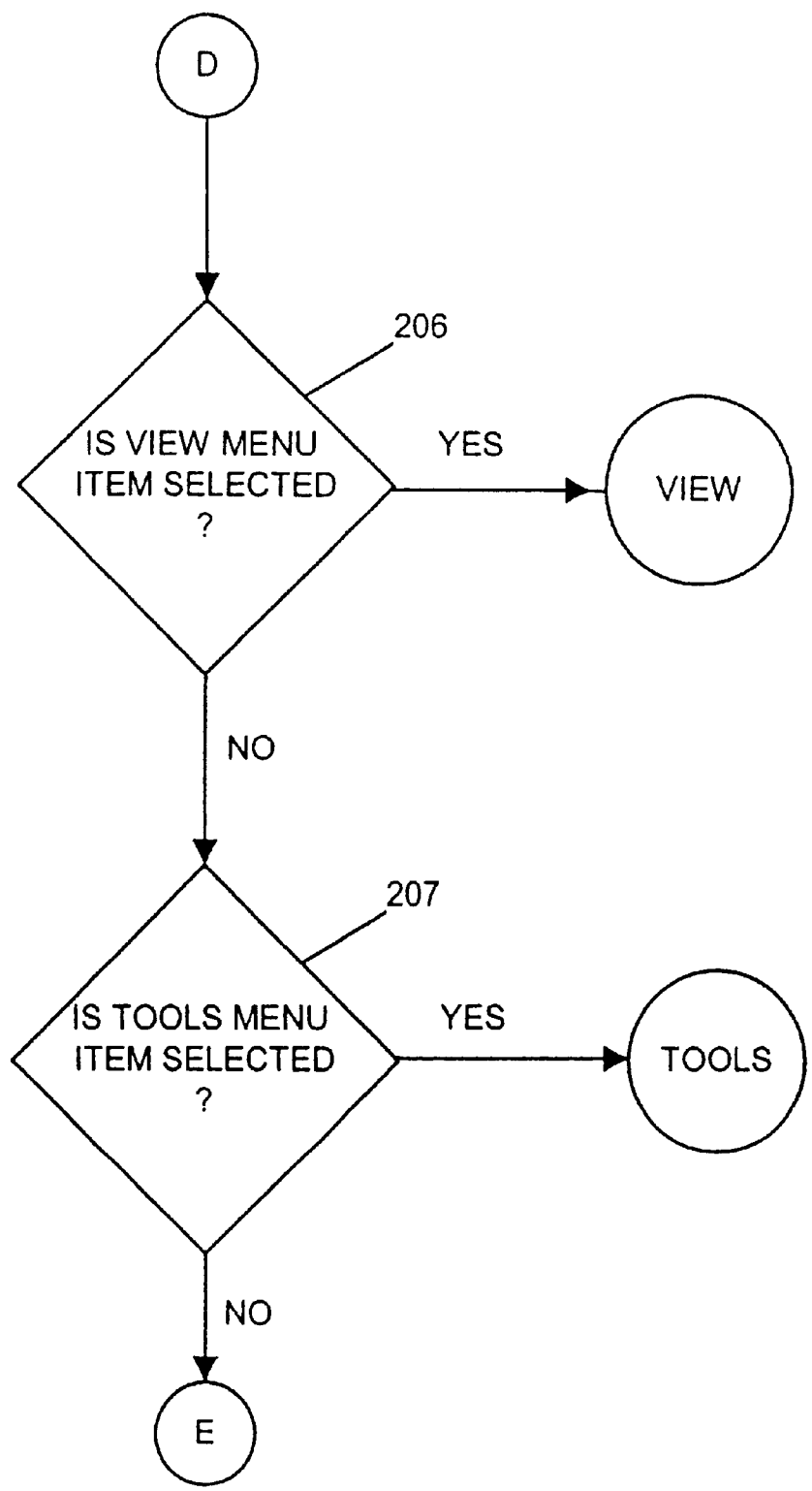
Figure 5E:
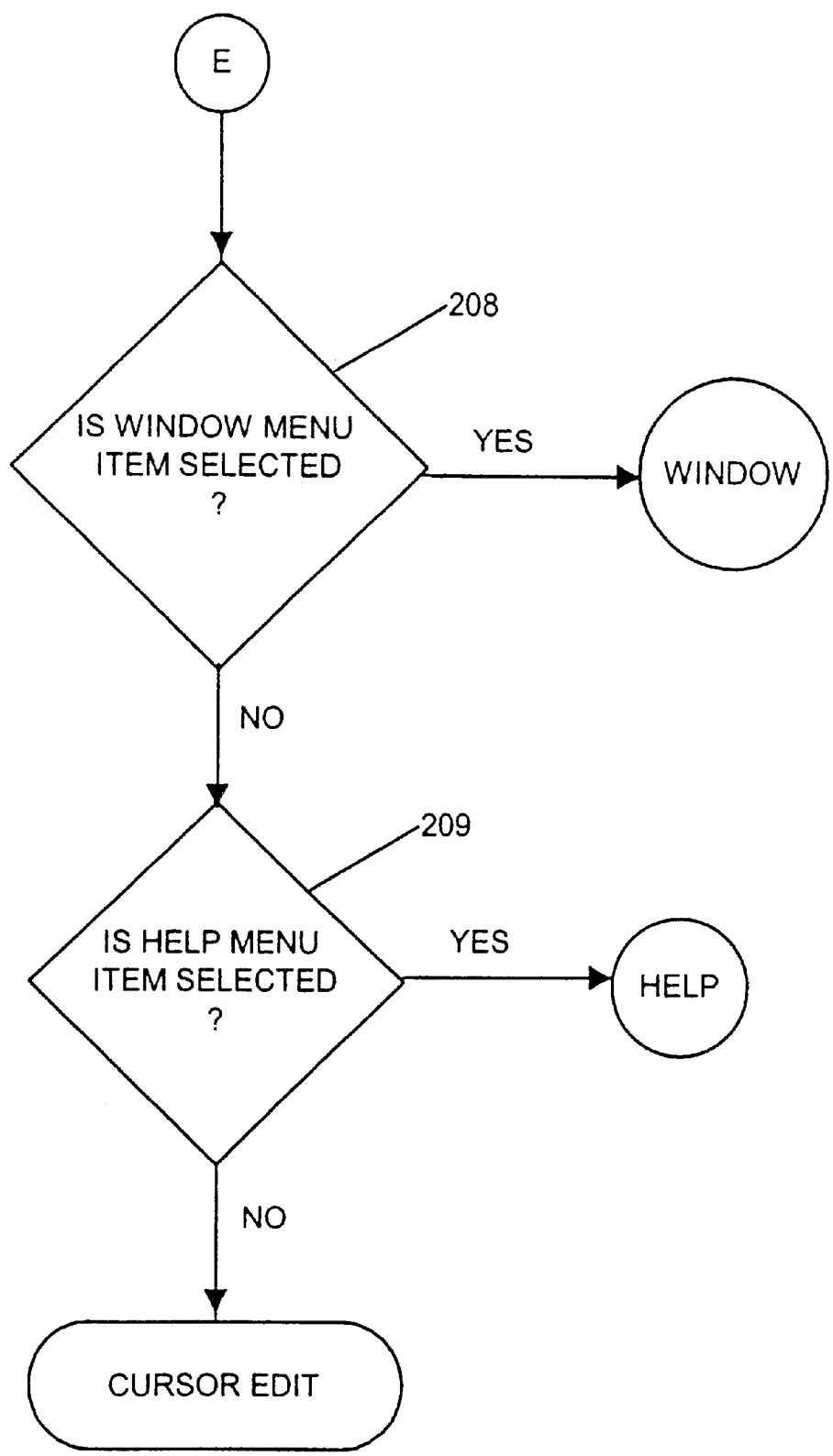
Figure 5F:
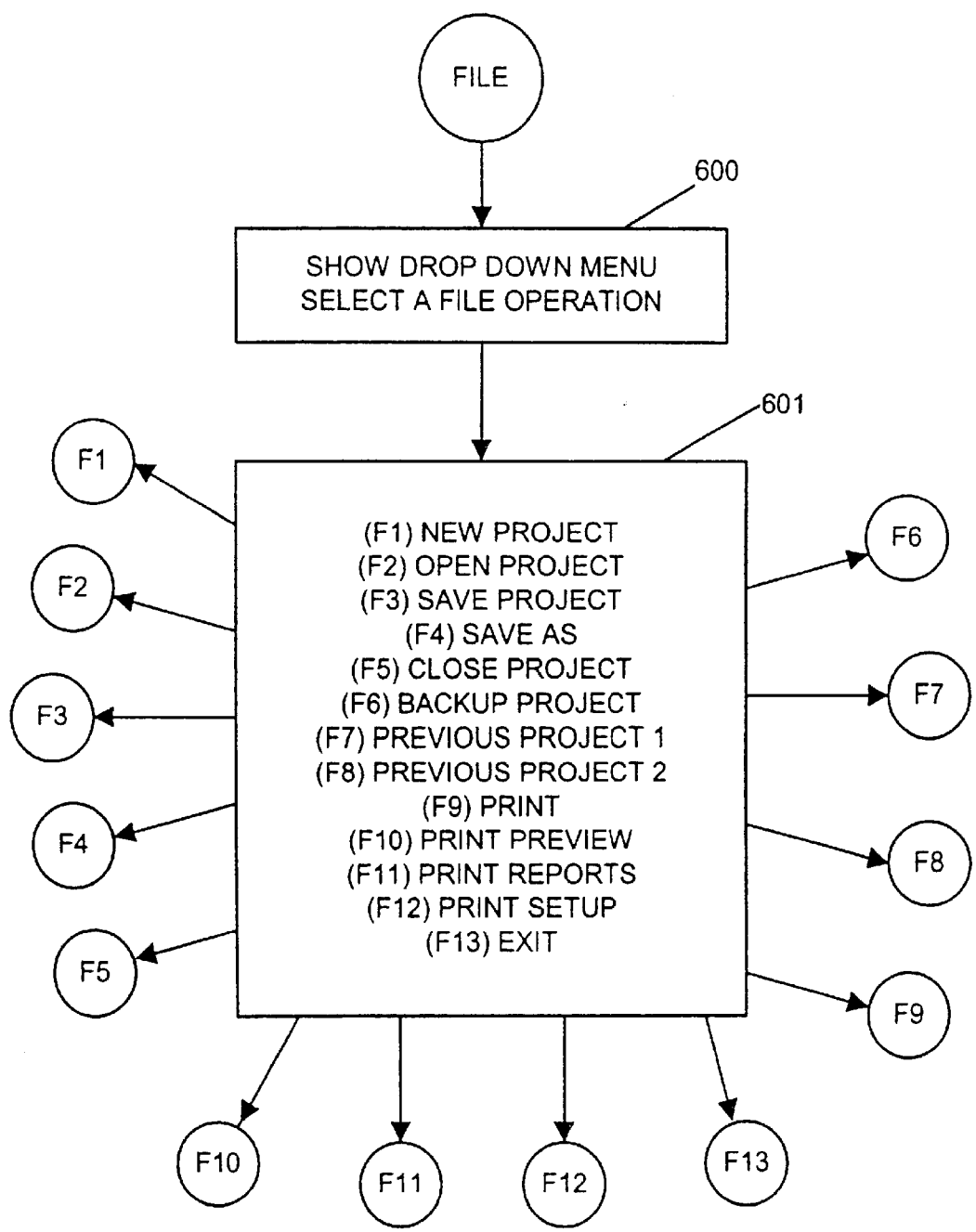
Figure 5G:
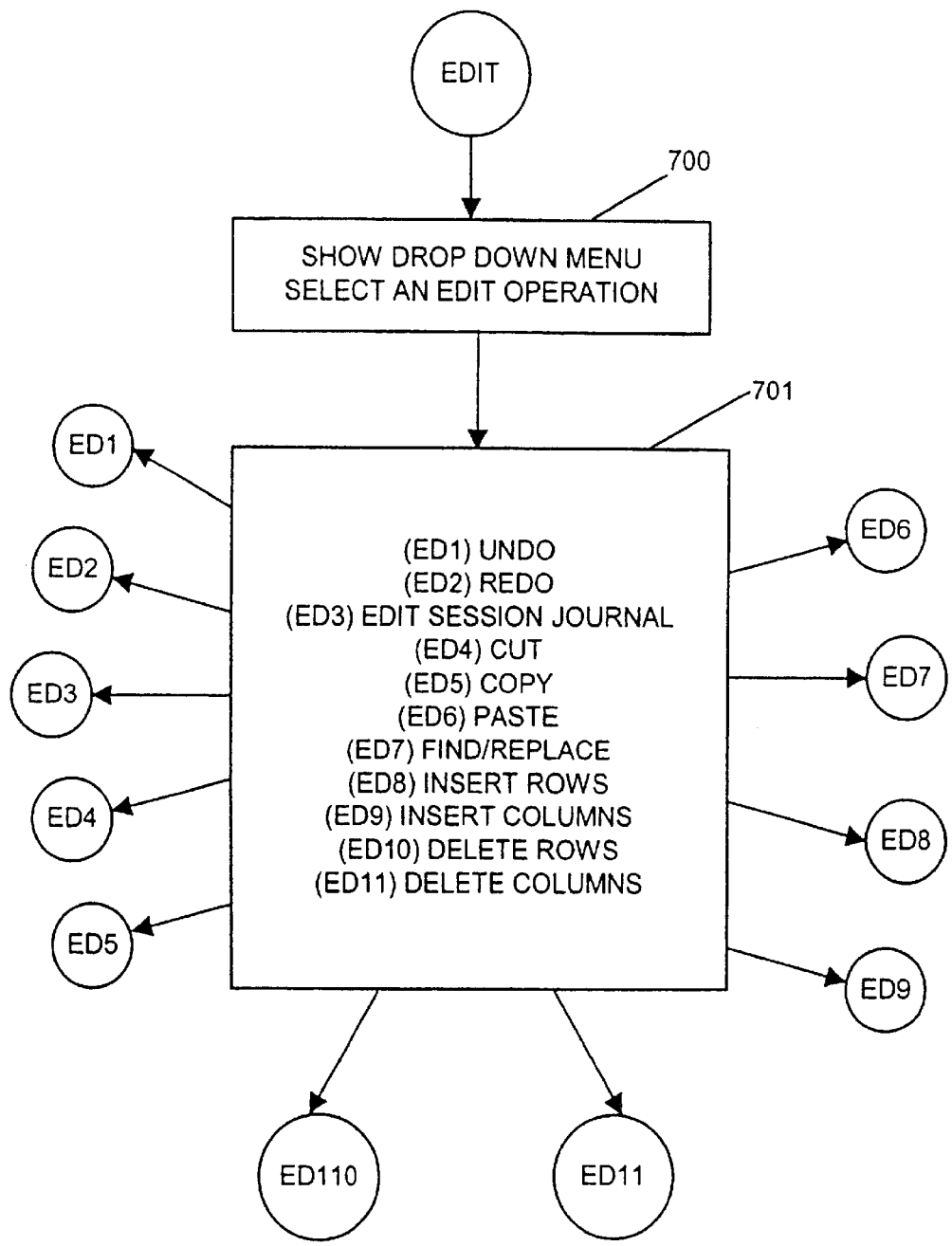
Figure 5H:
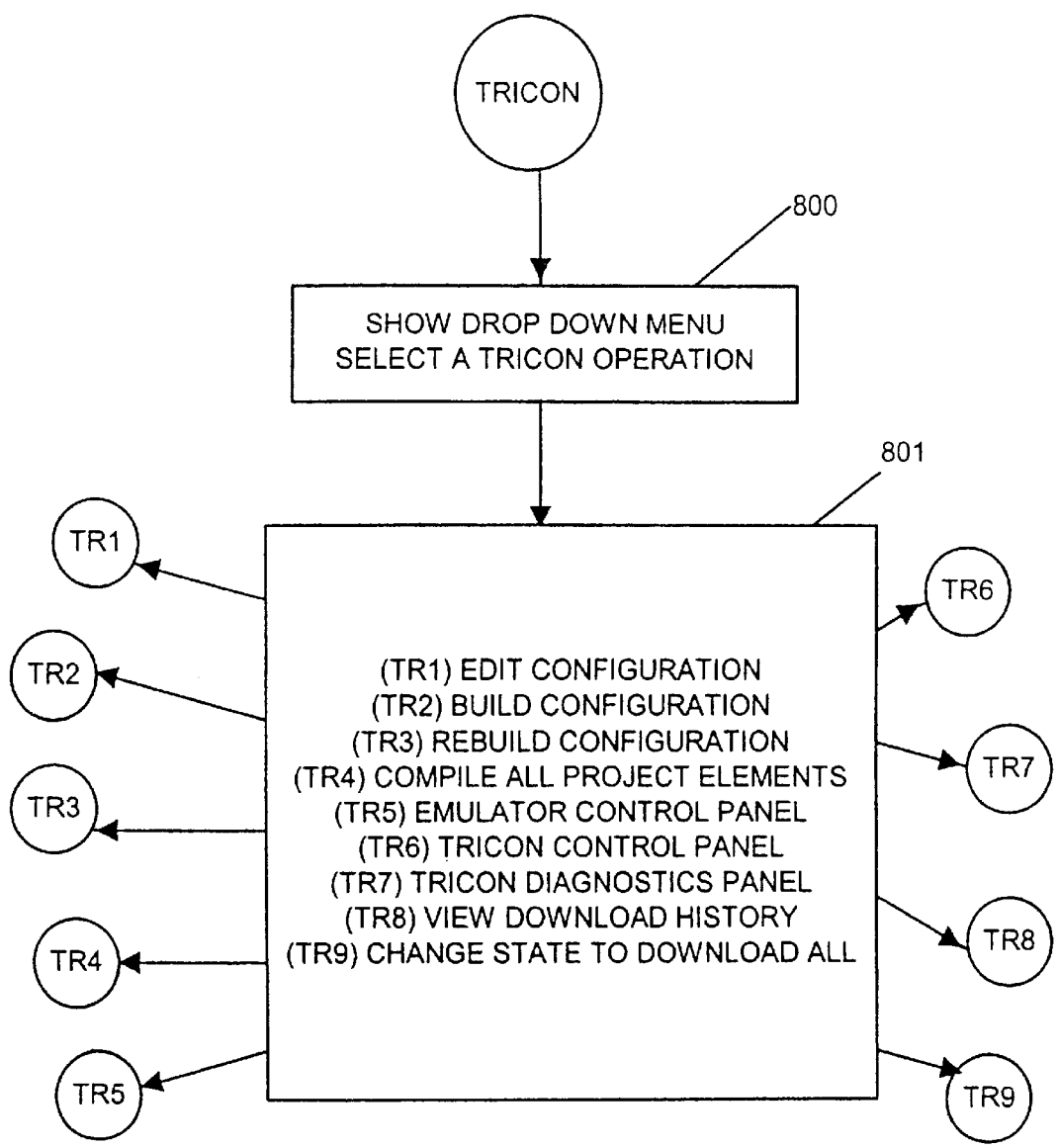
Figure 5P:
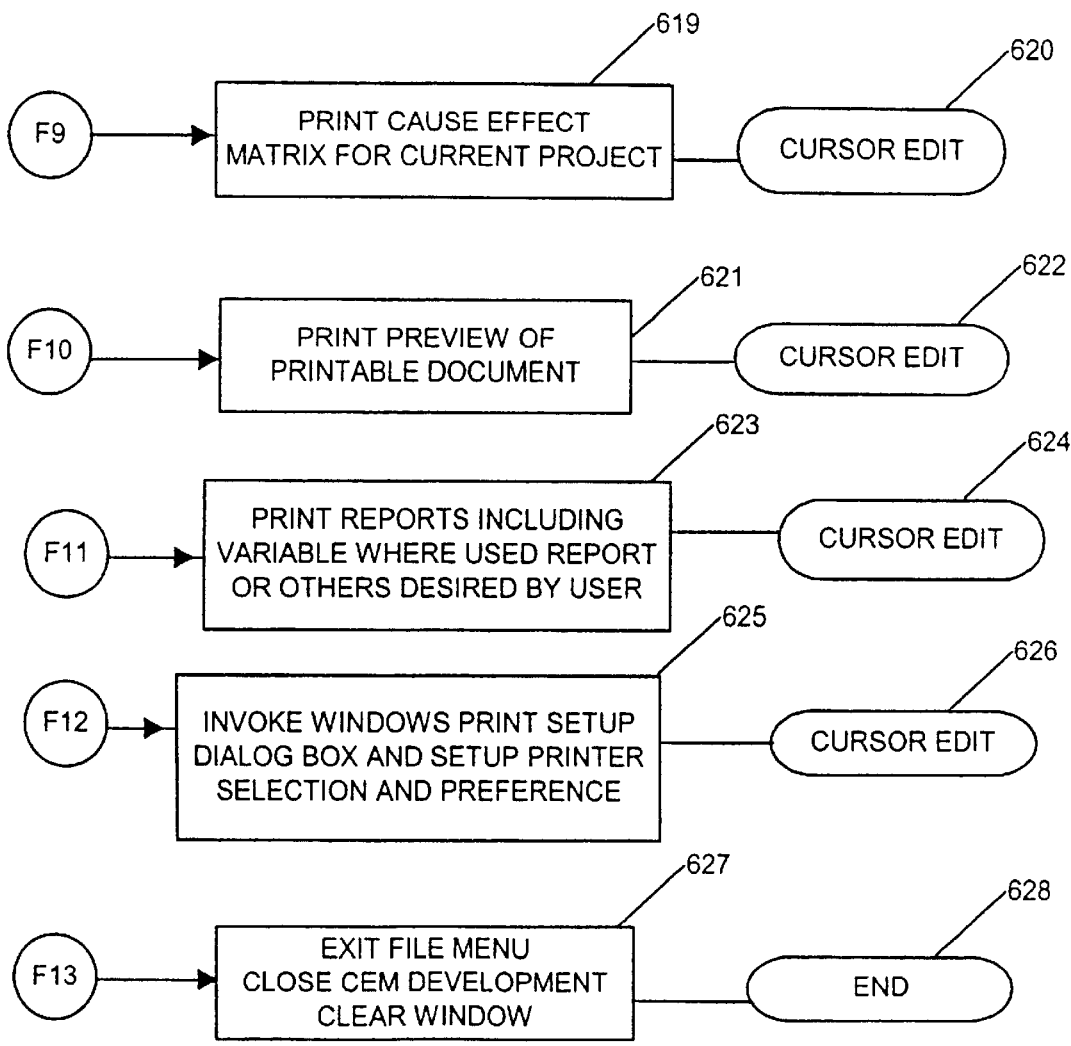
Figure 5R:
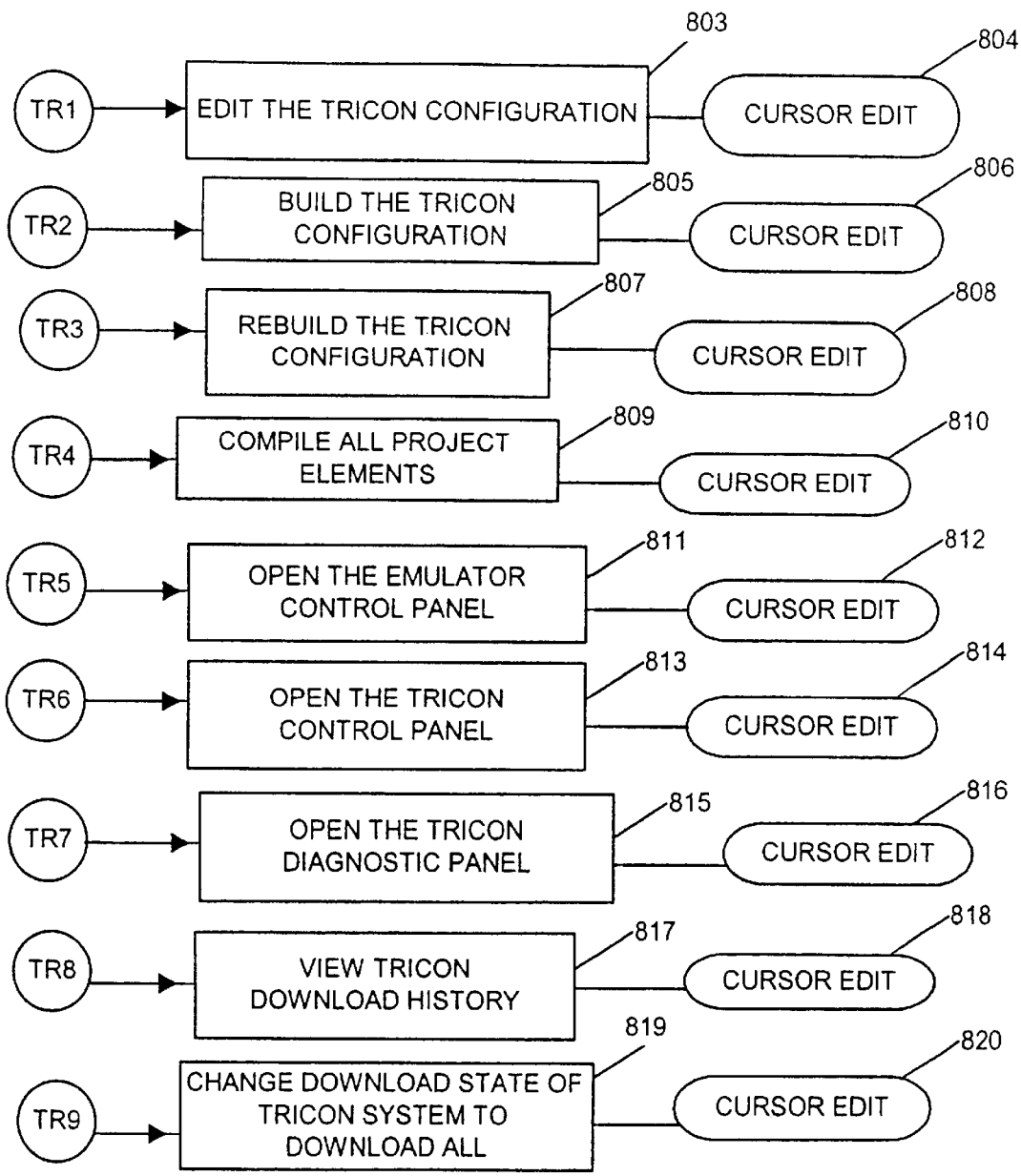
Figure 5S:
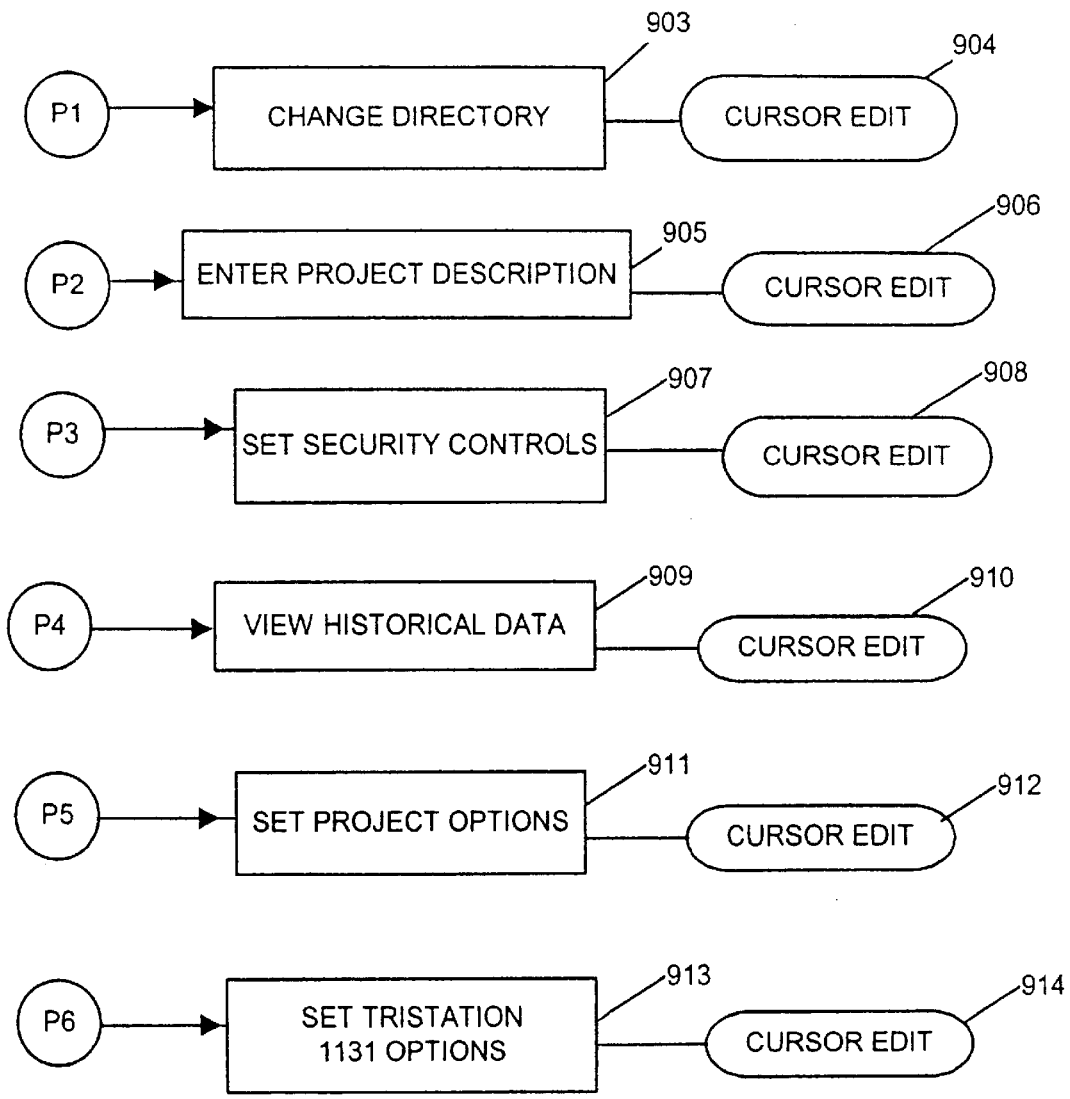
Figure 5T:
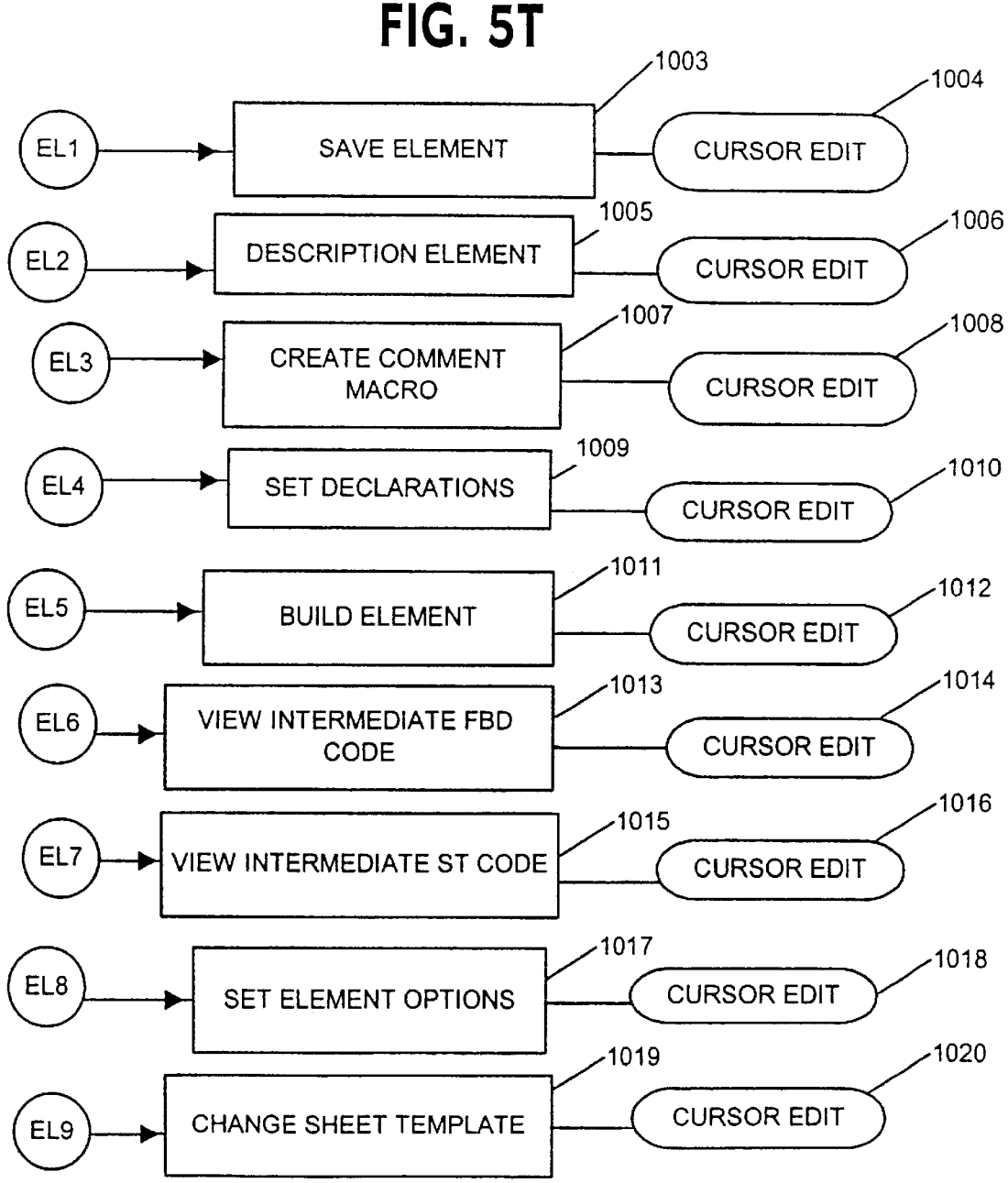
Figure 5V:
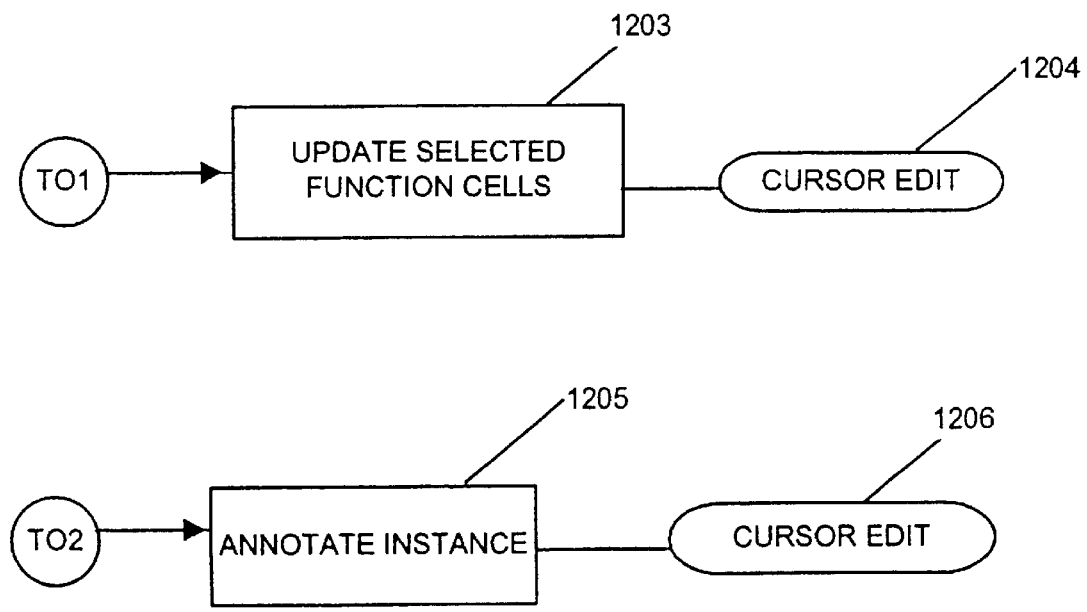
Figure 5W:
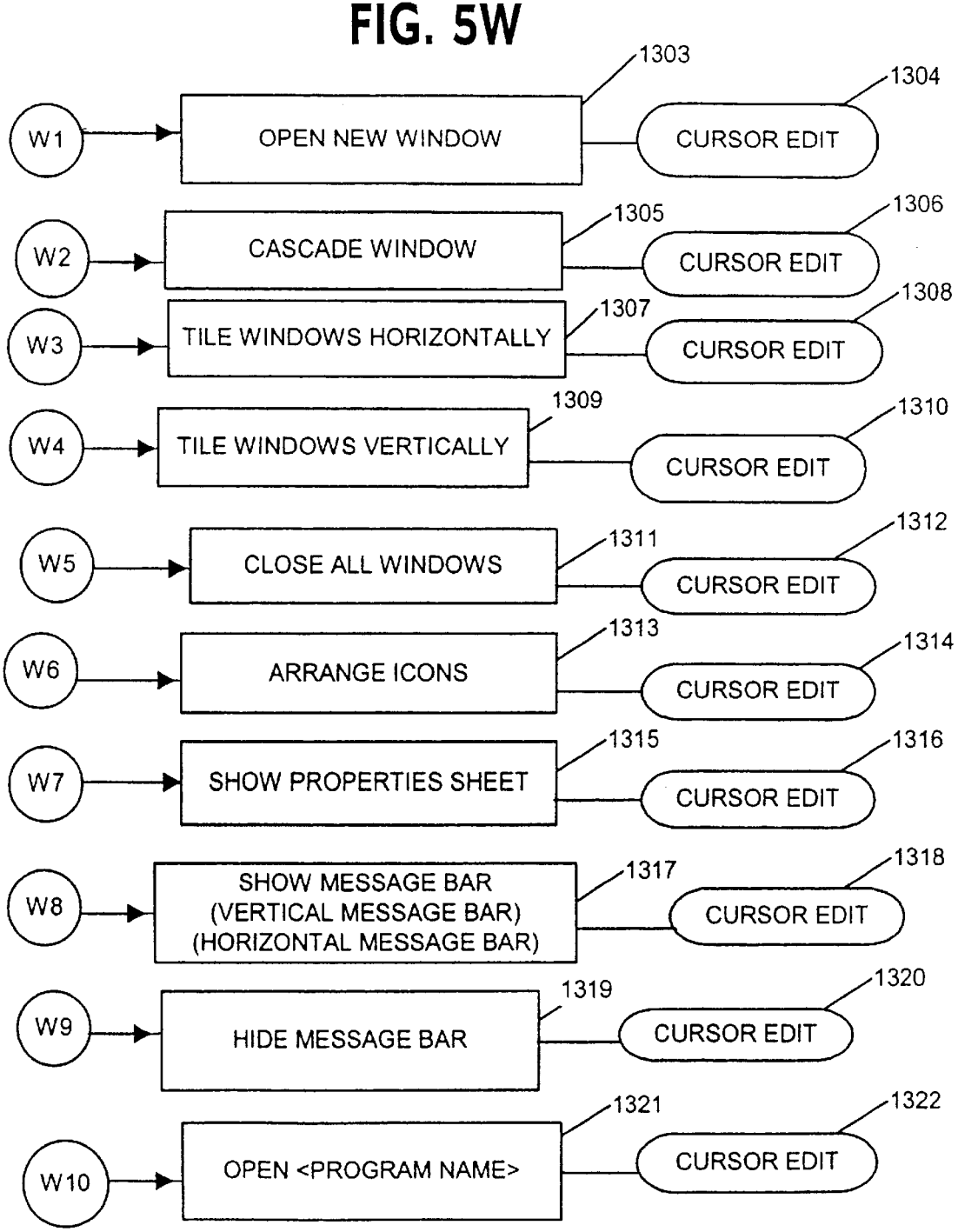
Figure 5X:
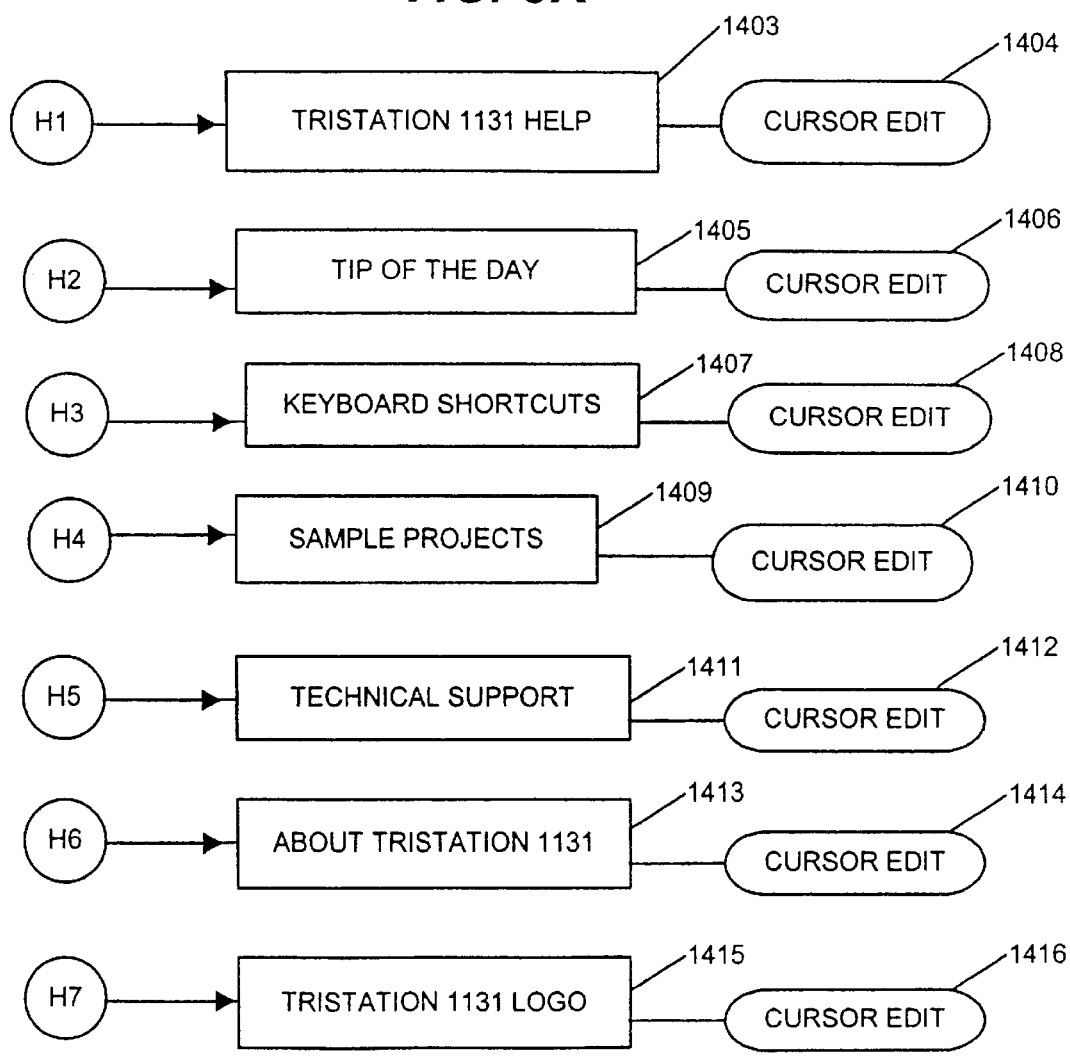
Figure 6A:
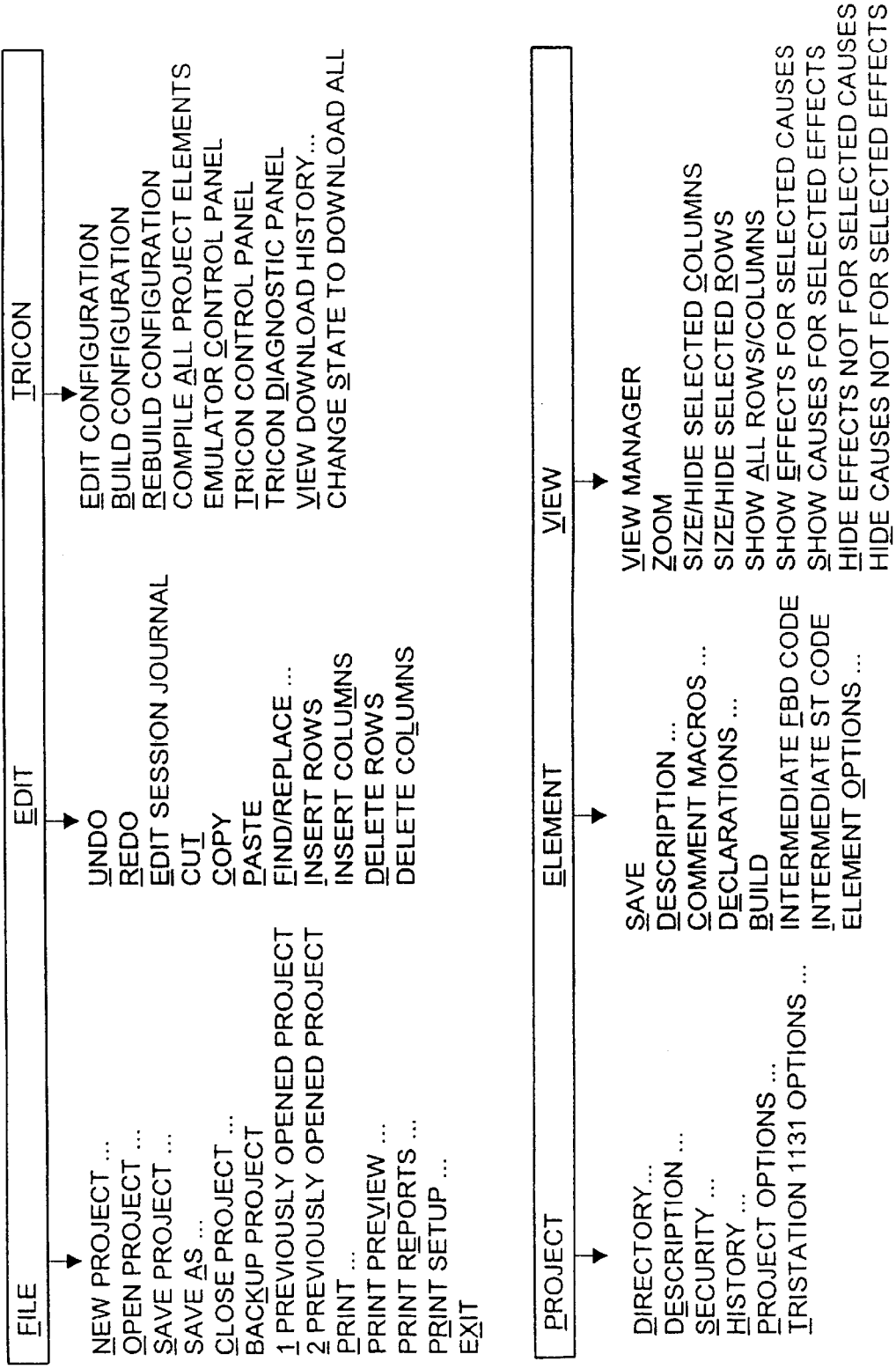
FIGS. 6A–6B are a schematic of the menu system.
Figure 6B:
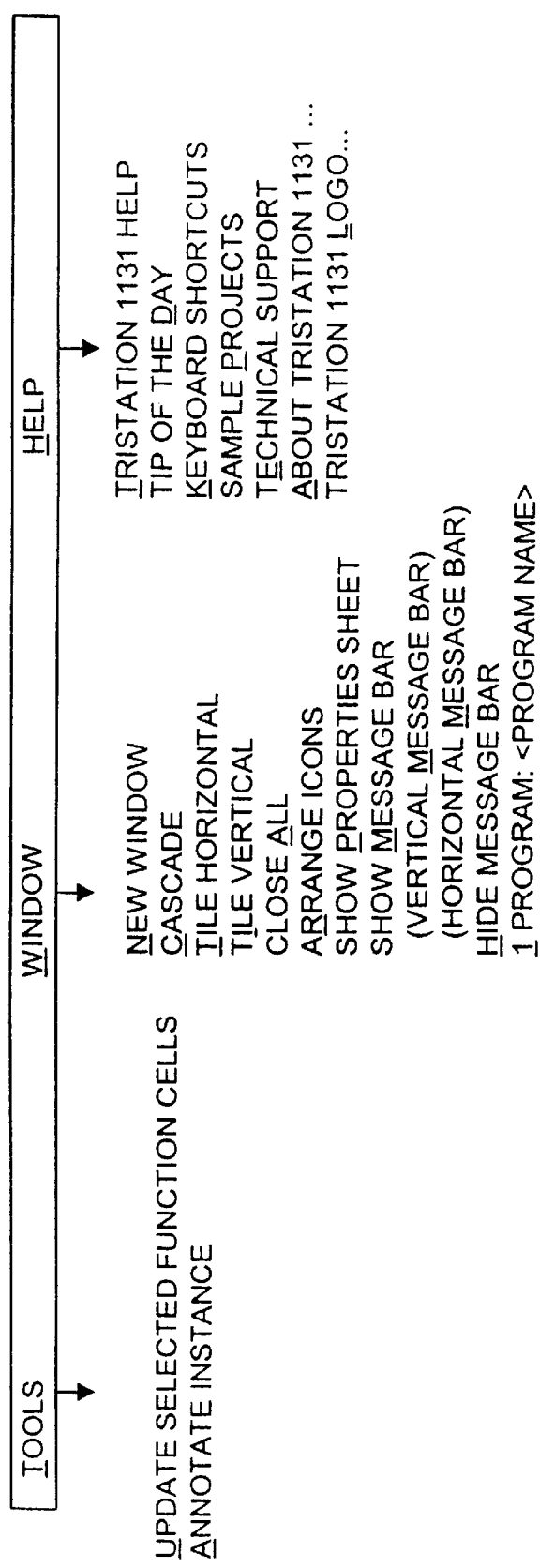

Referring now to FIGS. 5A–5X, on start up of computer system 1, a menu for the TriStation 1131 appears as shown in FIGS. 6A–6B.

The system monitors the input from the mouse 3A and the keyboard 3B to determine if a menu item is selected, step 200, or if other activity has taken place. At start up, no matrix is displayed, so a matrix must either be created or loaded. Accordingly, a File menu item is selected as shown in step 201. As shown in FIG. 5F, on selection of the File menu item, the system displays a drop down menu of file operations, step 600.

CEM programs are identified as Projects. If a new project is to be created, the user would select NEW PROJECT, step 601. As shown in FIG. 5O, this causes the initialization and display of a new blank CEM project, step 603, and then initiates NEW/OPEN, step 604. If an existing project is to be modified or maintained, the user would select OPEN PROJECT, step 601, and as shown in FIG. 5O, this causes the initialization and display of an existing project, step 605, and initiates NEW/OPEN, step 606. Two other options are provided which permit the opening of existing projects, these are previous projects 1 and 2 which are the last and next to last projects worked on the particular computer system 1. On selection of PREVIOUS PROJECT 1 or PREVIOUS PROJECT 2, step 601, the selection causes the initialization and display of either the most recent project, step 615, and initiates NEW/OPEN, step 616, or the next to most recent project, step 617, and initiates NEW/OPEN, step 618.

Other typical options as provided in windows include SAVE PROJECT, step 601, which saves the project as originally named, step 607, of FIG. 5O and returns to the display, step 608 and SAVE AS, step 601, which saves the project under another name, step 609, and returns to the display, step 610. Also included are CLOSE PROJECT and BACKUP PROJECT, step 601. Close Project closes the project and clears the project from the display, step 611, and returns to the display, step 612. Backup Project saves the project in a backup file, step 613, but does not close the project, and then returns to the display, step 614.

Several standard print functions are provided as shown in FIGS. 5F and 5P. The user may select PRINT, step 601, for the existing project to print the cause effect matrix, step 619. A standard Microsoft print dialog box appears and the CEM may be printed to the designated printer. After printing, control is returned to the display, step 620. A selection of PRINT PREVIEW, step 601, will create a display of the print output in a simulated page format, step 621. On close of the preview, control is again returned to the display, step 622.

A print report feature is provided in the file menu. On selection of PRINT REPORTS, step 601, a dialog box of available reports is displayed, including a Variable Where Used Report, step 623. An example Variable Where Used Report is shown in FIG. 29. After the selected report is printed, the system returns to the display 624. Virtually any user defined reports desired by the programmer may be generated based on the variable and function data or any other information present in the system. A listing of reports may be found in the TriStation Developer's Work Bench, Version 2, publicly available from Triconex Corporation which is attached hereto and incorporated herein by reference.

A standard printer setup is also provided. On selection of PRINT SETUP, step 601, a standard printer definition dialog box is displayed and printer options may be selected, step 625. On close of the dialog box, control returns to the display, step 626.

On selection of EXIT, step 601, the file menu is exited, step 627, and the CEM Development program is closed, step 628.

Referring now to FIG. 5B, the CEM system includes an Edit menu item. On selection of the Edit Menu, step 202, typical edit functions may be selected from the drop down menu shown in FIG. 5G, step 700. Referring to FIG. 5G, on selection of UNDO, step 701, a previous edit is reversed, step 703, as shown in FIG. 5Q and return is executed on completion, step 704. On selection of REDO, step 701, a previously reversed edit is reversed, step 705, and return is executed on completion, step 706. On selection of EDIT SESSION JOURNAL, step 701, the user is presented with a display of prior edits and the user may reinstate or change the edits, step 707, and the system returns to the cursor, step 708. On selection of CUT, step 701, highlighted information is cut and temporarily saved, step 709, and return is executed on completion, step 710. On selection of COPY, step 701, highlighted information is copied and temporarily saved, step 711, and return is executed on completion, step 712. On selection of PASTE, step 701, previously cut or copied information is pasted into the selected area, step 713, and return is executed on completion, step 714. On selection of FIND/REPLACE, step 701, the selected area is searched to find data or to find and replace data, step 715, and return is executed on completion, step 716. The next four options in the edit menu are unique to the CEM diagram and are further discussed hereafter. Briefly, however, on selection of INSERT ROWS, step 701, a new cause row or rows are inserted into the CEM, step 717, and return is executed on completion, step 718. On selection of INSERT COLUMNS, step 701, a new effect column or columns are inserted into the CEM, step 719, and return is executed on completion, step 720. On selection of DELETE ROWS, step 701, selected cause row or rows are deleted from the CEM, step 721, and return is executed on completion, step 722. On selection of DELETE COLUMNS, step 701, selected effect column or columns are deleted from the CEM, step 723, and return is executed on completion, step 724.

A TRICON menu item is also provided as shown in FIG. 5B. On selection of the TRICON menu item, step 203, a drop down menu is provided as shown in FIG. 5H, step 800. The TRICON dropdown menu has a number of menu items related to the TRICON safety system which may be selected. These permit the modification of various parameters and are included for completeness. These features existed in the TriStation and were used for the development of safety programs prior to the CEM Development system in the standard languages FBD, ST, and LD and are presented in the TriStation 1131 Developer's Work Bench, Version 2, Document 972064-001, attached hereto and incorporated herein by reference. On selection of EDIT CONFIGURATION, step 801, the TRICON configuration parameters may be edited, step 803, FIG. 5R. On completion the system returns, step 804. On selection of BUILD CONFIGURATION, step 801, the TRICON configuration is compiled and linked, step 805, on completion the system returns, step 806. On selection of REBUILD CONFIGURATION, step 801, the TRICON configuration is recompiled and linked, step 807, on completion the system returns, step 808. On selection of COMPILE ALL PROJECT ELEMENTS, step 801, all of the TRICON project elements are compiled and linked, step 809, on completion the system returns, step 810. On selection of EMULATOR CONTROL PANEL, step 801, the system displays a view of the emulator panel when testing the completed TRICON program, step 811, on completion the system returns, step 812. On selection of TRICON CONTROL PANEL, step 801, the system displays a view of the TRICON control panel step 813, on completion the system returns, step 814. On selection of TRICON DIAGNOSTICS PANEL, step 801, the system displays the TRICON diagnostics panel, step 815, on completion the system returns, step 816. On selection of VIEW DOWNLOAD HISTORY, step 801, the system displays the TRICON download history, step 817, on completion the system returns, step 818. On selection of CHANGE STATE TO DOWNLOAD ALL, step 801, the state of the system is changed to download all executable code, step 819, on completion the system returns, step 820.

A Project menu item is also provided, FIG. 5C. On selection of the Project menu item, step 204, a drop down menu is provided as shown in FIG. 5I, step 900. The Project dropdown menu has a number of menu items related to the project which may be selected. On selection of DIRECTORY, step 901, a change of directory dialog box is displayed to change the directory for location of the project, step 903, as shown in FIG. 5S, and on completion the system returns, step 904. On selection of DESCRIPTION, step 901, a description of the project may be entered, step 905, on completion the system returns, step 906. On selection of SECURITY, step 901, various security options as desired may be entered to permit or restrict access to the project, step 907, on completion the system returns, step 908. On selection of HISTORY, step 901, various historical data may be viewed, step 909, on completion the system returns, step 910. On selection of Project Options, step 901, various project options may be set, step 911, on completion the system returns, step 912. On selection of TRISTATION 1131 OPTIONS, step 901, TriStation options may be set, step 913, on completion the system returns, step 914.

An Element menu item is also provided, FIG. 5C. On selection of the Element menu item, step 205, a drop down menu is provided as shown in FIG. 5J, step 1000. The Element dropdown menu has a number of menu items related to the Elements which may be selected. As shown in FIG. 5J, on selection of SAVE, step 1001, the Selected Element is saved, step 1003, FIG. 5T, on completion the system returns, step 1004. On selection of DESCRIPTION, step 1001, an Element description may be entered in the Description cell, step 1005, on completion the system returns, step 1006. On selection of COMMENT MACROS, step 1001, comment macros may be created, step 1007, on completion the system returns, step 1008. On selection of DECLARATIONS, step 1001, various declarations may be set for declaring names and other attributes for programs, functions, function blocks, variables and data types, step 1009, on completion the system returns, step 1010. On selection of BUILD, step 1001, the system compiles all of the CEM data into FBD program code, step 1011, on completion the system returns, step 1012. On selection of INTERMEDIATE FBD CODE, step 1001, the system displays the FBD Code, step 1013, on completion the system returns, step 1014. On selection of INTERMEDIATE ST CODE, step 1001, the system displays the ST Code, step 1015, on completion the system returns, step 1016. On selection of ELEMENT OPTIONS, step 1001, the element options may be set, step 1017, on completion the system returns, step 1018. On selection of CHANGE SHEET TEMPLATE, step 1001, the user may select the sheet size for printout, step 1019, on completion the system returns, step 1020.

A View menu item is also provided FIG. 5D. On selection of the View menu item, step 206, a drop down menu is provided as shown in FIG. 5K, step 1100. The View dropdown menu has a number of menu items related to the View which may be selected. As shown in FIG. 5K, on selection of VIEW MANAGER, step 1101, the View Manager is Opened and the current state of the CEM diagram layout is saved to disk for later loading, step 1103, FIG. 5U, on completion the system returns, step 1104. On selection of ZOOM, step 1101, the visual size of the then present image may be increased or reduced, step 1105, on completion the system returns, step 1106. On selection of SIZE/HIDE SELECTED COLUMNS, step 1101, the size of selected columns of the CEM may be changed or hidden, step 1107, on completion the system returns, step 1108. On selection of SIZE/HIDE SELECTED ROWS, step 1101, the size of selected rows of the CEM may be changed or hidden, step 1109, on completion the system returns, step 1110. On selection of SHOW ALL ROWS/COLUMNS, step 1101, all previously hidden rows or columns or both are again displayed, step 1111, on completion the system returns, step 1112. On selection of SHOW EFFECTS FOR SELECTED CAUSES, step 1101, all effects for the selected causes are displayed, step 1113, on completion the system returns, step 1114. On selection of SHOW CAUSES FOR SELECTED EFFECTS, step 1101, all causes for the selected effects are displayed, step 1115, on completion the system returns, step 1116. On selection of HIDE EFFECTS NOT FOR SELECTED CAUSES, step 1 101, all effects not related to the selected causes are hidden, step 1117, on completion the system returns, step 1118. On selection of HIDE CAUSES NOT FOR SELECTED EFFECTS, step 1101, all causes not related to the selected effects are hidden, step 1119, on completion the system returns, step 1120.

A Tools menu item is also provided, FIG. 5D. On selection of the Tools menu item, step 207, a drop down menu is provided as shown in FIG. 5L, step 1200. The Tools drop-down menu has a number of menu items related to the Tools which may be selected. As shown in FIG. 5L, on selection of UPDATE SELECTED FUNCTION CELLS NEW PROJECT, step 1201, the selected cells are updated with the most recent changes, step 1203, FIG. 5V, on completion the system returns, step 1204. On selection of ANNOTATE INSTANCE, step 1201, instances may be annotated, step 1205, on completion the system returns, step 1206.

A Window menu item is also provided which provides the typical Window functions for the Windows environment, FIG. 5E. On selection of the Window menu item, step 208, a drop down menu is provided as shown in FIG. 5M, step 1300. The Window dropdown menu has a number of menu items related to the Window which may be selected. As shown in FIG. 5M, on selection of NEW WINDOW, step 1301, a new window is opened and made active, step 1303, FIG. 5W, and the system returns to the display, step 1304. On selection of CASCADE, step 1301, the then existing multiple windows are displayed in cascaded format, step 1305, on completion the system returns, step 1306. On selection of TILE HORIZONTAL, step 1301, the multiple windows are tiled horizontally, step 1307, on completion the system returns, step 1308. On selection of TILE VERTICAL, step 1301, the multiple windows are tiled vertically, step 1309, on completion the system returns, step 1310. On selection of CLOSE ALL step 1301, all windows are closed, step 1311, on completion the system returns, step 1312. On selection of ARRANGE ICONS, step 1301, any icons then displayed are arranged in accordance with the default selected, step 1313, on completion the system returns, step 1314. On selection of SHOW PROPERTIES SHEET, step 1301, a properties dialog sheet is displayed for the Window system, step 1315, on completion the system returns, step 1316. On selection of the SHOW MESSAGE BAR, step 1301, either a horizontal or a vertical message bar is enabled, step 1317, on completion the system returns, step 1318. On selection of HIDE MESSAGE BAR, step 1301, the then showing message bar is hidden, step 1319, on completion the system returns, step 1320. On selection of PROGRAM, step 1301, a window of the various programs then running is displayed for selection for viewing, step 1321, on completion the system returns, step 1322.

A Help menu item is also provided, FIG. 5E. On selection of the Help menu item, step 209, a drop down menu is provided as shown in FIG. 5N, step 1400. The Help drop-down menu has a number of menu items related to the system help functions which may be selected. As shown in FIG. 5N, on selection of TRISTATION 1131 HELP, step 1401, the system displays the TriStation Help menu and index, step 1403, FIG. 5X, on completion the system returns, step 1404. On selection of TIP OF THE DAY step 1401, a helpful tip is displayed at random, step 1405, on completion the system returns, step 1406. On selection of KEYBOARD SHORTCUTS, step 1401, a list of selectable keyboard shortcuts is displayed, step 1407, on completion the system returns, step 1408. On selection of SAMPLE PROJECTS, step 1401, a list of sample projects for training is displayed, step 1409, on completion the system returns, step 1410. On selection of TECHNICAL SUPPORT, step 1401, technical support source information is displayed, step 1411, on completion the system returns, step 1412. On selection of ABOUT TRISTATION 1131, step 1401, technical data regarding the TriStation system is displayed, step 1413, on completion the system returns, step 1414. On selection of TRISTATION LOGO, step 1401, the TriStation Logo is displayed, step 1415, on completion the system returns, step 1416.

Figure 7B:
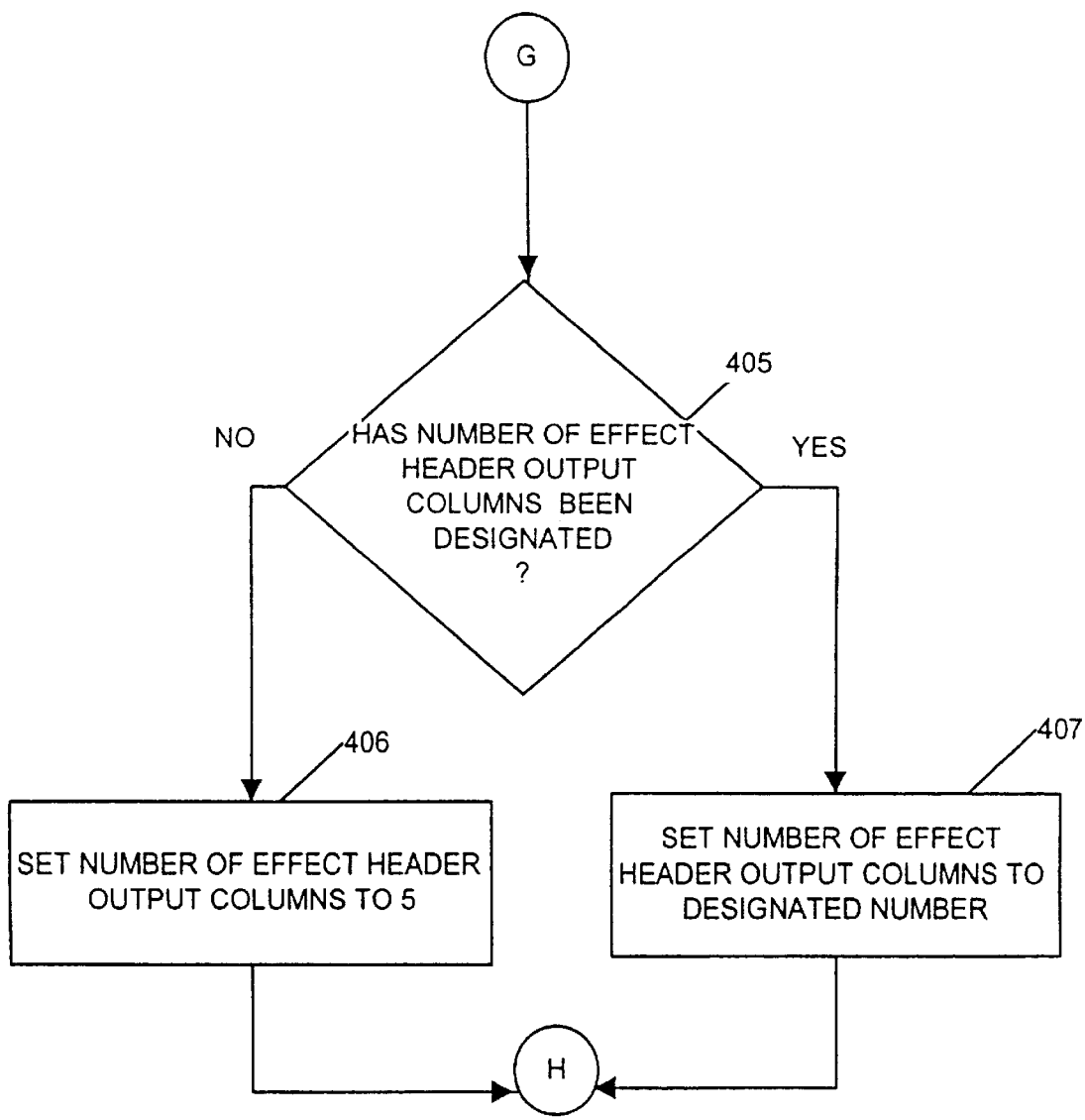

Referring again to FIG. 5F, where a new CEM project is selected, step 601, the system initializes and displays the new project window, step 603 of FIG. 5O, and the system initiates the NEW/OPEN DIAGRAM process, step 604, which is shown in detail in FIGS. 7A–7F. The system then initializes the default values, step 400, FIG. 7A. If the user has designated the number of cause rows, step 401, the system sets the number of cause header input rows to that set by the user, step 403. If not, then the default number of rows (5) is set, step 402. As shown in FIG. 7B, where the user has designated the number of effect columns, step 405, the system sets the number of effect header output columns to that set by the user, step 407. If not, then the default number of columns (5) is set, step 406.

Figure 7C:
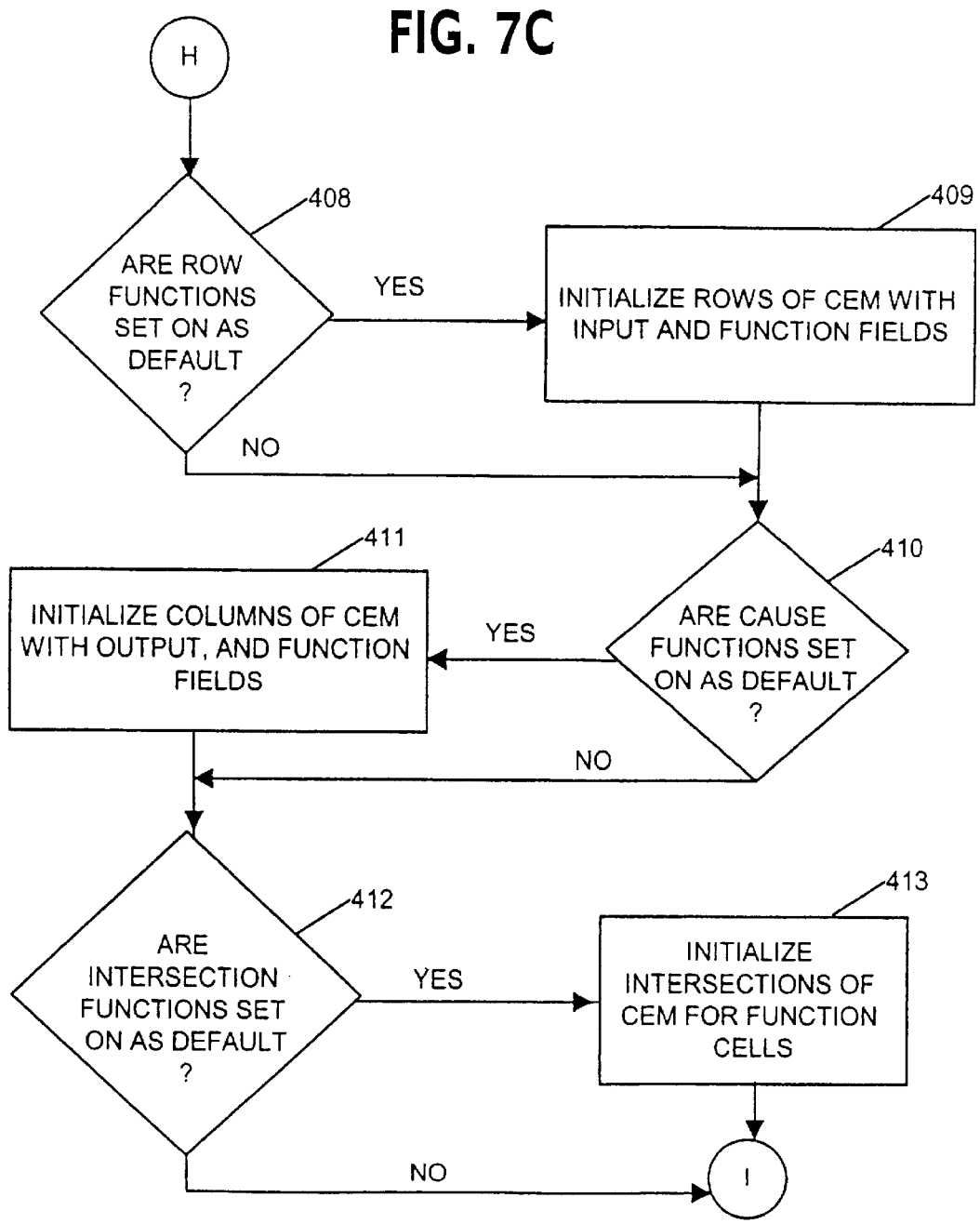
Figure 7E:
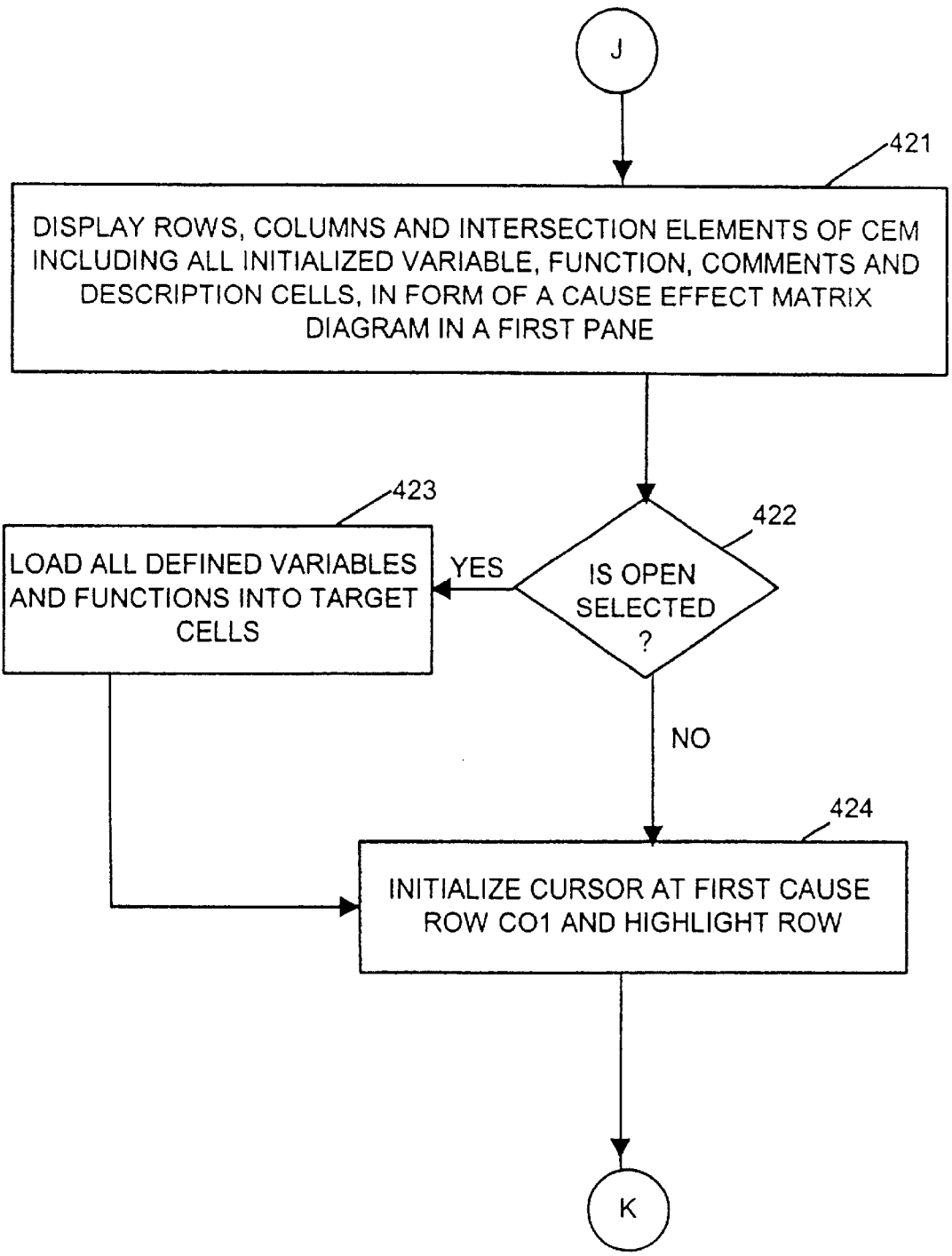

The system then determines if the display of the CEM header row with a function option has been set on, step 408, as shown in FIG. 7C. If so, the system initializes the row header to include a display of input and function cells, step 409. The system then determines if the display of the CEM cause column with a function option has been set on, step 410. If so, the system initializes the column header to include a display of input and function cells, step 411. Next, the system determines if the intersection functions are to be enabled, step 412. If so, Intersection functions are enabled, step 413.

Certain blank control cells are utilized in the CEM display, as will be discussed hereafter. Referring to FIG. 7D, the blank row control cells are initialized, step 414. The cause and description cells in the cause header are then initialized, step 415. Row number cells for the designated number of rows selected by the user of default are initialized with row number designations CO1–Cn for the required number of rows, step 416. A Row Comments cell is also initialized, step 417.

Further in FIG. 7D, blank column control cells are initialized, step 418. The effect and description cells in the effect header are then initialized, step 419. Column number cells for the designated number of columns selected by the user or by default are initialized with column number designations E01–En for the required number of columns, step 420.

The system then creates the display and displays the cause and effect headers as initialized, displays all rows, columns and intersection elements of the CEM diagram, including all initialized variable, function, comments and description cells in a first pane 27 of the display, step 421. The system then determines if open is selected, step 422. If so, all defined variables and functions are loaded into target cells, step 423. The position of the cursor is then initialized at the first cause row, CO I, and highlighted, step 424.

Figure 7F:
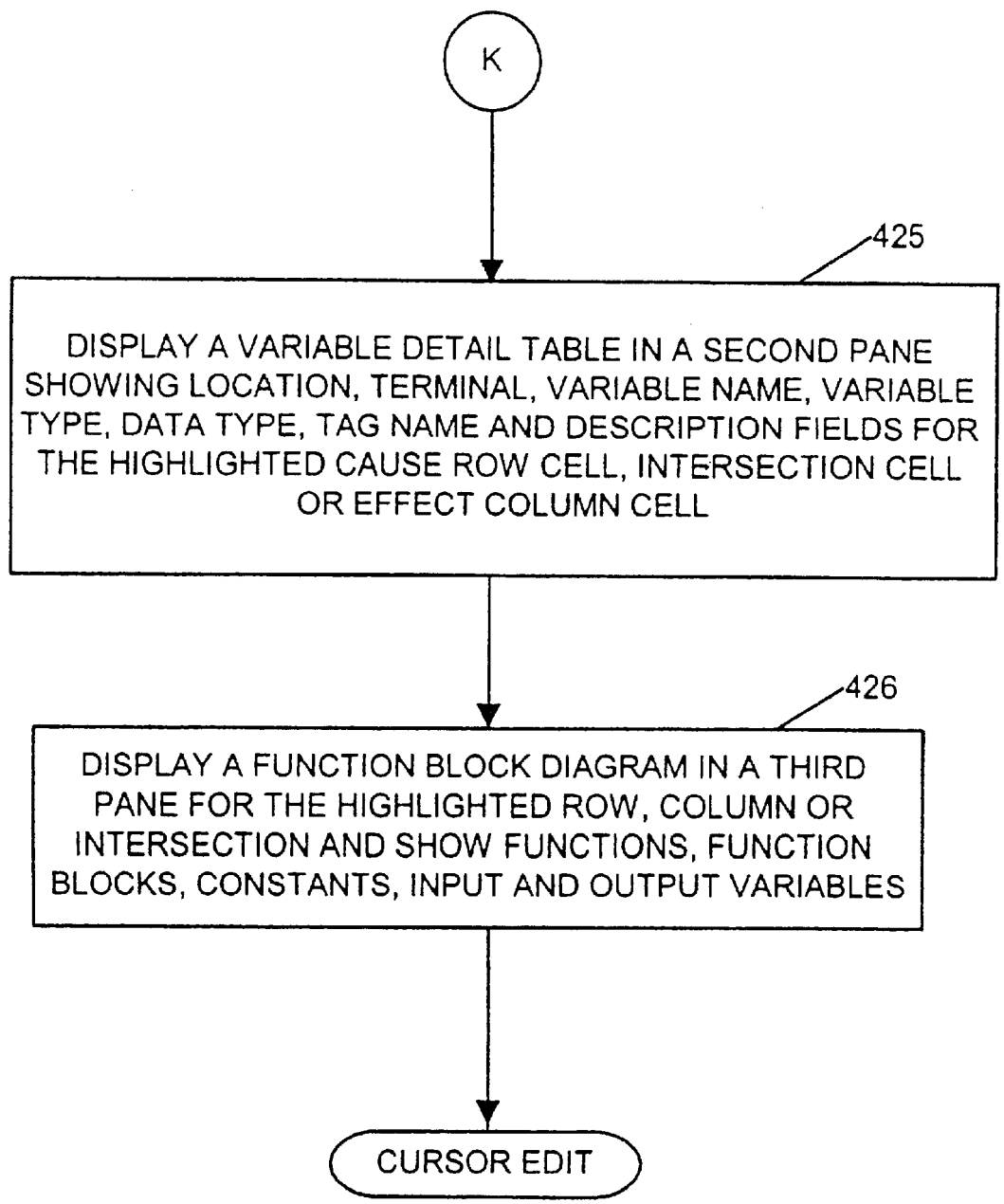

Next, as shown in FIG. 7F, the system displays a Variable Detail Table (VDT) diagram in a second pane 28 immediately below the CEM diagram which shows Location, Terminal, Variable Name, Variable Type, Data Type, Tag Name and Description cells for the highlighted cause row, step 425. The VDT is used to display any variables associated with the cause, effect, or intersection as selected by the user.

Next, the system displays a Function Block Diagram (FBD) in a third pane 29 which will be used to display any functions associated with the cause, effect or intersection points as selected by the user, step 426. The resulting display shows a display similar to that shown in FIG. 9, when no Functions options are set, or as shown in FIG. 10, with either Cause functions and cause input or effect functions and effect output or both included.

When the system transfers to CURSOR EDIT, as shown in FIGS. 8A–8D, the program checks to determine if the cursor has been clicked, step 500. If so, the system checks to determine if an editable cell has been selected, step 502. This causes a drop down list for the variable or function for the cell selected, FIG. 8B, step 504. The variable or function in the list may be selected and entered into the cell or the user may directly type in the variable or the function, which is stored by the system in a data structure or database table, step 505. New panes are then displayed with the entered data, step 506.

Figure 8A:
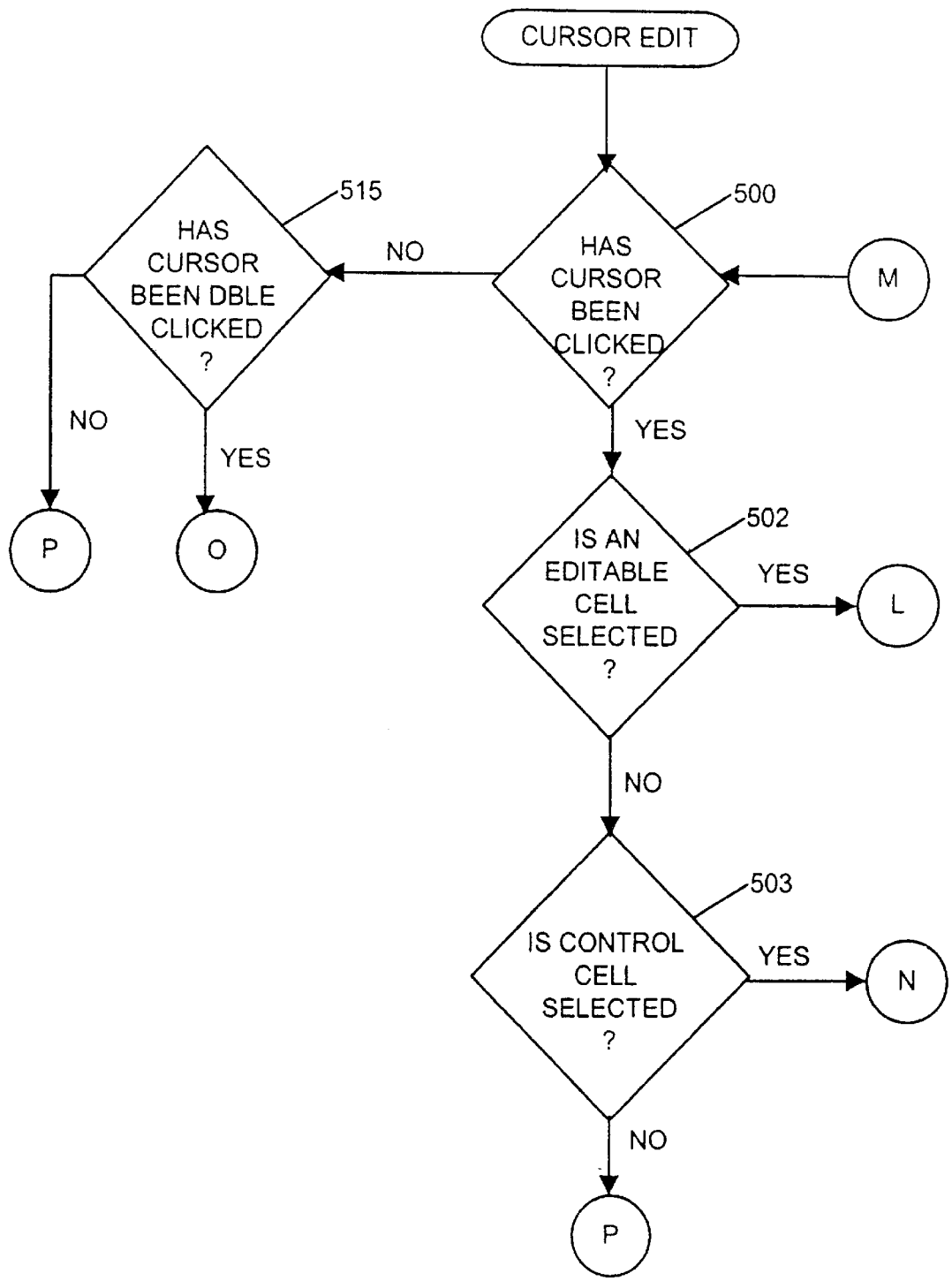
Figure 8C:
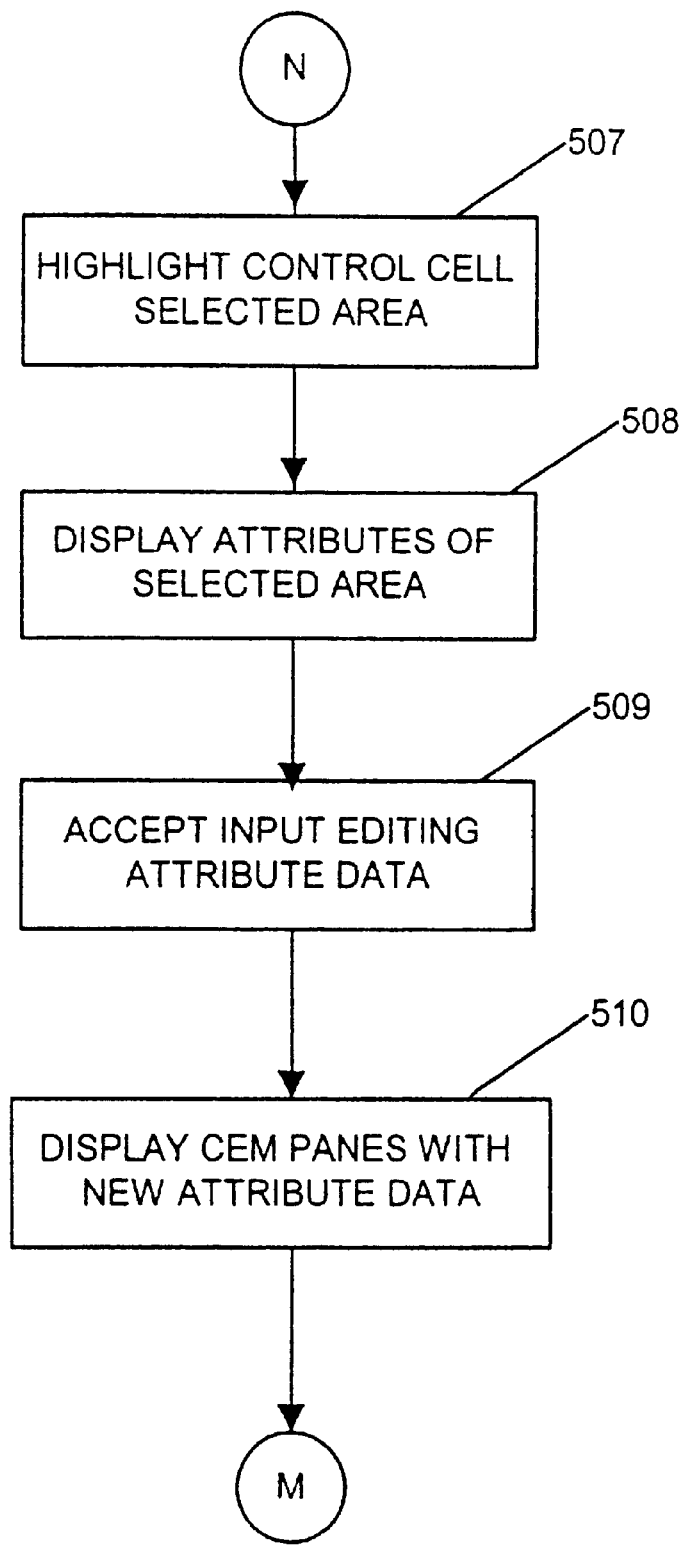

If a control cell is selected, FIG. 8A, step 503, the row, column, intersection or other area designated by the control cell is highlighted, FIG. 8C, step 507 and the attributes of the selected area are displayed, step 508. The edit information is stored for the attributes changed, step 509 and the CEM panes are again displayed reflecting the new attribute information, step 510.

Figure 8D:
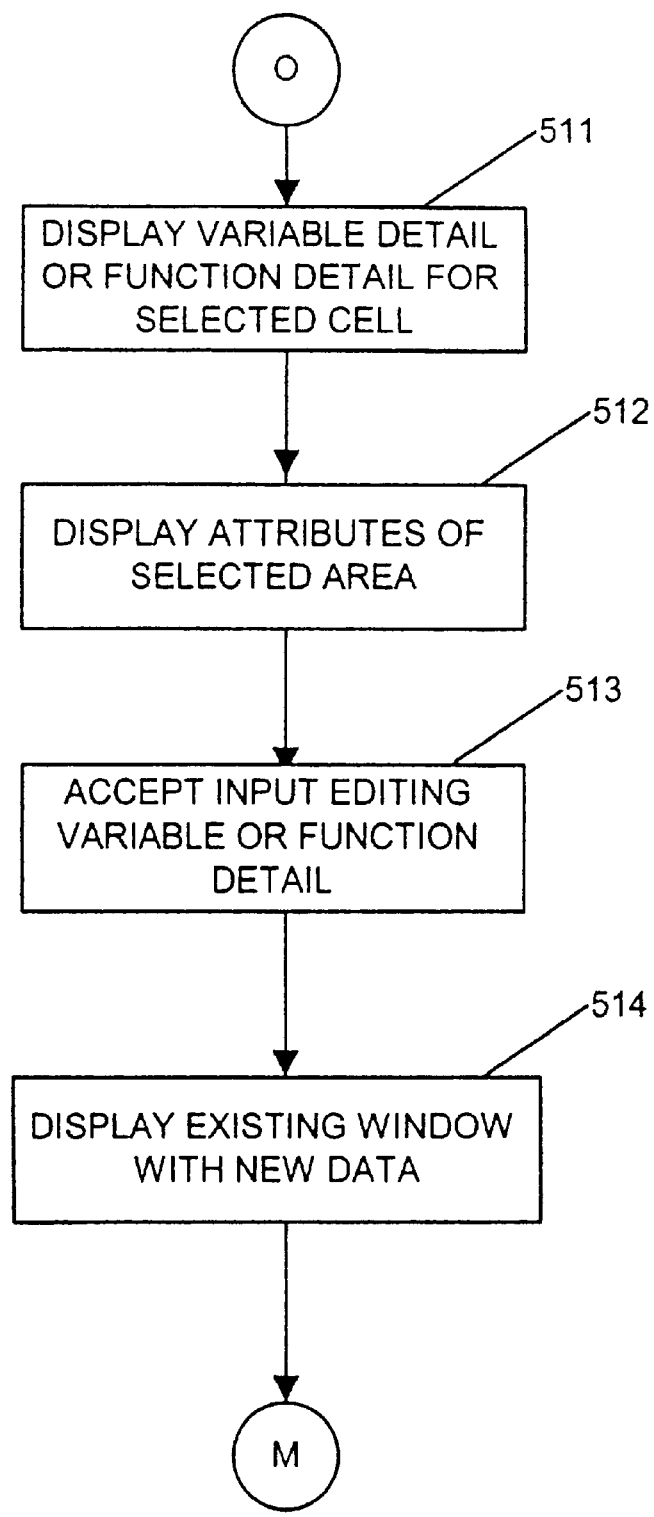

If the cell is double clicked, FIG. 8A, step 515, then the variable detail or function detail for the selected cell is displayed, FIG. 8D, step 511. Elements of the variable detail or function detail may be selected, step 512 and the system will accept input editing for the variable or functions detail, step 513. The changes will be displayed in the existing window with the new data, step 514.

Operation

Figure 9:
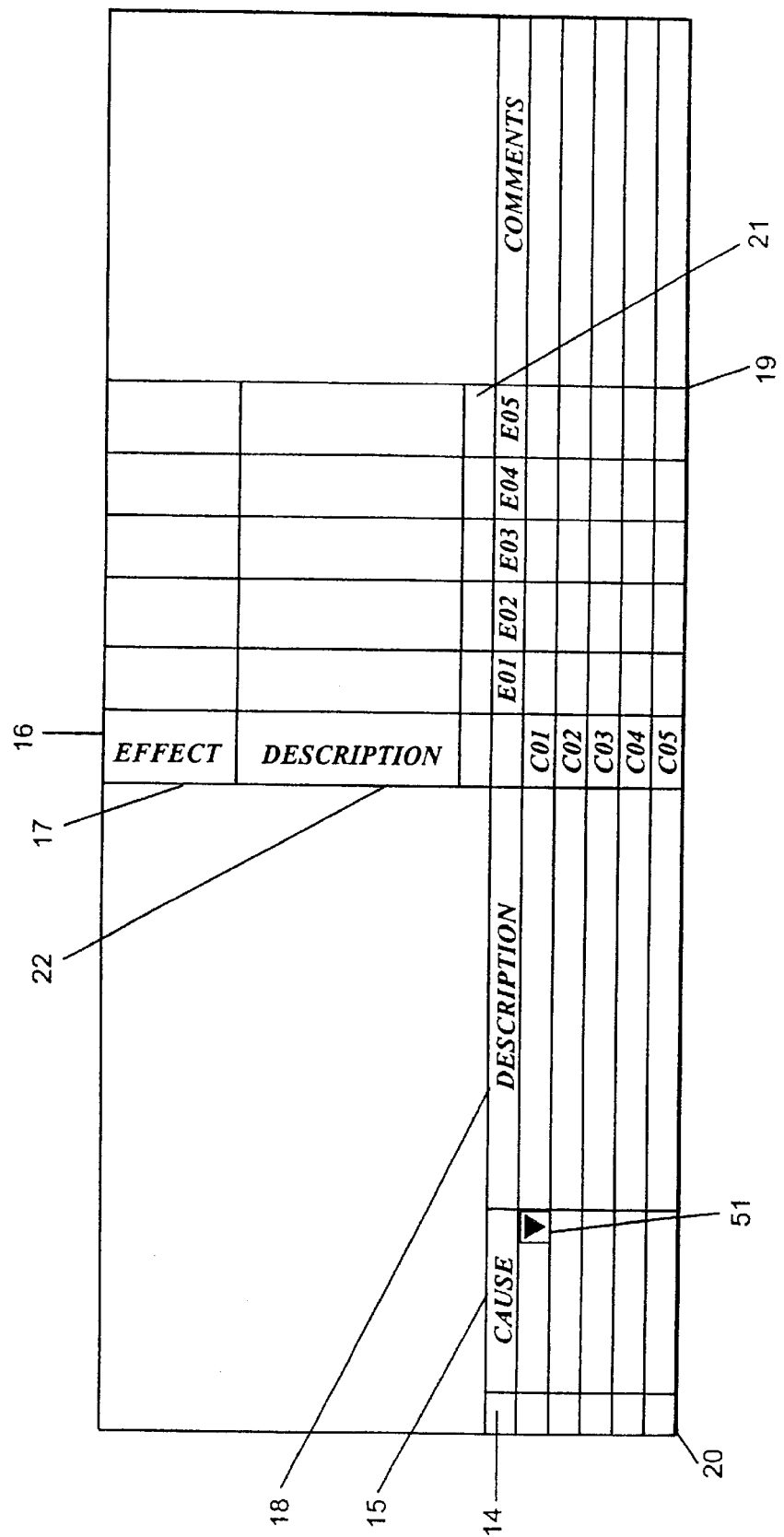
FIG. 9 is a simulated screen view of a basic CEM diagram interface generated by the system.
Figure 10:
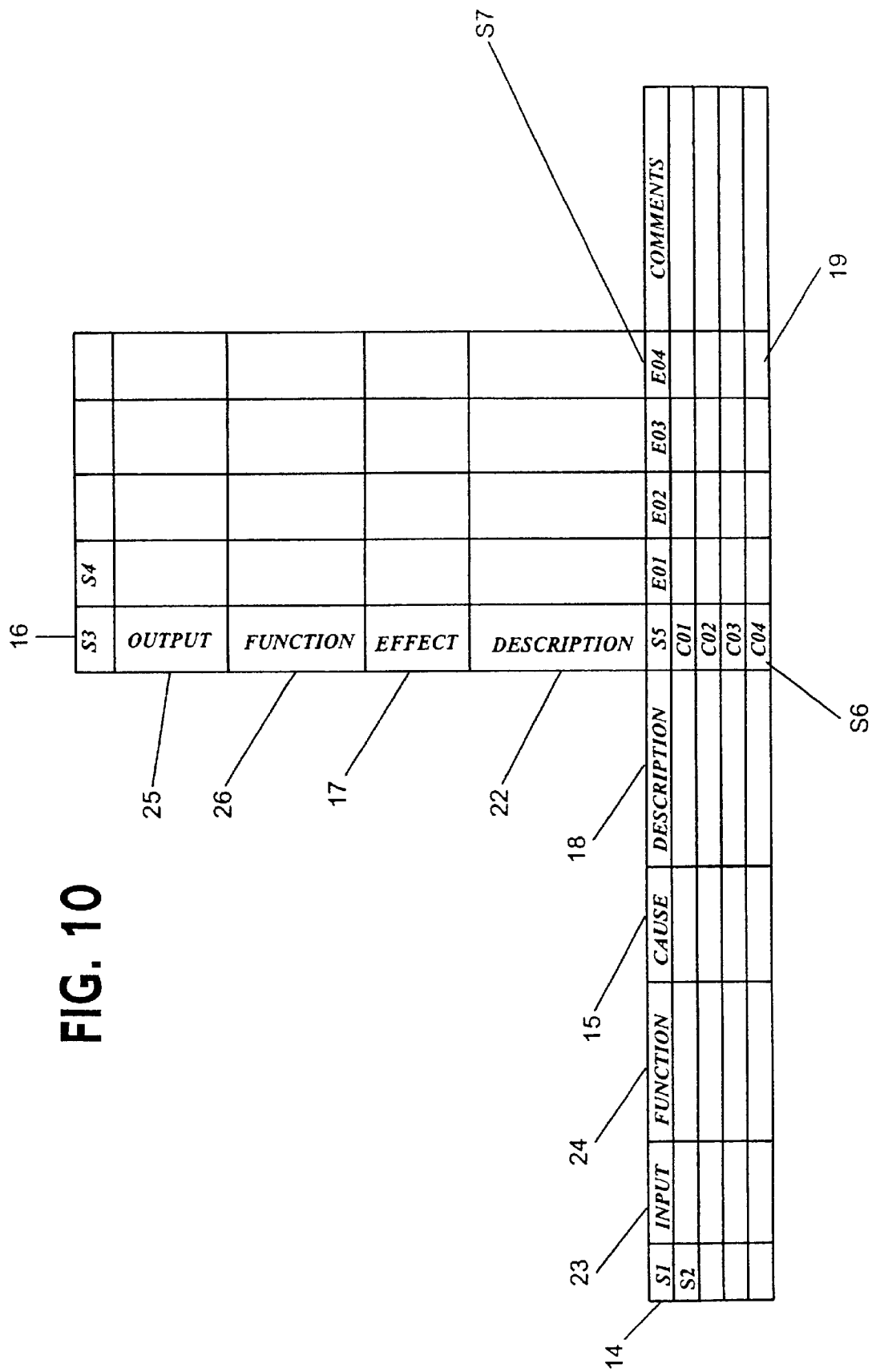
FIG. 10 is a simulated screen view of the CEM diagram interface including functionally defined cells.

FIG. 9 shows a CEM diagram with a cause header 14, showing a cause heading 15 and a cause description heading 18. An effect header 16 is also displayed with an effect heading 17 and an effect description heading 22. Five rows CO1 through C05 are shown generated for cause entry and five columns E01 through E05 are shown generated for effect entry. Twenty five intersection cells 19 are displayed at the intersection of the rows and columns. The five blank selection cells or buttons 20 for rows is shown to the left of the cause rows and the five blank selection cells or buttons 21 for columns are shown between the effect columns and the cause header 14. Row number buttons C01–C05 are shown between the Rows and the intersection cells column and column number buttons EO1–EO5 are shown between the effect columns and the intersection cells 19. The editing examples set forth herein are derived from the Cause & Effect Matrix Programming Language Editor (CEMPLE) Version 1, a copy of which is attached hereto and incorporated herein by reference.

In the case of FIG. 10, additional input heading 23 and function heading 24 are displayed in the cause header 14 and additional output heading 25 and function heading 26 are displayed in the effect header 16.

As shown in FIG. 11, the display of the cause and effect system window is divided into three panes. The first pane 27, is a display of the typical cause effect matrix diagram with the addition of a description heading 18 for the cause and a description heading 22 for the effect, as well as a comments heading 30 for each row. In addition, a variable detail pane 28 is shown immediately below the cause and effect diagram shown in pane 27 and a function block diagram (FBD) network is displayed in a third pane 29.

The selection of cause line CO1, in the CEM pane 27 as shown in FIG. 11, results in a display of the variables associated with cause line CO1 in the variable detail table in pane 28, immediately below the cause effect matrix. Also, a display of the function block diagram for the cause header row CO1 in the FBD network diagram in pane 29 is displayed. As a user switches from one row to the next, both the variables pane 28 showing the variables associated with each row as well and the FBD network pane 29 showing the Functional Block diagram related to each cause header row, is displayed. The same is true for selection of each of the effect columns and each of the related intersections. Causes are typically represented by a BOOL (Boolean) data type, input variables and effects are represented by a BOOL data type, and output variables are represented by a BOOL data type. In the example shown in FIG. 11, LEVEL_1_HI is a BOOL program input (VAR_INPUT) as shown in the Variable Table pane 28. If UNIT_1_ALARM is selected, a BOOL program output (VAR_OUT) (not shown) would appear in the variable detail table pane 28. The displays in each of these panes may be edited to modify the logic.

The instant invention extends the function of a cause effect matrix diagram to permit a computation at the intersection of the cause row and the effect column. For each cause and effect active (non-empty) intersection, for example as shown in FIG. 12, at intersections CO1EO1, C02E02, C03E03, C04E04 and C05E05, an FBD network is generated and displayed in the FBD pane 29 indicating the function block diagram associated with the then selected cause, intersection or effect. In this instance, the display shows the applicable FBD network for the intersection CO1EO1 as shown in FIG. 12.

The predefined TON function block of intersection CO1EO1 is displayed in the FBD pane 29, and the variables connected with that function block are displayed in the VDT in pane 28. As one moves from one intersection to the next, the associated FBD network pane 29 and VDT pane 28 are displayed for each of the selected intersections.

A properties dialog block may be selected for each of the variable names in the FBD network pane 29 to permit a change in the variable data type of the user declared variables. This may be accomplished by double clicking on the selected variable. The functions in the FBD network are predefined as standard or user defined functions and function blocks and therefore internal BOOL variables such as _CO1B are also automatically declared by the program of the instant invention in accordance with the defined function parameters. These internal variables are used to pass information from one stage to the next. For each cause, effect and intersection, there are three kinds of internal variables preceded by an underscore character which may be declared as shown in the Table I, below.

TABLE I

Figure 13:
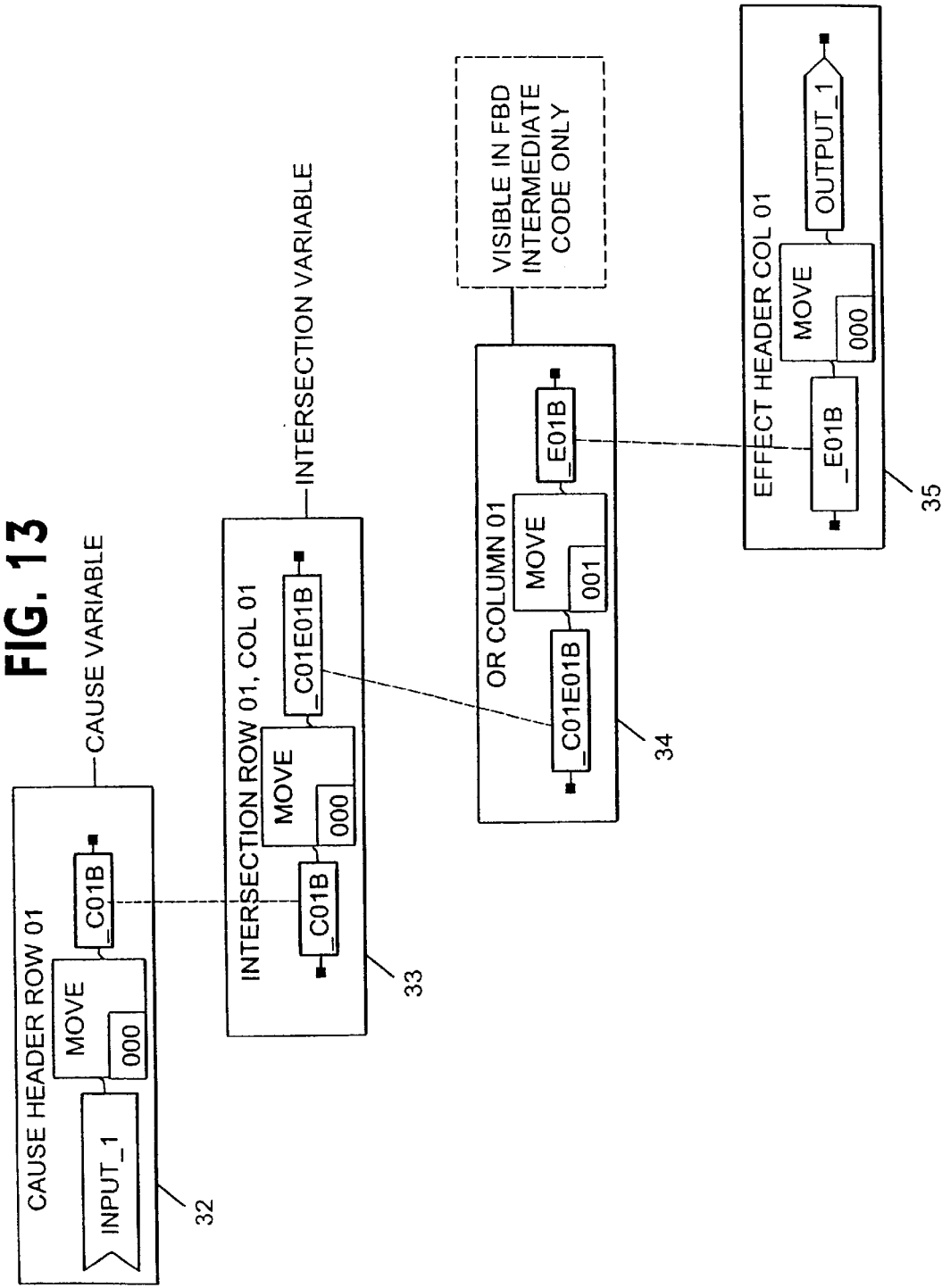
FIG. 13 is a simulated screen view of the progression of FBD views progressing from an input at a Cause header row to the output of an Effect header column.

| VARIABLE | DEFINITION |
| --- | --- |
| Cause Variable | Transfers the cause state (TRUE or FALSE) evaluated by a cause header to a row of intersection cells. An example cause variable name is __CO1B, as shown in FIG. 13. |
| Intersection Variable | Saves the state (TRUE or FALSE) calculated in an intersection cell. The states of all of the intersections in a column are OR'd together to determine the state of the effect. An example intersection variable name is __CO1EO1B, as shown in FIG. 13. |
| Effect Variable | Transfers the effect state (TRUE or FALSE) to the effect header. An example effect variable name is __EO1B, as shown in FIG. 13. |

As shown in FIG. 13, FBD network views for the first cause header row (CO1), intersection CO1EO1 and effect header EO1 in a basic CEM show how the internal variables operate. The result of the INPUT_1 in cause header evaluation is moved to the cause variable (__CO1B) 32, processed by the move function, and is saved in the intersection variable (__CO1EO1B) 33. When all of the cause effects variables as described below have been determined, all of the intersection variables in a column are OR'd together 34 to generate an effect state which is moved to the internal effect variable (__EO1B) to the effect header and output as OUTPUT_1 35. Internal variables which begin with an underscore, cannot be directly accessed elsewhere in the CEM or the value thereof passed to other program instances. However, since such variables may be copied, new variables may be declared which will copy the internal variable's value for other uses, if desired.

As discussed above, the variable detail table shown in pane 28 lists the variables which are the inputs or outputs of the FBD network that are generated by selection of a part of the CEM diagram. In the example in FIG. 14, the cause header C01 is selected. This selection invokes the user defined function LVLALRM function block as shown in the FBD network pane 29. The variable detail pane 28 then displays LVLALRM variables that are connected to the LVLALRM function. As noted in FIG. 14, an additional column heading for input 23 and function 24 have been added in the cause header. This allows the designation of input variables for an input calculation function to be defined. Therefore, rather than a single cause, multiple input terminal variables may be defined as shown in input column 23. While two such input variables are shown, up to 9 may be defined. These various input variables are shown in pane 28 along with the terminals from which they are derived.

Figure 14:
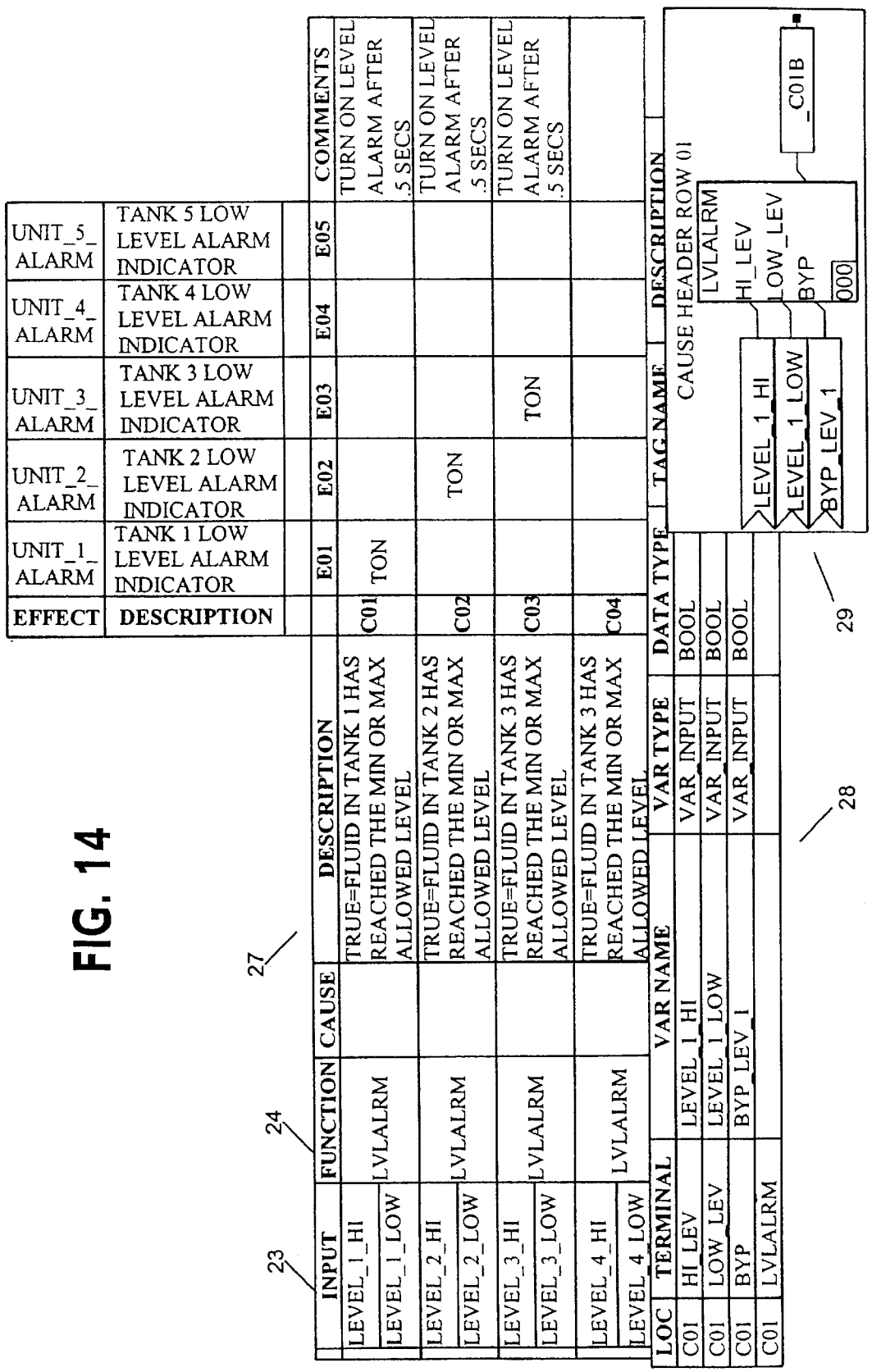
FIG. 14 is a simulated screen view of the multiple cause input CEM.

In the functional block diagram shown in the FBD network 29 of FIG. 14, the cause is shown as multiple inputs. The multiline display is generated automatically because the LVLALRM function was predefined to have multiple inputs.

The Variable Detail Table shown in the Variable Detail Pane 28 contains the following cells as defined in table II:

TABLE II

| VARIABLE | DEFINITION |
| --- | --- |
| Loc | Gives the coordinates for the location of an element in terms of cause row and/or effect column. For example, the name CO1 in the Loc column identifies Cause Row 1 (as shown in FIG. 13), whereas the name C02E02 would identify the intersection of Cause Row 2 and Effect Column 2 (as shown in FIG. 13), in this case the TON intersection function. |

TABLE II-continued

| VARIABLE | DEFINITION |
| --- | --- |
| Terminal | Lists the name of the input and/or output terminals for the function or functional block invoked by the selected cause header; effect header or intersection header. Note: the extensible functions such as logic functions like AND and OR do not have terminal names. |
| VarName | Shows the names of variables connected to the terminals of the selected function/function block. Only variables named by the user are shown. Internally declared variables are hidden. |
| VarType | Tells whether the connected variable is a VAR, VAR_INPUT or VAR_OUTPUT. A variable is shown in the FBD as a rectangle. A VAR_INPUT is shown as rectangle with a triangular indent. A VAR_OUTPUT is shown as a rectangle with a triangular protrusion. |
| DataType | Shows the data type of the connected variable. As shown in FIG. 7, for the variables LEVEL_1_H, LEVEL_1_LOW and BYP_LEV_1 the type is a BOOL type variable. Other variables types include DINT (integer) and REAL (real number). |
| TagName | Identifies a global variable. References an input, output or memory point in the TRICON and is accessible to all program instances within the project. |
| Description | User-defined text that describes an individual variable. |
| Monitor (not shown) | This cell is visible only in an instance view during execution or emulation. A box that must be check marked if you want to monitor the value of the variable in an instance view. |
| Value (not shown) | This cell is visible only in an instance view. The value of a variable during TRICON execution or emulation. |

As pointed out above, the instant invention can support a maximum of 99 cause rows and 99 effect columns. The 1000 active intersections refers to 1000 non-empty intersections as 99 cause rows and 99 effect columns provide significantly more than 1000 intersections. The instant invention evaluates the cause rows from left to right and from top to bottom until all cause rows are evaluated. The system then evaluates the columns from bottom to top starting with the intersections of the first column and then to the effect column from bottom to top and returns to the bottom of the next intersection column and repeats the evaluation to the top of the next effect column and repeats this process until all intersections and effect columns are evaluated.

Figure 20:
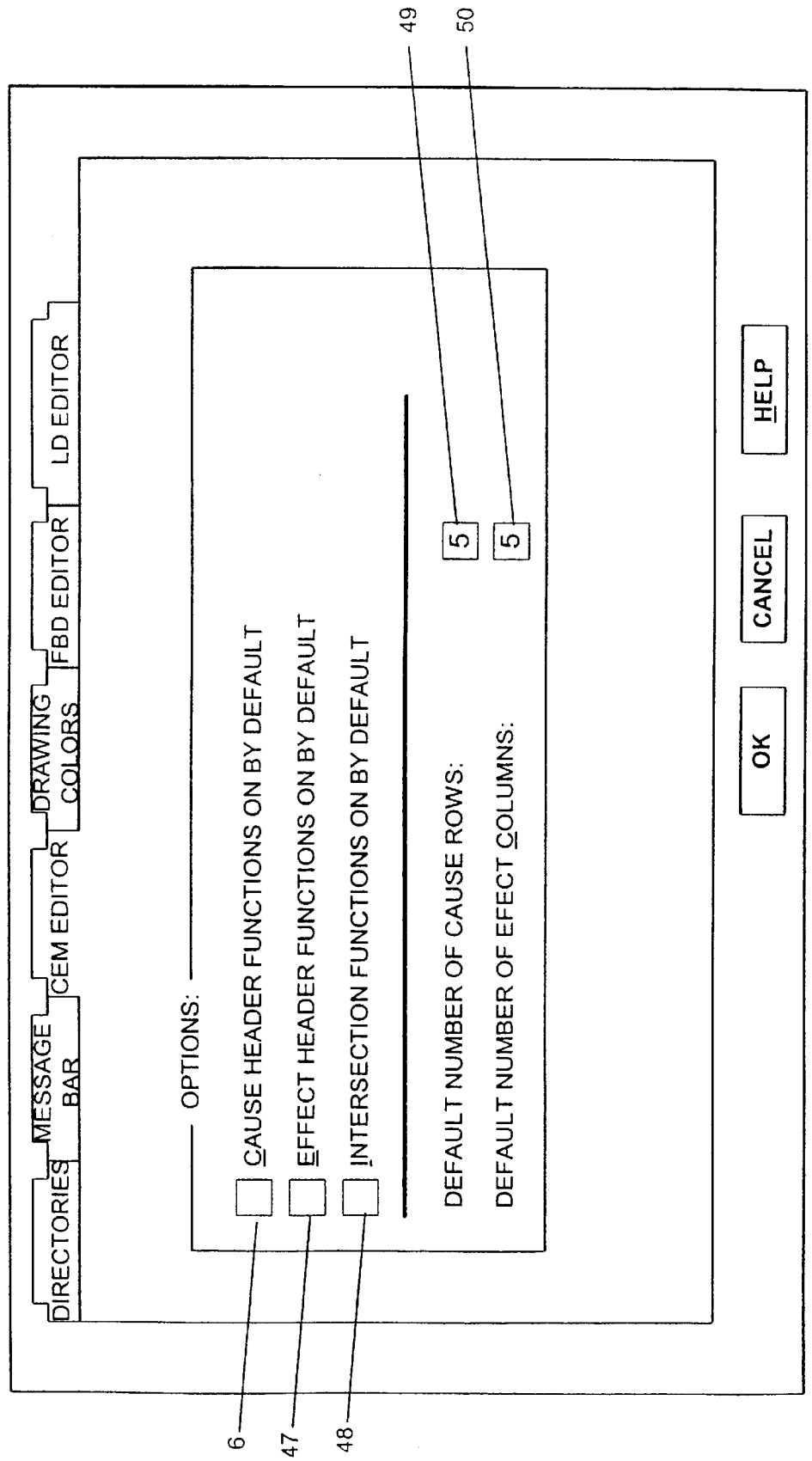
FIG. 20 is a simulated view of the CEM Editor dialog box TriStation 1131 Options menu showing Cause header functions, Effect header functions, Intersection functions, number of Cause rows and number of Effect Columns.

As shown in FIG. 20, different options for the cause header for cause rows may be selected on the generation of the initial cause effect matrix diagram or selected during the editing process by redefining the properties. The instant invention permits the user to set the initial appearance of the cause effect matrix diagram to a specified number of rows and columns and optionally to include input and function columns in the header of either or both the cause header and the effect header to provide additional functionality.

Intersection functions as shown in FIG. 12 and FIG. 14 may also be designated by default to be a function as opposed to simply an intersection "X" connection as is used in FIG. 11. In fact, the "X" connection is a function block MOVE function. The predefined user functions and function blocks which may be designated in the function column for cause, the intersection and the function row for effect are selected from a drop down list which appears for function entry. Functions are predefined for use in either a cause function cell, an intersection cell and/or an effect cell.

These Functions or parameters may be selected as shown in Table III below.

TABLE III

| FUNCTION | DESCRIPTION |
| --- | --- |
| Cause Header Functions ON by Default | Adds the input column and function column to the cause header. The function column allows for the invocation of predefined or user-defined functions and function blocks using a drop-down list. |
| Effect Header Functions ON by Default | Adds the output column and function column to the effect header. The function column allows for the invocation of predefined or user-defined functions and function blocks using a drop down list. |
| Intersection Functions ON by Default | Allows for the invocation of predefined and user-defined functions and function blocks using a drop-down list. |
| Default Number of Intersection Rows | Sets the initial number of intersection rows in each CEM. |
| Default Number of Intersection Columns | Sets the initial number of intersection columns in each CEM. |

Additional popup menus are provided for the visual programming system as shown in FIGS. 15A–15C where the intersection C03E03 has been selected. The down arrow shows the various options for the intersection functions. If each MOVE is replaced with the Function block TON, the CEM of FIG. 12 is created. The pop-up command menus are provided for each of the functions and for variable name, type and DataType definitions as well.

Figure 16:
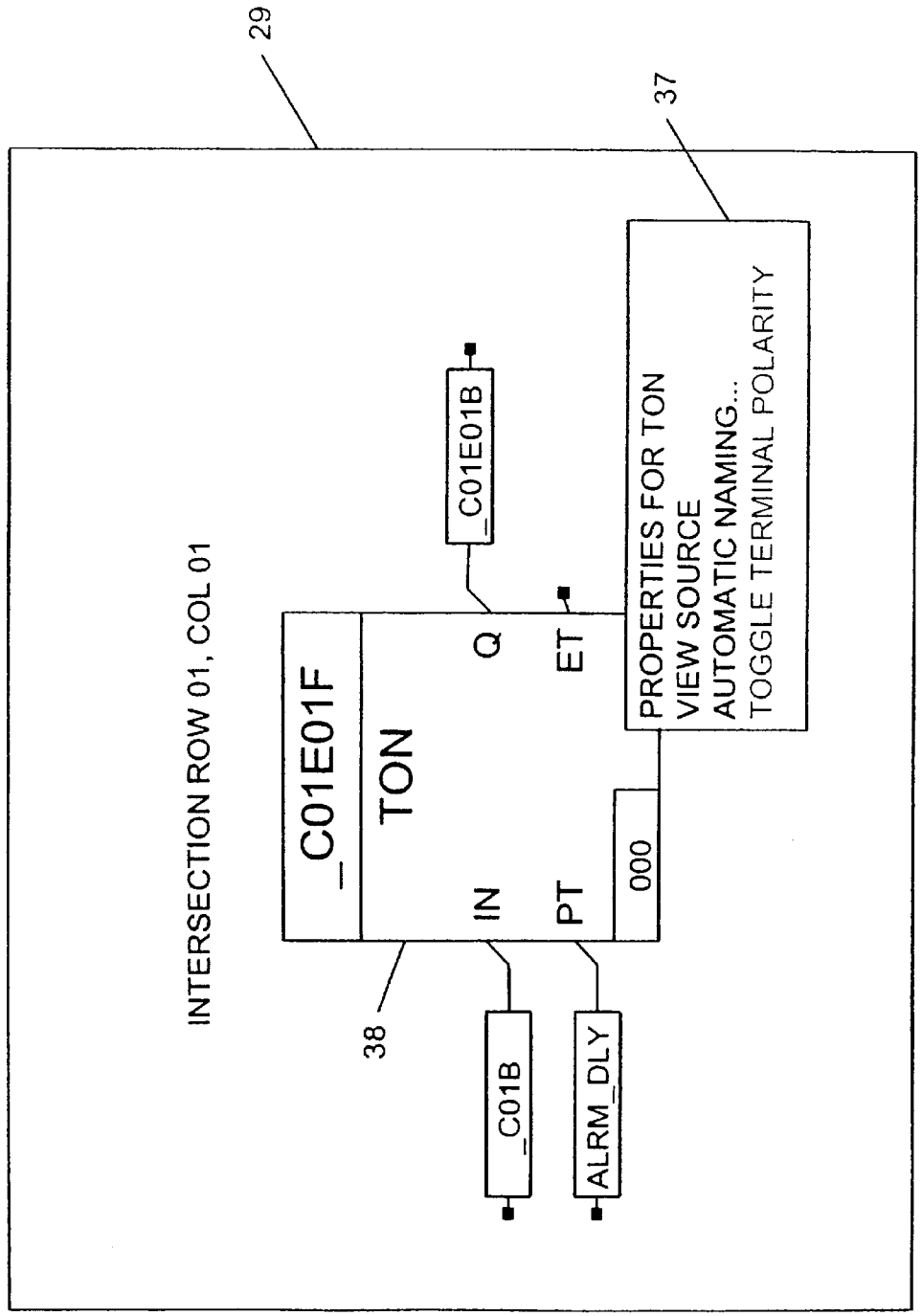
FIG. 16 is a simulated view of a function edit for the TON function, showing the function dialog box.

Table IV, shown below, describes the pop-up commands for the dialog box 37 for the FBD detail of the TON function of FIG. 16.

TABLE IV

| COMMAND | DESCRIPTION |
| --- | --- |
| Properties for <element> | Bring up the Properties dialog box for the selected element, which can be a function, functional block or variable itself. |
| Edit/View Source | Displays the source code for the selected element. The source code may be edited only for user-created functions and function blocks. The system functions in function blocks can be viewed, but not edited |
| Automatic Naming | Displays the Automatic Naming dialog box for the selected element. |
| Toggle Terminal Polarity | Toggles the polarity of the selected function or function block terminal. When the polarity is inverted, a small circle will appear at the terminal connection. |

The menus and tool bars provided by the computer system include those which existed on the TriStation Development system, and are shown in FIGS. 6A–6B. Many of the edit commands are typical windows and word processing functions with some unique commands for the CEM system. These tools are shown and described above with reference to FIGS. 5A–5X and FIGS. 6A–6B.

The printout of the system prints out only the cause effect matrix diagram as the output documentation. By default the cause effect matrix is printed out in a landscape format on sheets 11×17 inches in size. Either landscape or portrait printing is currently available on 8.5×11 inches, 11×17 inches, 17×22 inches and 22×34 inches, however the invention is not intended to be restricted to these particular sizes and international sizes may be incorporated.

The FBD network pane 29 and the VDT pane 28 are not printed. If the CEM matrix does not fit on a single sheet, the system prints multiple overflow sheets both horizontally and vertically until the entire matrix is printed.

As shown in FIG. 10a cause effect matrix diagram is displayed where the default values set are for a four row, four column matrix (cause rows C01 through C04 and event columns E01 through E04). In addition, the cause effect matrix has been designated to provide input column 23 and function column 24 in addition to the cause 15 and description 1. Similarly, the effect column has been designated by default to show an effect function 26 and an effect output 25, in addition to the effect 17 and the description 22. The resulting cause and effect diagram forms 16 potential active intersections 19. Cells may be selected (highlighted) either individually by clicking on a particular cell or by clicking in specific locations. Table V shows selection locations SI through S7 which selects multiple or single cells. FIG. 10 illustrates the various selective locations as defined in Table V. While individual cells may be selected by pointing and clicking on the particular cell desired, discontiguous cells of the matrix may also be selected simultaneously by selecting a cell, holding down the control key and clicking the various rows or columns or other cells for which selection is desired. To select a block of contiguous cells, a first cell is selected and the last cell in the rectangular pattern is clicked by holding down the shift key.

TABLE V

| SELECTION LOCATION | FUNCTION | GESTURES REQUIRED TO PERFORM FUNCTION |
| --- | --- | --- |
| S1 | Select all cause headers | Click upper left cell in cause header area |
| S2 | Select a single cause header | Click leftmost cell in cause header row |
| S3 | Select all effect headers | Click top left cell in effect header area |
| S4 | Select a single effect header | Click top cell in effect header column |
| S5 | Select all intersections | Click top left cell in intersection area |
| S6 | Select all intersections in row | Click labeled cell at left of intersection row |
| S7 | Select all intersections in column | Click labeled cell atop intersection column |

Editing of cells in a matrix can be accomplished by using four gestures as shown in Table VI.

TABLE VI

| FUNCTION | GESTURES REQUIRED TO PERFORM FUNCTION |
| --- | --- |
| Enter edit mode | Click directly over the text in an editable cell, then edit the contents. NOTE: Clicking in the cell but away from existing text or the drop down button will select the cell but will not cause it to enter edit mode. |
| Complete a cell entry | Press the TAB key or ENTER key to complete a cell entry and move the cursor to the next cell to the right. |
| Move to the next cell | Press the TAB key or ENTER key to move the cursor to the next cell to the right. |
| Delete contents of a cell or group of cells | Select a cell or group of cells (but do not place in edit mode) and press the DELETE key. NOTE: To select a cell, click in the cell but away from existing text and/or the drop down button. |

To enter the edit mode, the text in the cell should be clicked directly and then the contents may be edited. Completion of the cell entry is accomplished by pressing the TAB or ENTER key and moving the cursor to the next cell to the right. In addition, simply pressing the TAB or ENTER key will move the cursor to the next cell to the right.

To delete the contents of a cell or group of cells, the cell is selected by clicking away from the existing text, then the DELETE key is pressed. The delete function may be used to delete a cell or group of cells.

The CEM program permits the manipulation of the display of cells in a CEM four ways: (1) changing of size, that is the width of the columns or the height of the rows; (2) restoring the default sizes of the columns or rows; (3) hiding of rows or columns so they are not displayed at all; and (4) unhiding of hidden rows or columns in the display. This is useful when there are more columns or rows in the CEM diagram than can be displayed on a single display.

The changing of the width or height of various cell displays is accomplished by clicking and dragging boundaries to change the width or height or to restore the default size. Thickened boundaries, as shown in FIG. 17, represent hidden rows or columns, and by clicking such boundaries the system causes the particular row or column previously hidden to again be displayed.

The system displays thickened boundary lines 39 and 40 in place of hidden cause rows and effect columns, respectively, and the hidden cause column line 41 and hidden effect column line 42, respectively. The CEM system displays blank selection buttons 20 and 21 and label buttons C01–C05 56 and E01–E05 57 as shown in FIG. 17 for group selection. Table VII describes the method used to change the width of columns and the height of rows, as well as the hiding and unhiding of rows and columns. Note that the position of the blank selection buttons 21 is now at the top of the matrix. These features are positioned selectively.

The size/height commands on the view menu may also be used to change the width or height or hide or unhide selected cells. Dragging and double clicking the boundaries is done at the blank selection buttons for rows and columns at the top of the columns or to the left of the rows or by using the label selection buttons C01 through C05 for cause or E01 through E05 for effect.

TABLE VII

| FUNCTION | GESTURES REQUIRED TO PERFORM FUNCTION |
| --- | --- |
| Change width of column | Drag column boundary to left or right until desired width is achieved. |
| Restore default size of Column | Drag column boundary to left so that column is almost hidden, then release mouse button. |
| Change height of row | Drag row boundary up or down until desired position is reached. |
| Restore default size of row | Drag row boundary upward so that row is almost hidden, then release mouse button. |
| Hide a column altogether | Drag column boundary to left until it meets the nearest boundary. |
| Unhide a column | For an effect header column, double-click the thickened column boundary. For a cause header column, double-click the boundary between the currently displayed columns and the hidden column. |
| Hide a row altogether | Drag row boundary up unitl it meets the nearest boundary. |
| Unhide a row | Double-click the thickened row boundary. |

Editing of VDT 28 is very similar to the editing of the CEM with some additional elements. To enter the edit mode in the variable detail table 28, the cursor is positioned over text (or a blank cell) in an editable cell and clicked to select the cell. Editable cells are identified by the system with a white background on the display. To select a cell without entering edit mode, click on a cell but away from existing text and away from the drop-down button for any pop-up displays. A non-edit selection of a cell on existing text may be accomplished by using the right mouse button which selects a cell without entering the edit mode.

To resize a column in the variable detail table 28, the Windows double arrow cursor is used in the heading row to drag the column boundary to the left or the right. To hide a column, the double arrow cursor is used to drag the column boundary in the heading row to the left until the column disappears. To unhide a column, the double arrow cursor is double clicked in the heading row behind which the column is hidden and then double click to unhide it. Selection of multiple cells is not permitted in the variable detail table.

To display the properties dialog box for a selected cell, a double click of the cursor away from the text in an editable cell or anywhere in a static cell will display the dialog box for cell properties.

The various editing gestures are defined in Table VIII.

To display the FBD network for a variable, the arrow keys or the mouse is used to select any user-defined variable for display in the FBD network pane.

TABLE VIII

| FUNCTION | GESTRUES REQUIRED TO PERFORM FUNCTION |
| --- | --- |
| Enter edit mode | Click directly over the text in an editable cell. |
| Select cell without entering edit mode | 1. Click in a cell but away from existing text or away from the drop-down button. OR 2. Click in a cell using the right mouse button. |
| Display Properties dialog box | Double-click away from text in an editable cell, or anywhere in a static cell. |
| Display FBD Network for a variable | Use the arrow keys or mouse to select any user-defined variable for display in the FBD Network pane. |
| Resize a column | In the heading row, use the double-arrow cursor to drag the column boundary to the left or right. |
| Hide a column | In the heading row, locate the double-arrow cursor to drag the column boundary to the left until the column disappears. |
| Unhide a column | In the heading row, locate the double-arrow cursor on the boundary behind which the column is hidden, then double-click to unhide it. |

Figure 18A:
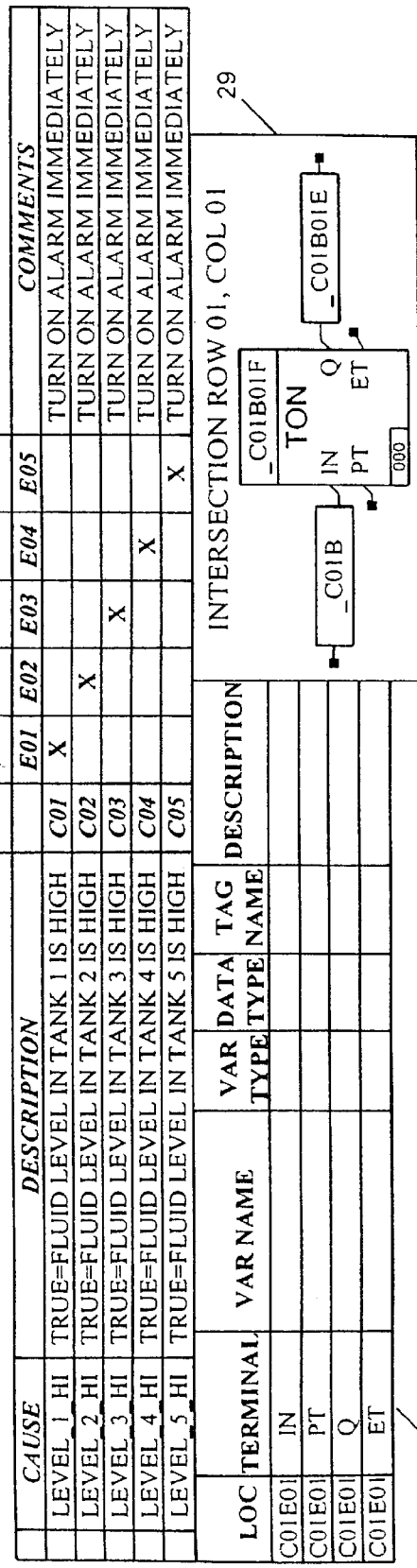
FIGS. 18A and 18B are a simulated screen view of the blank variable cells on designation of a TON function.

The selection of function or function blocks in a matrix results in the connection of some of the terminals to internal variables, but not all terminals are automatically connected. When the TON function block is used in an intersection, for example, the variables are connected to the topmost input and output terminals only, as shown in FIG. 18A. An additional input terminal called PT is left unconnected, as shown in pane 29 of FIG. 18A. An initial value for PT must be defined by clicking the white editable cell in the variable name cell of the VDT pane 28 (i.e., immediately to the right of PT in the terminal column). When the variable is entered into the particular cell for variable name, in this example ALRM_DELAY, and enter is selected or the cursor is moved to another cell, the variable is then displayed in the FBD network, as shown in FIG. 18B, as well as VDT 28 in pane 2.

Figure 18B:
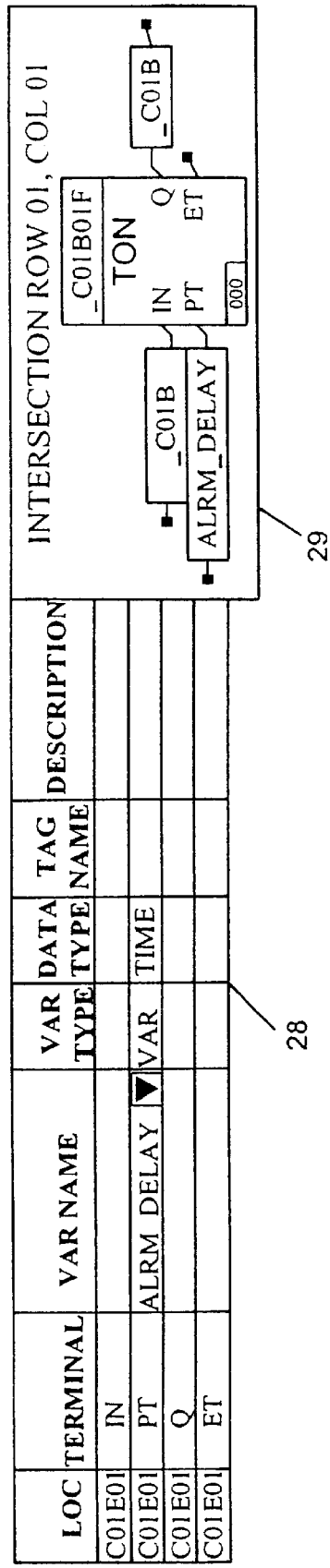
Figure 19:
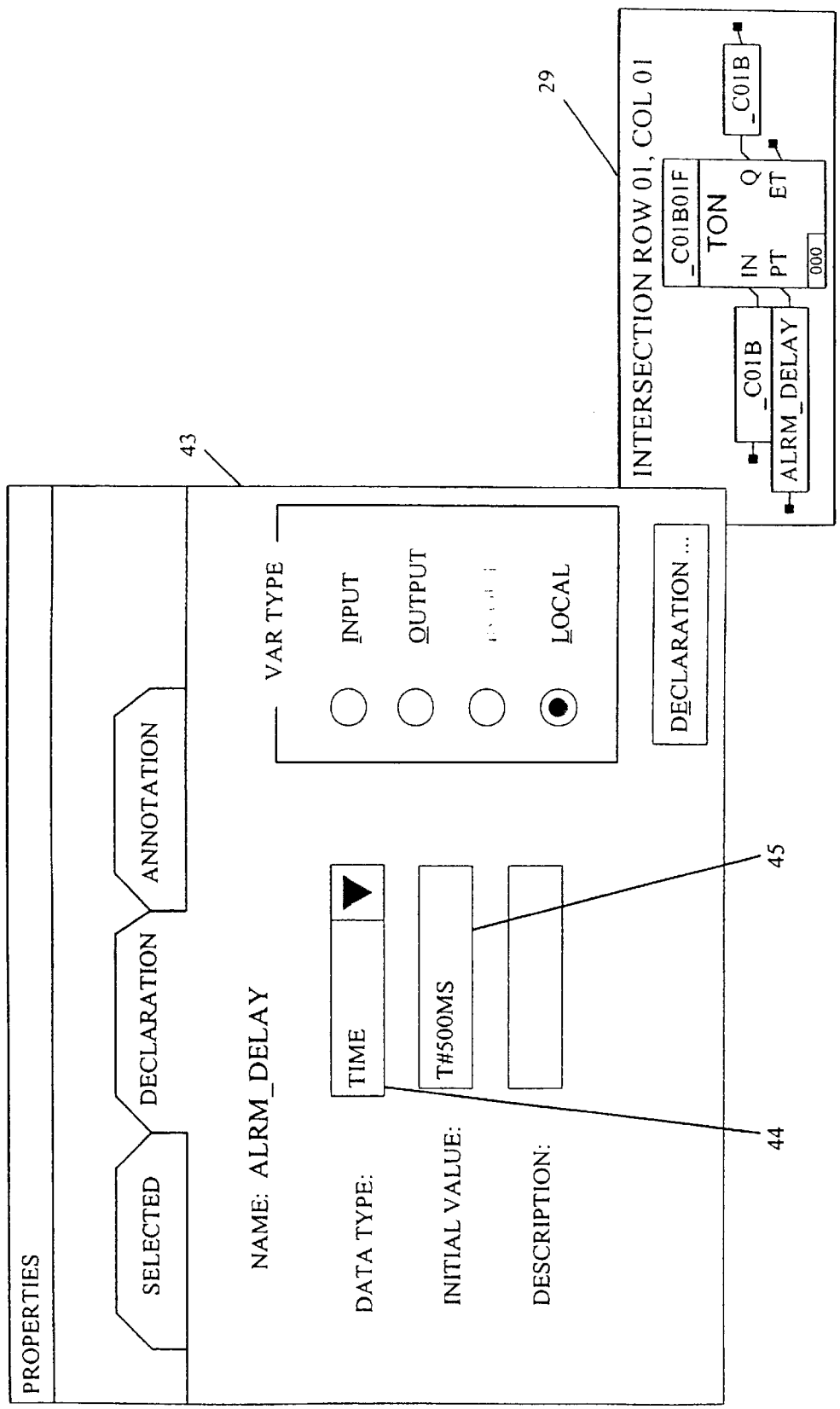
FIG. 19 is a simulated screen view of the properties menu for the ALRM_DELAY variable of the TON function and setting of initial value.

In FIG. 18B, the arrow in the VarName position at PT permits the selection of a lookup table in the form of a dropdown list of variables which have been previously used in the development and any predefined variables which may then be immediately selected. TON is the turn on function which uses the ALRM_DELAY variable to determine the delay between the cause and the effect before the effect is initiated. The value of ALRM_DELAY may be set by the user to a value, such as 0.5 seconds, as shown in FIG. 19, or some other time delay as required by the specific safety system. Such variable names may be either typed in or selected from the drop down list in a particular cell where prior names of such variables in the VDT are shown, or the existing name may be simply typed over with a resulting change in the variable detail table and the function block diagram network.

As pointed out above, there are a number of internal variables which are set by default by the system. Each internal variable is a variable type of local and begins with an underscore. For example, _CO1B as shown in the FBD network pane 29 of FIG. 18A is not directly accessible, but other variables may be declared which incorporate the value of the internal cause state and effect state variables and may be used elsewhere in the logic of the matrix diagram. The entry of such shadow variables may be set forth in the blank cells of variable detail table pane 28 and the properties modified using the properties dialog box accessible from the FBD network pane as described hereafter.

FIG. 19 shows a typical Properties dialog box 43 which allows the setting of the data type 44 and the initial value 45, in accordance with the IEC 1131-3 standards.

The previous discussion has described the editing of the CEM in pane 27 and VDT in pane 28. The FBD network display in pane 29 may be similarly edited (with a drop down arrow to select various pre-existing functions). Referring again to FIG. 18A, the FBD network pane 29 shows the function block diagram of the logic of the TON function at the intersection CO1EO1. The options set forth in Table IX may be utilized to edit the FBD network. The FBD network properties dialog box is displayed by double clicking the desired element in pane 29. Declarations for a variable may be displayed by CTRL-double clicking the desired variable. The source code may be opened for editing by CTRL-double clicking the desired function or function block which permits editing of the function or function block. This edit function applies only to user-defined functions and function blocks. Standard or library function blocks may not be changed. The library element may be displayed by CTRL-double clicking the desired function. The display properties dialog block can be used to change the data type or variable type of user-defined variables from the FBD network pane 29.

TABLE IX

| FUNCTION | GESTURES REQUIRED TO PERFORM FUNCTION |
| --- | --- |
| Display Properties dialog box | Double-click the desired element. |
| Display Declarations for <program name> dialog box | CTRL-double-click the desired variable. |
| Open FBD source for editing | CTRL-double-click the desired function or function block. Applies only to user-defined functions and function blocks. Can be used to change the Data Type or Var Type of user-defined variables. |
| Display Library Element Viewer | CTRL-double-click the desired function. Applies only to predefined functions and function blocks. |

Editing elements displayed in the FBD network pane 29, is subject to certain limitations including in particular that the names of the user defined variables cannot change, although the data type and variable type are modifiable. The properties of internal variables which are automatically declared by the system cannot be changed, and for that reason the properties dialog box for these variables is always grayed-out, although it can be displayed.

The editing of the CEM in pane 27, the VDT in pane 28 and the FBD network in pane 29 having thus been described, the development of programs from the cause effect matrix diagram will now be addressed.

The CEM editor tab is selected in the TriStation 1131 options dialog box. The dialog box for CEM is displayed as shown in FIG. 20. The Cause Header Functions ON by Default box 46, the Effect Header Functions ON by Default box 47 and the Intersection Functions ON by Default box 48 are not selected. Therefore, no functions are enabled for either the cause header, effect header or any intersection. The default for the number of cause rows 49 and default number of effect columns 50 are each set to 5.

On OK selection, the CEM system generates the empty matrix as shown in FIG. 9. The empty matrix initializes at cause row C01 and has a dropdown list selection arrow 51 displayed in the cause row CO1.

For the example shown in FIG. 21, the first cause cell in the first row CO1 is clicked and the name LEVEL_1_HI is input in the CEM cause cell 15 for C01 and the enter key is depressed. The description cell 18 on the first row is selected, and the statement "TRUE=Fluid level in Tank 1 is high" is entered and the enter key is again depressed. The effect cell in effect column E01 is selected and the designation UNIT_1_ALARM is entered in the effect cell 17 at E01 and the enter key is depressed. The effect description 22 cell for E01 is then selected and the words "High level alarm indicator for Tank 1" is entered and the enter key is depressed. This has defined a cause for C01 and an effect for E01 as the first entries in the empty matrix. Cause C01 and effect E01 are associated by clicking the intersection CO1EO1 causing an X to appear in the cell. The resulting displays for event CO1 are shown in the Variable Table in pane 28 and the FBD network shown in pane 29 of FIG. 21. The input and the output to this MOVE function (X is a MOVE by default) are local variables that are defined by the system and cannot be changed. The above steps are repeated for each of the cause rows 2 through 5 and effect columns 2 through 5. The resulting complete matrix is shown in FIG. 21.

The BUILD command is selected from the element menu, and in the absence of any errors, the program code will be generated. When BUILD is executed, the cause effect matrix is compiled into a function block program using the standard library of functions 8, user defined functions 10, the TRI-CON library of functions 13, and the variables in the variable detail table 12 as illustrated in FIG. 2. FIGS. 30A–30B briefly describe the functions in the standard library 8. FIGS. 30C–30D briefly describe the functions in the TRICON library 13. The build function generates FBD from the CEM Diagram. The FBD is then used to Generate ST code. The ST Code is compiled into EM (Encoding Machine Generate). BUILD CONFIGURATION Generates NCA (Native Code) which is assembled into NCO (Native Object Code). The Object code is then linked into NCE (Native Executable). The build and build configuration of the FBD through NCE is preexisting and this part of the code generation and emulation is retained in the TriStation 1131 Development System. The addition of CEM in the chain is added to permit the build to proceed from CEM through to a mature code generation and compile chain.

Figure 22:
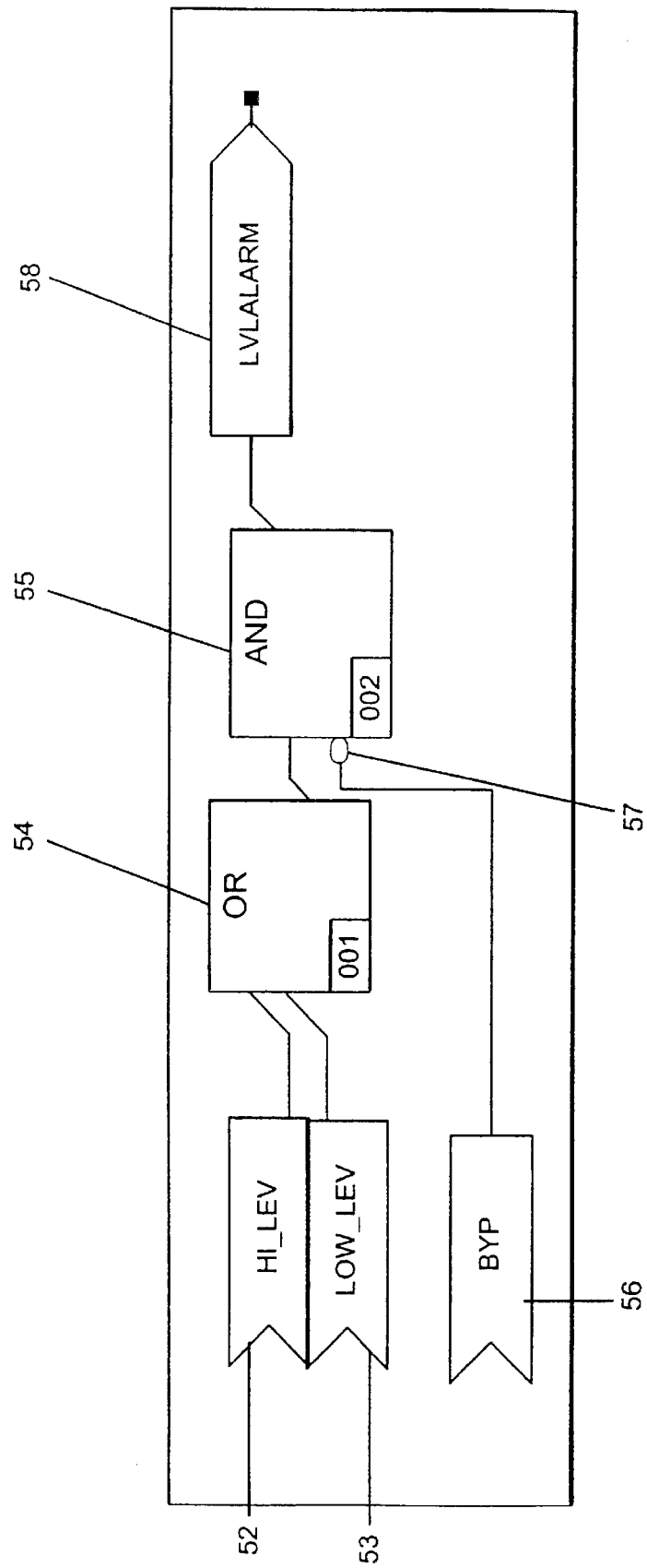
FIG. 22 is a schematic of the LVLALRM function showing its structure and inputs.
Figure 23:
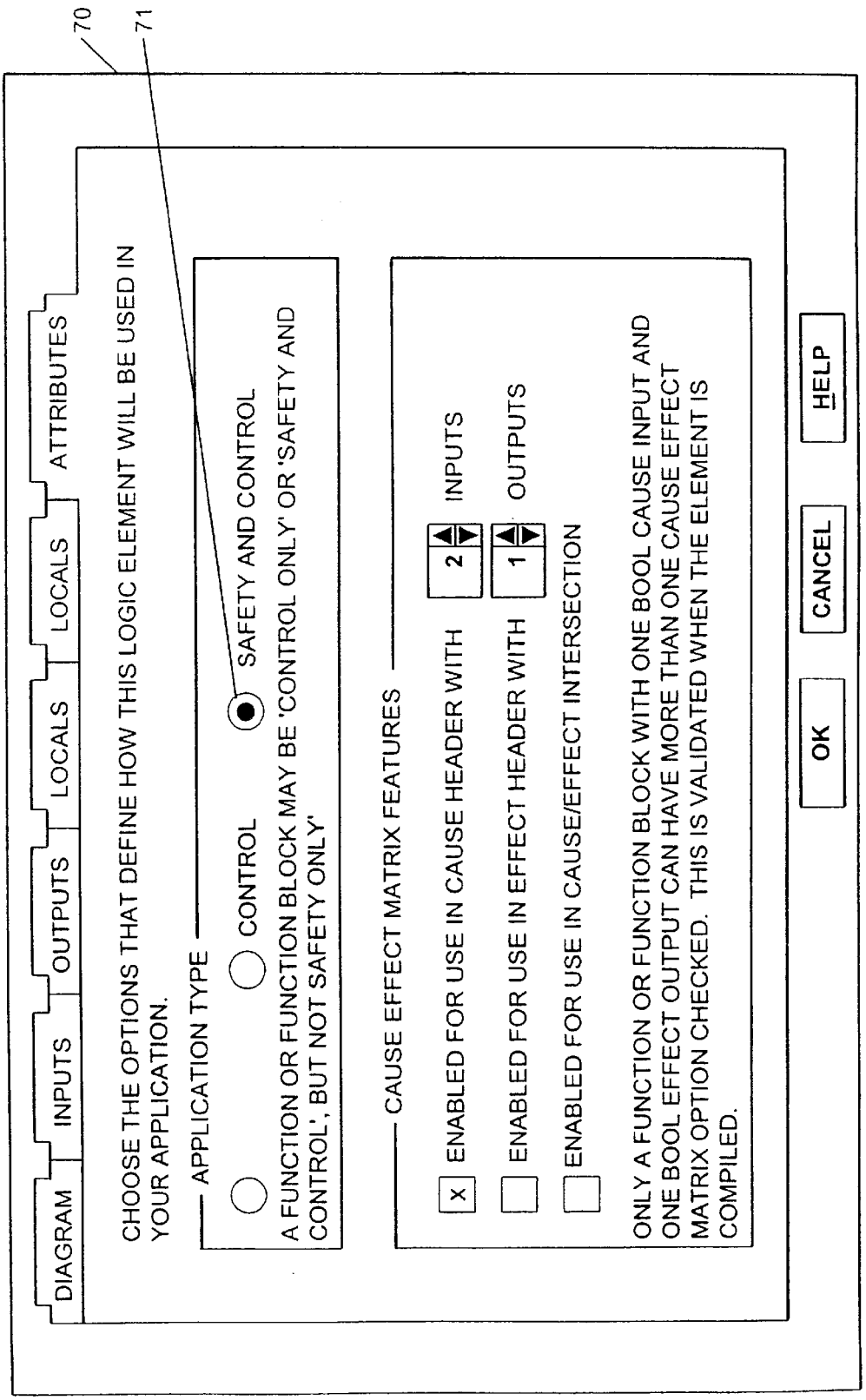
FIG. 23 is a screen view of the Declarations dialog box for Function Blocks for defining the Application Type, and the enablement of the function for use in a Cause header, and Effect header, or an intersection and for defining the number of inputs or outputs as the case may be.

The system of the present invention facilitates the creation of custom functions and function blocks. As shown in FIG. 22 the function LVLALRM which can be later invoked by the CEM at any stage during matrix development can be developed by combining OR and AND functions and defining the inputs thereto. While in the CEM program, the FBD editor is selected and the function built in the FBD language. The creation of FBD programs in this manner is well known and is part of the FBD language development. In the Declarations dialog box 70 of the element menu, as shown in FIG. 23, the Attributes tab 71 is selected and Safety and Control type is selected in the Application Type area. Under the label Cause Effect Matrix Features, the function Enabled for Use in Cause Header with 2 Inputs is declared because the LVLALRM function is to be designed with two inputs.

Referring again to FIG. 22, HI_LEV 52 and LOW_LEV 53 inputs are defined which enter an OR gate 54. The output of the OR gate 54 is applied to an AND gate 55. A bypass signal BYP 56 is also applied to the AND gate and inverted at 57. Thus, when BYP 56 is on or TRUE, LVLALRM 58 will be FALSE. Where the BYP 56 is off, a TRUE HI_LEV 52 or a TRUE LOW_LEV LVLALRM 58 will be TRUE. The Declarations dialog box is closed, the BUILD command is selected from the element menu and the function is created.

The predefined functions and function blocks are displayed in a drop-down list and may be selected as required. The function block takes one or more inputs, applies the same to an existing function and outputs one or more outputs. A CEM function for the cause header may evaluate up to 9 inputs of many data types recognized by the IEC 1131-3 standard and implemented in the TriStation 1131 and set forth below, and produces one BOOL output (the cause state). These data types are: BOOL, DATE, DINT, DWORD, INT, LREAL, REAL, STRING, TIME and TOD which are defined in the International Standards.

Data types define the size and characteristic of data that can be used in a program, function, or function block and the operations that can be applied to the data. For the TRICON global variables identified by a Tagname only BOOL, DINT and REAL variable types can be used in the declaration of program inputs and outputs.

The topmost input terminal, the cause state, that is, HI_LEV in FIG. 22, must be of the BOOL data type. An intersection can evaluate one BOOL input from the cause row and produces one BOOL output (the effect state). The topmost input terminal therefore must be of the BOOL type and the topmost output terminal must also be of the BOOL type because the system automatically connects these terminals. With regard to the effect header, the function can evaluate one BOOL input (the effect state) and produces up to 9 process outputs which are directly related to the effect state. The topmost input terminal of the effect header must be of the BOOL type and the topmost 1 to 9 output terminals may be specified as process outputs of any data types.

Figure 24:
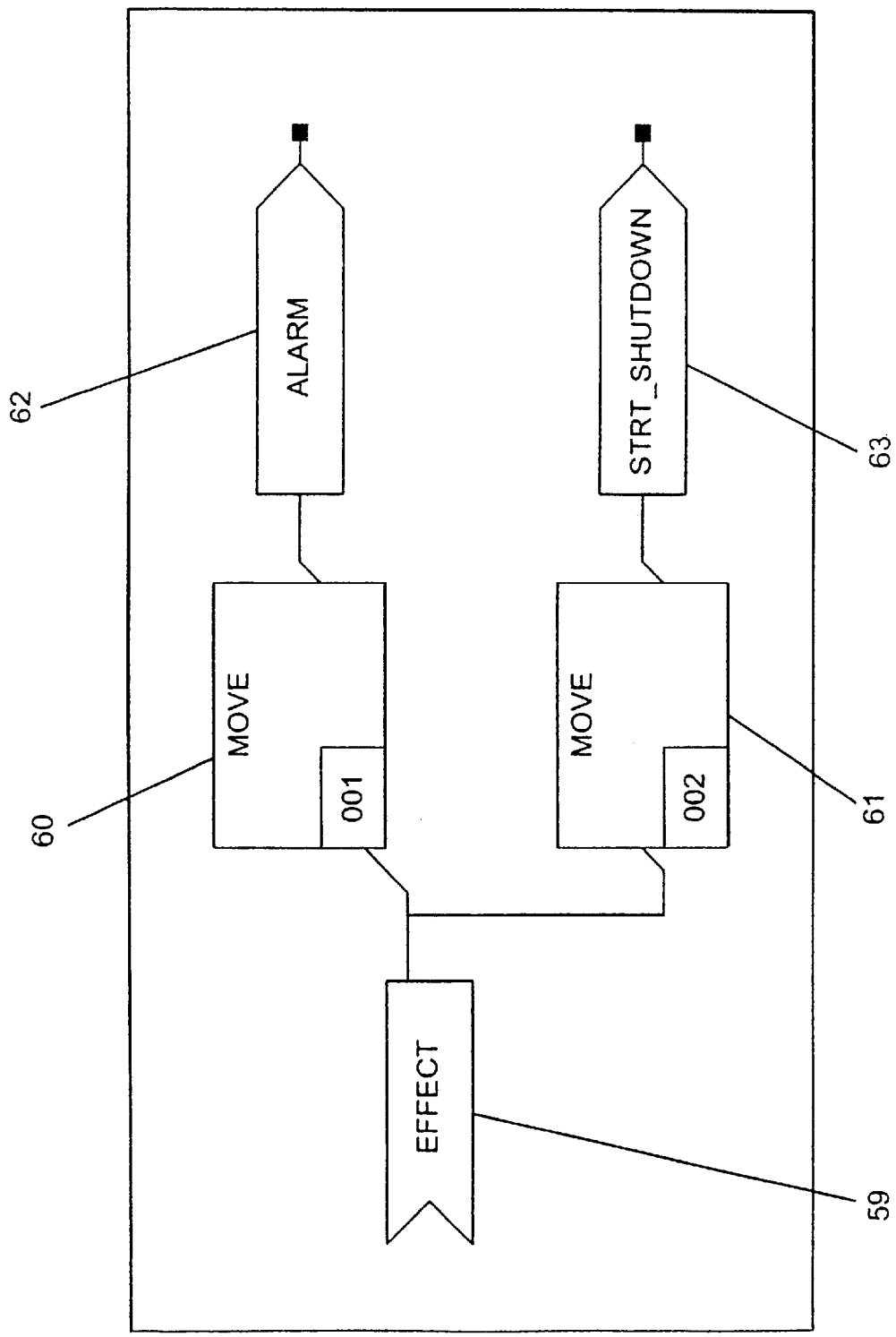
FIG. 24 is a schematic of the ALARM function showing its structure and outputs.

To create an effect function block as shown in FIG. 24, the FBD editor is again selected and the declarations command is again invoked in the element menu. The Attributes tab is selected and the Application Type is selected as Safety and Control. Referring again to FIG. 23, the CEM features are designated as Enable for Use in Effect Header with 2 Outputs is selected (not shown). Referring again to FIG. 24, an EFFECT 59 is defined as an input to a first MOVE function 60 and a second MOVE function 61. The output of the two MOVE functions are applied to outputs ALARM 62 and to STRT_SHUTDOWN 63, respectively. Thus, when an EFFECT 59 is received, the ALARM output and the STRT_SHUTDOWN output will both be TRUE. The Declaration box is closed, and the BUILD command is selected from the element menu and the function is created.

Attribute assignments are keyed in by selecting the Declarations command from the Element menu. The Attributes tab of FIG. 23 shows that functions can be enabled for use a cause header, an effect header or a cause/effect intersection. For both the cause header and the Effect header, inputs and outputs may be selected respectively from 1 to 9, as discussed above.

The number of inputs selected when enabling the cause header refers to the number of process input variables that will be evaluated by the function or the function block. It does not necessarily refer to the total number of input terminals that the function or function block provides, i.e., the system supplies a number of its own inputs as discussed above.

The number of outputs selected when enabling the effect header attribute refers to the number of process output variables that the user wishes to define on the matrix and does not necessarily refer to the total number of output terminals of the function or function block. This is because one of the ways the system stores and transmits cause states, intersection states and effect states is to automatically declare its own internal variables. Each internal variable as discussed before has a variable type of local and begins with an underscore ("_").

When the element options dialog box is designated and the option which enables a cause header function is selected, the system displays a cause column containing cells with a white background as shown in FIG. 25.

In the example of FIG. 25, the cause state is represented by an internal variable named _CO1B displayed in the FBD network pane 29. A new function variable must be declared in the blank white space, i.e., the LVLALRM space (blank white cell VarName Cell 64) which is adjacent to the LVLALRM terminal for C01. The cursor is placed in the blank cell and the name CAUSE_STATE is entered into Cell 64. The enter key is depressed and the name CAUSE_STATE appears below the internal variable _CO1B as shown in FIG. 26. The new variable name appears under _CO1B in the FBD network pane and attached to the LVLALRM function as an output and in the cause column of the CEM pane 27, as shown in FIG. 26. This variable is now ready for use by other elements elsewhere in the CEM or in another program instance. While the cause header and effect header functions may be designated on cause effect matrix creation by default, they may be changed at any time by selecting the Element Options dialog box, and the option called Enable Cause or Effect Header Function initiated as discussed above.

As shown in FIG. 27, selecting the Enable Effect Header causes the system to display an effect column containing blank white cells. If the internal variable named _EO1B displayed in the FBD network pane is to be used elsewhere in the program, a new variable must be declared in the blank white cell Effect Cell 67 adjacent to the effect terminal. Initiating the edit function at the empty cell and entering the name SHARED_EFFECT 66 as shown in FIG. 28 causes the variable name, SHARED_EFFECT, to appear in the effect row in place of _EO1B in the FBD network pane as shown in FIG. 28. This new variable is now ready for use elsewhere in the matrix or in another program instance. The internal variable named _EO1B is no longer displayed in the FBD network pane, it continues to operate internally for storage and transmission of the affected state.

While the invention has been particularly shown and described with reference to a preferred embodiment, it will be understood by those skilled in the art that various changes in form and detail may be made without departing from the spirit and scope of the invention.

What is claimed is:

1. A visual programming system for development of a control system comprising:

a. means for displaying a diagram having at least one cause cell and at least one effect cell;

b. means for inputting a cause variable associated with a cause into said cause cell;

c. means for inputting an effect variable associated with an effect into said effect cell;

d. means for linking said cause variable and said effect variable at an intersection cell so that the occurrence of said cause variable generates said effect variable; and e. means for generating intermediate source code from said diagram using said cause variable and said effect variable.

2. The visual programming system as described in claim 1 wherein said cause cell is disposed in a row and said effect cell is disposed in a column and wherein said diagram farther includes an intersection cell contiguous with said cause cell row and said effect cell column.

3. The visual programming system as described in claim 2 wherein there are a plurality of cause rows, a plurality of effect columns and a plurality of intersection cells.

4. The visual programming system as described in claim 3 wherein individual ones of a plurality of cause variables are input into said cause cells and individual ones of a plurality of effect variables are input into said effect cells.

5. The visual programming system as described in claim 4 wherein selected cause rows and selected effect columns are linked by an intersection function designated at selected intersections.

6. The visual programming system as described in claim 5 wherein said intersection function is a MOVE function which moves the contents of said cause variable to said effect variable.

7. The visual programming system as described in claim 6 wherein said intersection function may be a standard function or a standard function block.

8. The visual programming system as described in claim 6 wherein said intersection function may be a user-defined function or a user-defined function block.

9. A computer comprising an input device, a computer readable memory, and a display device, said computer programmed to perform the following steps:

a. displaying, on said computer display device, a cause effect matrix diagram having at least one cause cell and at least one effect cell;

b. receiving cause information input from said input device and displaying said cause information as a cause in said cause cell;

c. receiving effect information input from said input device and displaying said effect information as an effect in said effect cell;

d. linking said cause information and said effect information at an intersection cell so that the occurrence of said cause information generates said effect information; and e. converting said cause information in said cause cell and said effect information in said effect cell to a Function Block Diagram.

10. A visual programming system recorded on computer readable medium, said system adapted to perform the following steps:

a. displaying on a computer display device a cause effect matrix diagram having at least one cause cell, at least one effect cell and at least one intersection cell joining said cause cell and said effect cell;

b. receiving cause information input from an input device and displaying said cause information in said cause cell;

c. receiving effect information input from said input device and displaying said effect information in said effect cell;

d. linking said cause information and said effect information at said intersection cell so that the occurrence of said cause information generates said effect information; and e. converting said cause information in said cause cell and said effect information in said effect cell to a Function Block Diagram.

11. A computer comprising an input device, a memory and a display device, said computer programmed to execute the following steps:

a. displaying on said display device at least one cause effect matrix diagram having a plurality of cause regions and at least one effect region;

b. receiving cause information in the form of a cause variable input from said input device and displaying said cause information in at least one of said cause regions;

c. receiving effect information input in the form of an effect variable from said input device and displaying said effect information as an effect in said at least one effect region;

d. linking said cause information and said effect information at an intersection region so that the occurrence of said cause information generates said effect information; and e. converting said cause information in said cause region and said effect information in said effect region to functional program code elements.

12. The computer programmed to execute steps as described in claim 11 further comprising the following step:

a. displaying a plurality of effect regions in said at least one cause effect matrix diagram.

13. The computer programmed to execute steps as described in claim 12 further comprising the following steps:

a. displaying a variable table of selected variables; and b. displaying a function diagram including any functions associated with said selected variables.

14. The computer programmed to execute steps as described in claim 13 wherein said variable table display includes cause variables when a cause row is selected.

15. The computer programmed to execute steps as described in claim 13 wherein said variable table display includes effect variables when an effect column is selected.

16. The computer programmed to execute steps as described in claim 13 wherein said variable table display includes intersection function variables when an intersection cell is selected.

17. The computer programmed to execute steps as described in claim 13 comprising the additional step of:

a. receiving edit information for selected variable cells from said input device; and b. editing said selected variable cells of said variable table display based on said received edit information.

18. The computer programmed to execute steps as described in claim 13 comprising the additional step of:

a. receiving edit information for selected variable cells from said input device; and b. editing said selected variable cells of said function diagram based on said received edit information.

19. The computer programmed to execute steps as described in claim 18 wherein said function diagram is a Function Block Diagram.

20. A computer control system comprising:
a. a computer system having a display device, said computer programmed to display a diagram on said display device, said diagram including at least one input cell, at least one output cell and at least one intersection cell;
b. an input device for inputting at least one input variable into said input cell, for inputting at least one output variable into said output cell and for inputting linking information into an intersection cell to link said intersection with said input variable and said output variable in said at least one intersection cell so that the occurrence of said input variable generates said output variable;
c. a diagram to code conversion routine for converting said diagram containing said at least one input variable, said at least one output variable and said intersection linking information into compilable code;
d. a compiler for converting said compilable code into executable code;
e. a control system processor adapted for receiving said executable code; and
f. a download routine for downloading said executable code into said control system processor.

21. A computer comprising an input device, a computer readable memory, and a display device, said computer programmed to perform the following steps:
a. displaying, on said computer display device, a cause effect matrix diagram having at least one cause cell and at least one effect cell;
b. receiving cause information input from said input device and displaying said cause information as a cause in said cause cell;
c. receiving effect information input from said input device and displaying said effect information as an effect in said effect cell;
d. linking said cause information and said effect information at an intersection cell so that the occurrence of said cause information generates said effect information; and
e. converting said cause information in said cause cell and said effect information in said effect cell to a compilable diagram.

22. A computer comprising an input device, a memory and display device, said computer programmed to execute the following steps:
a. displaying on said computer display device at least one cause effect matrix diagram having a plurality of causes regions and at least one effect region;
b. receiving cause information input from said input device and displaying said cause information in at least one of said cause regions;
c. receiving effect information input from said input device and displaying said effect information as an effect in said at least one effect region;
d. linking said cause information and said effect information at an intersection region so that the occurrence of said cause information generates said effect information; and
e. converting said cause information in said cause region and said effect information in said effect region to a compilable diagram.

23. A method for generating a control program, comprising:
receiving a first system input identifier;
associating the first system input identifier with an input of a cause function block;
associating an output of the cause function block with a cause variable;
linking the cause variable with an effect variable;
associating the effect variable with a first system output identifier; and
generating the control program based on the cause function block and the first system output identifier.

24. The method of claim 23, wherein the linking associates the cause variable with an input of an intersection function and associates the effect variable with an output of the intersection function.

25. The method of claim 23, wherein the effect variable is associated with an input of an effect function block, and the first system output identifier is associated with an output of an effect function block.

26. The method of claim 25, further comprising associating a second system output identifier with the output of the effect function block.

27. The method of claim 23, further comprising receiving a second system input identifier and associating the second system input identifier with the input of the cause function block.

28. The method of claim 23, wherein the cause variable and the effect variable are predefined.

29. The method of claim 23, further comprising displaying the cause function block as a function block diagram to a user.

30. The method of claim 23, further comprising displaying the cause variable in a row of a cause and effect matrix.

31. The method of claim 23, further comprising displaying the effect variable in a column of a cause and effect matrix.

32. The method of claim 23, further comprising displaying the association between the cause variable and the effect variable as an intersection of a row and a column in a cause and effect matrix.

33. The method of claim 23, wherein the generating is also based on the first system input identifier, the cause variable, and the effect variable.

34. A method for generating a control program, comprising:
receiving a first system input identifier;
associating the first system input identifier with a cause variable;
receiving information associating the cause variable with an input of an intersection function block;
associating an effect variable with an output of the intersection function block;
associating the effect variable with a first system output identifier; and
generating the control program based on the intersection function block and the first system output identifier.

35. The method of claim 34, wherein the associating the first system input identifier with a cause variable includes associating the first system input identifier with an input of a cause function block and associating an output of the cause function block with the cause variable.

36. The method of claim 35, further comprising receiving a second system input identifier and associating the second system input identifier with the input of the cause function block.

37. The method of claim 34, further comprising associating the effect variable with a second system output identifier.

38. The method of claim 34, wherein the cause variable and the effect variable are predefined.

39. The method of claim 34, further comprising displaying the intersection function block as a function block diagram to a user.

40. The method of claim 34, further comprising displaying the association between the cause variable and the effect variable as an intersection of a row and a column in a cause and effect matrix.

41. The method of claim 34, wherein the generating is also based on the first system input identifier, the cause variable, and the effect variable.

42. A method for generating a control program, comprising:

receiving a first system input identifier;

associating the first system input identifier with a cause variable;

receiving information associating the cause variable with an effect variable;

associating the effect variable with an input of an effect function block;

associating an output of the effect function block with a first system output identifier; and generating the control program based on the effect function block and the first system output identifier.

43. The method of claim 42, further comprising receiving a second system input identifier and associating the second input identifier with the cause variable.

44. The method of claim 42, wherein associating the first system input identifier with the cause variable includes associating the first system input identifier with an input of a cause function block and associating the effect variable with an output of the cause function block.

45. The method of claim 42, further comprising associating the output of the effect function block with a second system output identifier.

46. The method of claim 42, wherein the cause variable and the effect variable are predefined.

47. The method of claim 42, further comprising displaying the effect function block as a function block diagram to a user.

48. The method of claim 42, further comprising displaying the cause variable in a row of a cause and effect matrix.

49. The method of claim 42, further comprising displaying the effect variable in a column of a cause and effect matrix.

50. The method of claim 42, further comprising displaying the association between the cause variable and the effect variable as an intersection of a row and a column in a cause and effect matrix.

51. The method of claim 42, wherein the generating is also based on the first system input identifier, the cause variable, and the effect variable.

* * * * *